(12) United States Patent
Fetzer

(10) Patent No.: US 6,423,188 B1
(45) Date of Patent: Jul. 23, 2002

(54) METHOD AND APPARATUS OF CONTROLLING LOOSE MATERIAL THAT EXITS A COKE DRUM

(75) Inventor: Kelly Fetzer, Houston, TX (US)

(73) Assignee: Automated Connectors Holdings, L.P., Houston, TX (US)

( * ) Notice: Subject to any disclaimer, the term of this patent is extended or adjusted under 35 U.S.C. 154(b) by 0 days.

(21) Appl. No.: 09/397,174

(22) Filed: Sep. 16, 1999

Related U.S. Application Data

(62) Division of application No. 08/932,419, filed on Sep. 17, 1997, now Pat. No. 6,022,454.

(51) Int. Cl.[7] .................. C10B 25/10; B23P 19/04
(52) U.S. Cl. .............. 202/242; 202/239; 202/241; 202/243; 202/262; 29/426.3
(58) Field of Search ................. 202/242, 239, 202/241, 243, 262, 96; 29/426.3; 208/131

(56) References Cited

U.S. PATENT DOCUMENTS

| | | | | |
|---|---|---|---|---|
| 4,347,944 A | | 9/1982 | Moldrup ................. 220/320 |
| 4,722,557 A | | 2/1988 | Bormioli ................. 285/18 |
| 4,726,109 A | * | 2/1988 | Malsbury et al. ......... 29/402.08 |
| 4,730,850 A | | 3/1988 | Takahashi ............... 285/3 |
| 4,820,384 A | | 4/1989 | Peckhacek ............... 202/245 |
| 4,960,358 A | * | 10/1990 | DiGiacomo et al. ....... 414/684.3 |
| 5,048,876 A | | 9/1991 | Wallskog ................ 285/364 |
| 5,221,019 A | | 6/1993 | Pechacek et al. ......... 220/315 |
| 5,228,825 A | | 7/1993 | Fruchtbaum et al. ...... 414/684.3 |
| 5,259,930 A | | 11/1993 | Barker et al. ........... 201/2 |
| 5,294,157 A | | 3/1994 | Smith et al. ............ 292/25 |
| 5,336,375 A | | 8/1994 | Wallskog et al. ......... 202/96 |
| 5,471,739 A | * | 12/1995 | Fetzer ................... 29/705 |
| 5,500,094 A | * | 3/1996 | Fruchtbaum et al. ....... 202/241 |
| 5,568,871 A | * | 10/1996 | Shantzis ................. 209/703 |
| 5,570,911 A | | 11/1996 | Galle .................... 285/364 |
| 5,581,864 A | * | 12/1996 | Rabet .................... 29/426.3 |
| 5,707,089 A | | 1/1998 | Fend ..................... 285/411 |
| 5,908,210 A | * | 6/1999 | Fetzer ................... 285/24 |
| 5,947,674 A | * | 9/1999 | Malsbury et al. ......... 414/216 |
| 6,085,929 A | * | 7/2000 | Malsbury et al. ......... 220/328 |

FOREIGN PATENT DOCUMENTS

| | | |
|---|---|---|
| DE | 2355779 A1 | 5/1975 |
| EP | 0155757 A2 | 9/1985 |
| EP | 0330295 A1 | 8/1989 |
| GB | 555912 | 9/1943 |
| WO | WO 91/06800 | 5/1991 |
| WO | WO 93/19311 | 9/1993 |

OTHER PUBLICATIONS

Anthony J. Nagy and Leslie P. Antalffy, Head–operating mechanism improves delayed coker safety, efficiency; *Oil and Gas Journal*, May 29, 1989, pp. 77–80.

Hahn & Clay Fact System; Swing–Away Design, (brochure) 1991.

* cited by examiner

Primary Examiner—Bekir L. Yildirim
(74) Attorney, Agent, or Firm—Locke Liddell & Sapp LLP

(57) ABSTRACT

The present invention provides a substantially remote operable system for connecting and disconnecting a vessel. The system comprises a substantially remotely operable joint connector for connecting and disconnecting structural units. The system and the method using the system may also comprise a remote operable closure transport for removing a vessel closure from an opening in the vessel, and a substantially remote operable removal system for allowing material to be emptied from the vessel to increase operational efficiency.

20 Claims, 43 Drawing Sheets

METHOD AND APPARATUS OF CONTROLLING LOOSE MATERIAL THAT EXITS A COKE DRUM

This application is a divisional of application Ser. No. 08/932,419, filed Sep. 17, 1997, now U.S. Pat. No. 6,022,454.

BACKGROUND OF THE INVENTION

1. Field of Invention

The present invention relates to automatic or remotely operable pressure vessel units. The present invention is directed towards cokers having coke drums that are useful in hydrocarbon refineries; however, it can relate to closure devices and joint connectors for pipes, tanks and other various conduits where hazardous conditions exit, or, in situations where rapid opening and closing of a joint is desired.

The present invention, in part, comprises a remotely operable joint connector that is especially useful in cokers, where extremely high temperature and relatively high pressure exist. In particular this connector is especially suited for the deleterious effects of coke exposure or other "dirty" operations.

2. Background of the Invention

Coke drums are structures in hydrocarbon refineries, where, inside these coke drums, heat and moderate pressure turn hydrocarbon residuum into lighter products and a hard, coal-like substance—coke. A pair of coke drums cycle between coking and decoking. One coke drum is coking (joints connected and operating at about 975° F.), while the other is decoking (quenching, followed by remotely opening the joints then decoking the drum). In the decoking phase coke is removed from the coke drums by high pressure hydrostatic drilling. A drill bit is lowered into the coke drum through a drum-top deheading system and coke, cut by the drilling action, falls through a decoke chute attached to an opening in the bottom of the coke drum created when a drum-bottom deheading system removes a closure away from said opening.

Safely preparing a coke drum for decoking involves the following steps: (1) removing the working surface opening cover creating an opening in the working surface for the coke to pass; (2) remotely aligning and engaging a closure transport to the drum-bottom closure; (3) remotely energizing the drum-bottom closure to the coke drum; (4) remotely unlocking, disconnecting and separating the coke drum from the inlet pipe; (5) remotely unlocking the drum-bottom closure from the coke drum; (6) remotely disengaging the drum-bottom closure from the coke drum in a controlled manner; (7) remotely removing the drum-bottom closure from the opening in the bottom of the coke drum; (8) remotely producing and securing a passageway between the bottom opening of the coke drum to the opening in the working surface, i.e. a decoke chute; (9) remotely unlocking and moving the drum-top closure from the opening in the top of the coke drum; (10) lowering the drill bit into the coke drum through the opening in the top of the coke drum; and (11) engaging and locking the drilling head to the drum-top deheading system.

Safely preparing a decoked coke drum for coking involves the following steps: (1) remotely replacing, aligning and locking the drum-top closure to the coke drum once the drill bit is removed from the coke drum; (2) remotely decommissioning the decoke chute and replacing the working surface opening cover; (3) remotely aligning and locking the open ends of the inlet piping together, which reconnects the coke drum to the inlet pipe; (4) remotely replacing, aligning and locking the drum-bottom closure to the opening at the bottom of the coke drum.

Currently most cokers employ workers to manually perform some or all of the foregoing steps. Any of these steps can be hazardous to workers, but by far the most dangerous steps are in the transition from the coking phase to the decoking phase. Here a closed and quenched coke drum must be opened to allow the evacuation of coke from the coke drum.

Workers are most frequently harmed while performing the following steps: (1) manually unlocking, disconnecting and separating the coke drum from the inlet pipe; (2) manually unlocking the drum-bottom closure from the coke drum; or (3) manually disengaging the drum-bottom closure from the coke drum.

Coke is supposed to support itself in the coke drum when an opening is created at the drum-bottom; however, this cannot be assured. The flow of loose coke and quench water or other materials from other types of vessels can be very hazardous for workers performing functions during the opening of the vessels. This hazard exists until a secure passageway is present between the opening of the vessel and where the material is ultimately destined. In the case of a coking unit, the material is due to fall in a hole in a working surface located beneath the unit and towards an ultimate destination below the working surface. An even more hazardous environment is a coker design to produce "shot coke" where the coke will not support itself in the coke drum.

DESCRIPTION OF PRIOR ART

In many cases, the prior art sacrifices safety to provide a quick acting joint connecting means. The prior art illustrates single point failure mechanisms, where, failure of only one member could cause the integrity of the joint to be catastrophically compromised. A higher standard of safety is dictated in today's world. The present invention provides multiple fasteners, thus, providing more safety. There is a need in industry to be able to automatically and remotely open and close a joint, and those with ordinary skill in the art can appreciate, providing redundancy in the fastening means adds difficulty.

Many companies have developed quick acting connectors, but do not provide safety. Failure of these mechanisms prompted the American Society of Mechanical Engineers (ASME) to develop rules in their Boiler and Pressure Vessel Codes that give specific rules for adding safety to "Quick Acting" devices. Single acting fastening means and single point failure devices must have secondary back-up retaining elements that will assure joint integrity upon failure of the single acting fastening means or single point failure devices. Such retaining elements will complicate automated operation.

In some installations, pressure vessels, pipes, and structural joints are opened and closed manually under conditions hazardous to the people performing the operation. Most prior installations utilize joint connecting means consisting of bolted flanges that are very labor intensive. The basic closing nature of bolted flanges is illustrated in the American National Standards Institute (ANSI) Publication B16.5. Other manually operated prior art for connecting joints consist of threaded, clamped and breach-lock mechanisms. These labor intensive designs are not well suited in hazardous environments.

Coke drums are pressure vessels that have openings in the top and bottom that are periodically closed and sealed. Most coke drums have manually bolted connections connecting vessel closures and other structural units to the coke drum to close and seal the coke drums internal environment. Coke drums also have manually bolted connections connecting upstream and downstream pipes to the coke drum. Manually operating these connections has proven to be harmful to workmen.

Although prior art provides simplicity, it does not provide sufficient safety. In analyzing paths of failure, the prior art contains unsafe single component failure paths that upon failure would catastrophically cause the opening of the connected joint. A logical method to create a safe connecting means is to incorporate redundancy in the fastening elements and to remove all single point failure devices from the connecting means.

Supplying redundancy in an automatic connecting means can be difficult and expensive. Those skilled in the art will appreciate the benefit of the simple automatic operation of the present invention that provides safe redundant fastening elements. The system should be operable manually as well, when necessary due to a power failure or other interruption. When compared to other automated joint connecting means, it can be noted that a significant economic benefit is realized with the present invention due to its simplicity. This simplicity directly relates to lower operating costs and shorter down time. In some processes, one day of down time can result in an economic loss far surpassing the initial cost of the automated connecting means. Simplicity in design is highly valued by end users of this technology. The prior art automated joint connecting devices, providing redundancy in the fastening elements contain overly complex mechanisms compared to the present invention. In the process of providing redundancy, the prior art sacrifices simplicity, reliability, and economy.

A number of coke drum deheading devices are known in the prior art. Most of the deheading devices do not apply a remotely operable connector. Thus, they are not fully automated are unsafe. All these devices in one fashion or another do not truly fully automate all the function associated with preparing a coke drum for decoking and/or coking; therefor, these devices are unsafe semi automated systems.

Some deheading systems only address the placement of the drum-bottom closure. By far the most dangerous manual operation is unlocking the drum-bottom closure from the coke drum. Thus, a fully remote unlocking system is desired. Other remote unlocking systems are complex and use a large number of moving parts that contribute to complexity, down time, and maintenance requirements.

A system is desired such that presently existing bolted flanges can be retrofitted for remotely controlled connecting and disconnecting. Typically, an existing manually sealed flange pair will have been disposed on vessel or pipe, such as on a coke drum. A remotely controlled connector that can utilize the manual flange already disposed on the units can realize significant cost savings as well as improved safety for the unit.

When designing truly remote functioning the designer must fully rule out the possibility of local intervention. A person may think outer space is a place that rules out local intervention, but workers are launched into space to locally repair systems that have lost their remote reliability. We all know the dangers associated with this endeavor. This invention in part and full inherently provides reliable remote functioning to coker units in many ways. The present invention in full or part will have ramifications in a number of industries, such as; Aerospace, Nuclear, Refining, Chemical, Petroleum, Food Process, and Subsea.

OBJECTS OF THE INVENTION

All aspects of the embodiments of the present invention draw attention to safety, simplicity, reliability and ease of quick maintenance.

The present invention provides a unique and safe system to remotely prepare a vessel for entry and removal of material. It is uniquely adapted to be fully remotely operable for the coking and decoking of a coke drum. Other prior art systems require some manual step and thus, present risk to workers attending them.

A goal is to develop a remotely operable coke drum deheading system that is fully automated. This system must comprise a joint connecting means embodying: safety, a means to provide a uniform sealing force to isolate internal volumes from the external environment, automatic primary remotely controlled operation, secondary manual operation, manual operation backup, predictable operation using simple parts and a small number of parts, cost effective design.

The current invention provides a unique and safe joint connecting mechanism that can be operated at a distance removed from danger and can be used to retrofit or replace existing manually bolted flanges.

In coke drums a structural unit called an inlet pipe can be attached to another structural unit called a bottom closure and must be disconnected somewhere along the inlet pipe by a joint connecting means. The present invention provides a unique and safe mechanism to remotely connect, disconnect, align and unite the bottom closure to the inlet pipe, further comprising:

a clamping device for securing the first structural unit and the second structural unit;

a clamp mover attached to the clamping device and movingly attached to the first structural unit for translating the clamping device substantially along the longitudinal axis of the first structural unit;

an aligner, attached to the first structural unit and the clamping device, whereby the aligner aligns the clamping device with the first structural unit in a position whereby the clamping device will capture and secure the first structural unit.

Part of the system to remotely prepare a vessel for entry and removal of material is a vessel closure transport to place the vessel closure from and to the vessel opening. The closure transports of the present invention are remotely operable and comprise a table for supporting the closure, a movement mechanism attached to the table for moving the table, a guiding mechanism for guiding the table to and from the vessel. The closure transport can in combination, tilt, pivot, rotate, slide, lift or lower the vessel closure. Some applications will require the vessel closure transport to the interface the vessel support deck and others will allow the vessel closure transport to interface the working surface or the coke drum.

Part of the system to remotely prepare a vessel for entry and removal of material is an apparatus for guiding material out of the vessel.

Below a coke drum's bottom opening is a working surface containing an aperture. The aperture is opened to allow material exiting the coke drum to pass through the working surface and is closed so that workmen cannot pass though. An exit chute can be deployed and undeployed through this aperture from the working surface to the bottom of the coke drum forming a passageway for guiding material out of the vessel.

The present invention provides unique and safe system to open and close the aperture and deploy and undeploy the exit chute. The present invention also applies, in combination, the open and closing of the aperture and the deploying and undeploying of the exit chute.

When the exit chute is deployed to the coke drum it must be secured such that it doesn't prematurely undeploy while material is exiting through it. The present invention provides a safe mechanism wherein the connector used to attach the closure to the bottom opening also attaches the exit chute to the coke drum when the closure is placed away from the bottom opening by a closure transport.

Material in coke drums may sometimes have to be drilled before it can be removed from the coke drum. A vessel penetrating tool, a drill, must be lowered through the opening in the top of the coke drum after the closure is liberated from the coke drum and transported away from the opening. The present invention provides a unique and safe vessel penetrating tool adapted to interface the joint connector to seal the vessel when the top joint connector is engaged in the closed position.

The present invention embodies a remotely operable joint connecting mechanism ("connector") that is essential for safely connecting the coke drum to the inlet pipe, the drum-bottom closure to the coke drum and the drum-top closure to the coke drum.

The present invention provides a unique and safe system to prepare a pressure vessel completely from a remote location for entry and removal of material. It is uniquely adapted to be fully remotely operable. Moreover, embodiments of the present invention are also adapted for manual operation in the event of failure of the remote operating system.

A standard multiple bolted flange, described in ANSI B16.5, together with the present invention, produces an axial joint closing force necessary to sustain joint sealing integrity. The present invention is designed to supply the closing force with magnitude large enough to produce a contact stress on a gasket that creates a sealing barrier between the joint's internal and external environments.

In a preferred embodiment, the present invention's flange retaining clamp includes a clamp whose perimeter is divided into a plurality of segments, joined by redundant segment fasteners. The clamp perimeter can be cylindrical, but is not limited to a cylindrical profile. For example, joints may be rectangular or another known shape. The joint can be opened and closed remotely or manually. A preferred embodiment involves remotely operable clamp segments, operable from a location separated by distance from the joint.

The nature of the present invention provides primary remote operation without compromising secondary manual operation. Those skilled in the art will appreciate the self-contained nature of the fasteners, which allow the flange retaining clamp to be manually opened and closed quickly, with only the use of a standard wrench. A significance of the present invention's flange retaining clamp is its ease in transition and functioning from manual to automatic remote operation.

The invention includes a remotely operated actuating means that provides a connecting force to a redundant plurality of fasteners. In a preferred embodiment of the invention, the fasteners are threaded bolts. There is a number of other joining devices that will suffice to perform the function of the threaded bolt fasteners, Cams, hooks, cables, spring loaded locking tabs, linkages, gear driven members, rack and pinion members, chain linkages and other known devices could act as a fastener to move the clamp segments into closed, sealing position. Energizing the redundant fasteners causes the clamp's perimeter to expand and contract in an opening and closing motion, liberating or retaining the flange members. When the perimeter of the clamp segments is increased, the female taper internal diameter of the clamp segments disengages the tapered male outer perimeter of the flange hubs. The male to female tapered interface between the flange hubs and the clamp segments allows the clamp segments to act as a restraint to effectively energize and lock the flange members together allowing a seal barrier to be created. Further, the tapered flange hubs can create an axially compressing force that tends to drive the flange members into one another when the clamp is closed against the hubs. This closing occurs when the diameter of the clamp is contracted by the plurality of clamp segment fastening means. Therefore, gaskets requiring joint contact surface compression and/or seating force can be energized between the flange members creating a seal barrier to seal the vessel's internal environment from its external environment. Stored energy in the clamp segment fastening device secures a leak tight joint.

In a preferred embodiment on the invention one of the conical make-up shoulders is replaced by a substantially straight non-angled make-up shoulder, such as that disposed on manually bolted flanges. This arrangement allows an existing manually bolted flange to be retrofitted for remotely controlled operation by removing the manual bolts and disposing the present invention about an existing flange. Typically, an existing manually sealed flange pair will have been disposed on a pair of structural units to be joined. Hazardous conditions of or about the joining of this flange pair or the benefit of decreased joint connecting and/or disconnecting time gives birth to the need for remotely controlled devices, such as the present invention. Since the present invention can utilize a manual flange already disposed, significant cost savings is realized.

A preferred embodiment of the present invention's clamp provides a remotely operable mechanism to assure uniform closing force along the entire perimeter of the clamp segment to the flange member contact surface interface. This unique feature incorporates, clamp segments adapted to make controlled contact ("CC clamp segments") at or about the midpoint of the clamp segment farthest away from the clamp segment fastening devices and also utilizes guide members, adapted to act on the clamp segments to guide the contact of the clamp segments with respect to the flange members producing a controlled predictable contact. This controlled contact, together with CC clamp segments uniformly preloads the entire joint by initiating contact between the clamp segments and the flange members substantially near or about the clamp segments midpoint farthest away from the clamp segment fasteners. The actuating device member, acting on the clamp segment fastening device, provides a closing force, transmitted into the clamp segments, reducing the clamp's perimeter and causing the CC clamp segments to resiliently flex substantially near or about the clamp segments' midpoint. This resilient flexing occurs as the CC clamp segments are energized and forced to engage the flange members by the clamp segment fastening devices. The closing force first provides connecting preload at or near the CC clamp segments' midpoint, then continuously provides the preload force closer and closer to the clamp segment fastening device as the CC clamp segment is flexed about its midpoint. This unique feature causes the clamp segment fastening device's force to be uniformly distributed along each entire clamp segment against the flange hubs' contact surface. The uniform preload at the contact surface, in turn, supplies a uniform sealing force on the flange member to gasket member contact surface, creating a barrier between the joints' internal and external environments.

Moreover, a unique way to assure the uniform preloading can be effectively incorporated with a remotely operated joint opening and closing mechanism. A preferred embodiment utilizes guide pins, attached to the clamp segments. These guide pins are restricted to travel in passageways fixed with respect to at least one flange members. The fixed motion of the guide pins, in turn, guides the radial motion of the clamp segments, relative to the flange members. This motion causes the clamp segments' midpoint to return to the flange members at a predictably controlled location every time the clamp segments are remotely actuated from the clamp segments' open position to the clamp segments' closed position.

When the clamp segments are secured to the flange members, friction between the flange hubs and the clamp segments tend to lock the clamp segments onto the flange members. CC clamp segments are resilient and when energized and forcefully flexed into engagement with the flange members energy is stored. This energy tends to return the clamp segments to their free state away from the flange members; thereby, producing a relative unlocking force between the clamp segments away from the flange members that overcomes the friction force holding them together. Those of ordinary skill in the art will appreciate the substantial benefit of this feature, which reliably overcomes the locking friction force between the clamp segments and the flange hubs, and the importance of this feature to the effective remotely controlled connecting and disconnecting of a joint.

In cylindrical geometry, clamps retaining flange members with an internal diameter less than 36 inches will preferably have two clamp segments. Larger diameter flange members will preferably be retained by clamps having several segments. Each clamp segment adapted for and conjoined by clamp segment fastening devices that are, in turn adapted for remote and/or manual actuation.

In some remotely operable connecting applications, such as joints in a coke drum, the low number of cycles (measured by half days), coupled with low contact stress at the clamp segment to flange hub interface, makes wear of this interface an insignificant factor when determining the life of the coke drum. Those skilled in the art will appreciate the present invention's flange retaining clamp that reduces such wear at the mating surfaces between the flange hubs and the clamp segments. This feature addresses the reduction of wear by decreasing the length of dynamic engagement at the mating surfaces, coupled with a reduction in contact stress at the mating surface engagement. CC clamp segments adapted to maximize initial area contact mating with flange members, creates a contacting interface for a remotely controlled flange retaining clamp.

In the closed position of the present invention's clamp, the flange hubs have a generally male conical profile that mates with the clamp segments' generally female conical profile, sharing the same conical vertex. Sharing the same conical vertex determines the overlaying of the mating surface throughout a substantial part of the 360 degree conical contact length; wherein, the available mating contact surfaces of the clamp segments' come in contact with mating flange hubs' surface. In the prior art, wear was of concern when the clamp segments are dynamically moved onto the flange hubs from the open position to the closed position. Such wear is not observed in the current invention.

The present invention's flange retaining clamp discounts wear with a unique contacting behavior. CC clamp segments mating with flange members, in effect, significantly align the free state conical vertex of the clamp and flange hubs' conical contact interface; wherein, the flange members are retained but energized by the clamp. This close alignment significantly reduces the length of dynamic engagement between the clamp segments and flange hubs, and turns the initial line contact, associated with prior art mating members, into a large area contact. These two effects eliminate wear of the clamp segment to flange hub contact surface as the clamp segments are forced onto the flange hubs driving the flange hubs' conical apex and clamp segments conical apex into substantially alignment as the clamp closes and the gasket is sealingly compressed by the flange members.

The present invention's flange retaining clamp is a self-contained mechanism. To function properly, the present invention's clamp does not require external devices, such as foundation reaction points or motion limiting devices.

The clamp segments can be further self-contained by incorporating the passageways for the pivot pins, and other clamp support passageways, into a self-containing support ring or plate, which is spring loaded to the clamp segments at the guide pins' locations. Such self-containing rings fix the orientation of the passageways, such that the clamp segments are guided from the open position to the closed position, relative to the flange members, and relative to each other, to assure proper connection and disconnection of the joint. This self-contained clamp assembly could then be removed as a single unit from the flange members quickly and easily for preventative maintenance. This approach is especially useful in a subsea environment where remote controlled vehicles could retrieve this modular clamp assembly for easy transport to the surface, and replace the assembly with a new assembly, leaving flange members at their subsea location.

The clamp segment fastening device is the entire device used both to connect together and to actuate the clamp segments, securely holding the gap between the clamp segments closed, and can be of any known construction. For safety reasons the clamp segment fastening device elements should be redundant and, therefor, not contain a failure path that could cause an opening of the gap upon failure of any one component. There are a number of other clamp segment fastening devices that would suffice to perform the function of the clamp segment fastening device. Cams, hooks, cables, spring loaded locking tabs, linkages, gear driven members, rack and pinion members, chain linkages, swing bolts, and other known devices could act as a clamp segment fastening device to bring together the clamp segments. Although the present inventor realizes that there are a number of clamp segment fastening devices available, the current clamp segment fastening devices were selected because of their many benefits listed below.

In prior art, the transition between remote and manual operation is complicated. Some remotely operated mechanisms must be disconnected before manual operation can occur. The manual operation of prior art is both labor intensive and complicated by the remote operation. The current clamp segment fastening device can be energized to either open the clamp gap or close and lock clamp gap both automatically by remotely actuable drive member or by manual operation with ease and without disconnecting any components. Primary remote operation is married with secondary manual operation in a unique and simply manner. Those skilled in the art will realize the ease in transition between remote and manual operation and the ease of the manual operation of the current clamp segment fastening device.

The clamp segments can be uniquely remotely opened and then remotely closed and then remotely locked to sealingly retain flange members. Without local intervention, it can then be remotely unlocked and then remotely opened. This process could be repeated ad infinitum at long distances.

The energy supplied to the clamp segment fastening device by the remotely actuable drive member is positively stored by the clamp segment fastening device, thus securing the gaps between the clamp segments and locking the flange retaining clamp onto the flange members even if the remotely actuable drive member is disconnected. This feature is required to safely secure the sealed joint independent of the remotely actuable drive member.

Energy stored in the clamp segment fastening device can be increased or decreased manually even after it has been locked.

The fastening means can be energized by any known actuable drive member, such as hydraulic or pneumatic cylinders or motors. Known mechanical advantage devices, such as; gears, wedges, linkages and cams could be incorporated with the actuable drive member.

The clamp segment fastening device interacts with the clamp segment in a self-contained assembly. This assembly does not require external anchors or reaction structures to operate. Also, the clamp segment fastening device will self-limit the opening motion of the clamp segments; therefor, motion limiting devices are not required.

To safely conjoin and secure the clamp segments in the closed position, the clamp segment fastening device has redundant joining elements. In a preferred embodiment of the current invention, these redundant joining elements are a plurality threaded bolts. If one bolt were to fail a backup exists.

The plurality of joining elements can be energized by a single remotely actuable drive member.

The design of the present invention's flange retaining clamp allows for dry assembly of the component parts of the clamp. That is, no grease or other lubricant is required during assembly. Further, depending upon the material from which the components are manufactured, the present device can be utilized in environments up to 1800 F.

DESCRIPTION OF THE DRAWINGS

FIG. 4b is an exploded partial section view similar to FIG. 4a. FIG. 4b illustrates a preferred embodiment of the clamp segments and flange members, wherein a force adjuster 176 interfaces the clamp segments and further interfaces the flange members through bearing 177.

FIG. 5 shows the top plan view of the automated flange retaining clamp partially sectioned. For clarity, FIG. 5 has a clamp support bracket radially removed from its true position by distance 6.

FIG. 9 shows the top plan view of the automated flange retaining clamp partially sectioned. For clarity, FIG. 9 has a clamp support bracket radially removed from its true position by distance 52.

FIG. 14 is similar to FIG. 5 and shows the top plan view of the automated flange retaining clamp partially sectioned. Here, a standard multiple bolted flange is retrofit with an embodiment of the present invention.

FIG. 15 is an exploded partial section view as seen along line 9—9 and is similar to FIG. 4a. FIG. 15 illustrates a preferred embodiment of the clamp segments and flange members, where at least one flange member to clamp segment contact shoulder is substantially non-angled. Show is a spring support adapted to interface a standard multiple bolted flange. Bolts 8 are rotated in view from their true position.

FIG. 17 contains a partial section illustrating the relationship between the movable opening cover and the decoke chute.

FIG. 19a is a side view of a preferred embodiment of a closure transport shown in the lowered position.

FIG. 20 contains a partial section illustrating the relationship between the movable opening cover and the decoke chute. It also illustrates a draw works that can remotely operate the motion of the decoke chute and opening cover.

Flange member 5 is resting on closure transport 61. FIG. 21 contains a partial section illustrating the relationship between the movable opening cover and the decoke chute. Here, the opening cover is actuated by a separate actuator than the decoke chute; however, they can be deployed by the same actuator.

DETAILED DESCRIPTION OF INVENTION

The present invention relates to remotely operable containment vessels.

The present invention provides a safe system to remotely prepare a containment vessel, such as a coke drum, for the removal of material therein or the insertion of material. The present invention embodies a remotely operable joint connecting mechanism essential for safely connecting the vessel to an inlet pipe, the drum-bottom closure to the vessel, or the drum-top closure to the vessel.

It should be noted that while this remotely operable connector, while described in terms of vertically oriented vessels and openings, can also secure joints in other vessels or pipes at any orientation. While generally applicable to any sort of vessel, this disclosure pays particular interest to coke drums and their mode of operation.

It should be noted that the invention is directed to the clamping or joining of other types of structural units, such as supports, pylons, conduits, pipes, other vessels, terminators, or other types of structures.

Figure 1:
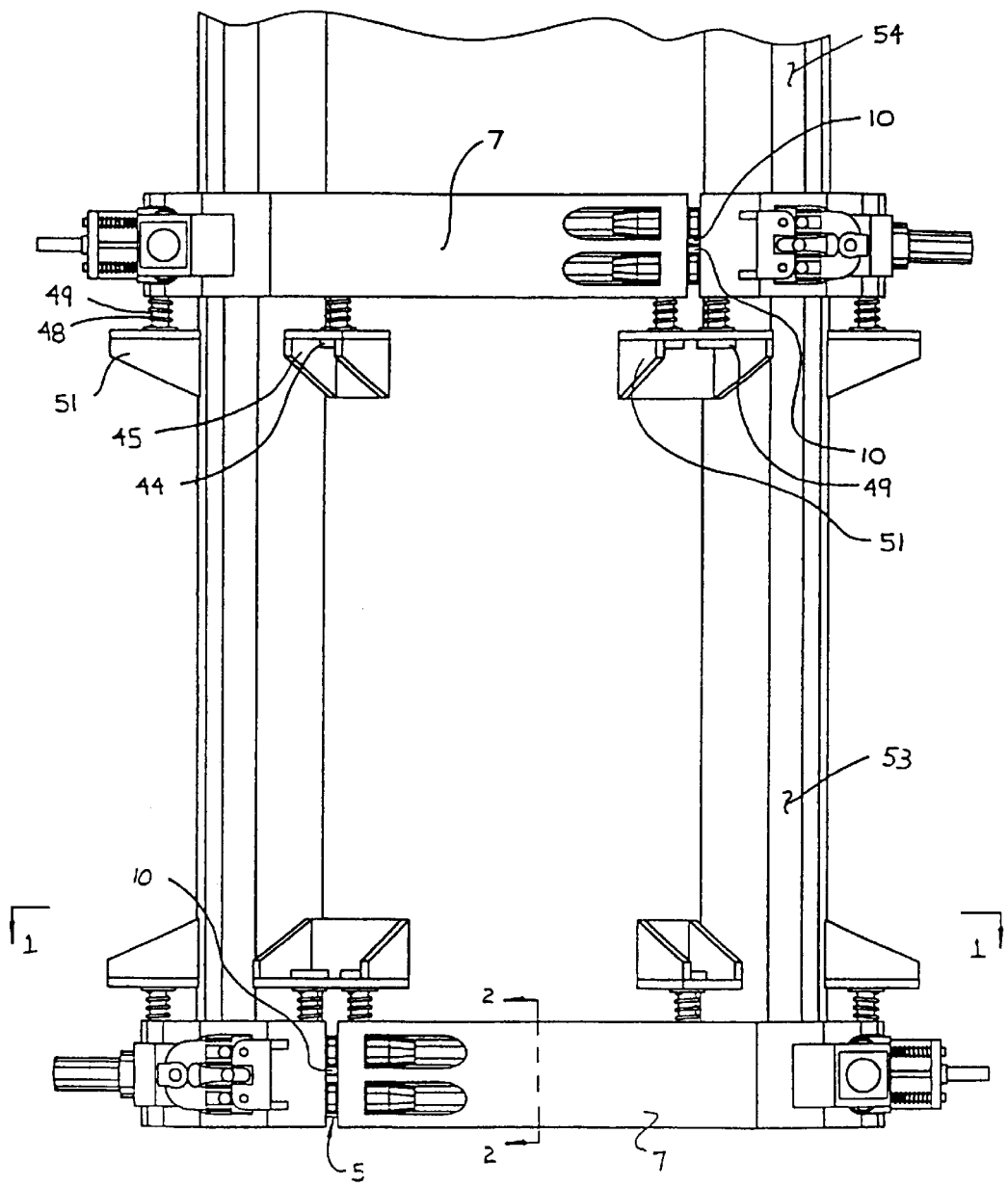
FIG. 1 is an elevation view of a vertical vessel with a preferred embodiment of the present invention having flange retaining clamps attaching sections of a vertical vessel.

FIG. 1 shows two such orientations. Referring to FIG. 1, in a first orientation (upper portion of FIG. 1), a joint between vertical vessel sections 53 and 54 is connected by an embodiment of the present invention. Vessel sections 53 and 54 have flange members 10 sealingly secured by a clamp segments 7. The clamp segments 7 are supported by springs 48 on guide pins 44 and 49 that are movably attached to supports 45 and 51. Similarly, in a second orientation (lower portion of FIG. 1), a joint between the vessel section 53 and a flange member 5 is secured by an embodiment of the present invention. The vessel section 53 and the flange member 5 have flange hub ends 11 and 21 sealingly secured by clamp segments 7. These, in turn, are supported by springs 48 on guide pins 44 and 49 that are movably attached to supports 45 and 51.

Figure 2:
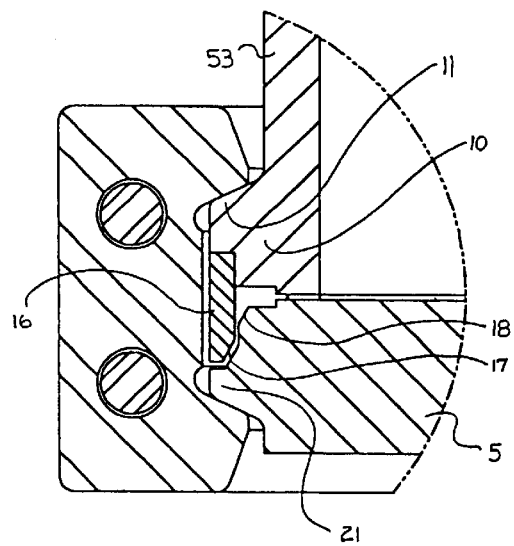
FIG. 2 is a partial section view similar to FIG. 4, illustrating a preferred embodiment of a self-aligning feature for the flange members. Bolts 8 are rotated in view from their true position.
Figure 3:
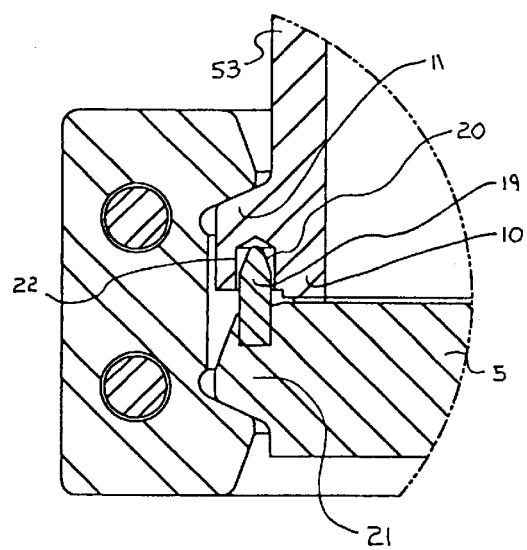
FIG. 3 is a partial section view similar to FIG. 4, illustrating a preferred embodiment of a self-aligning feature for the flange members consisting of box and pin members equally space around the flange members. Bolts 8 are rotated in view from their true position.
Figure 4:
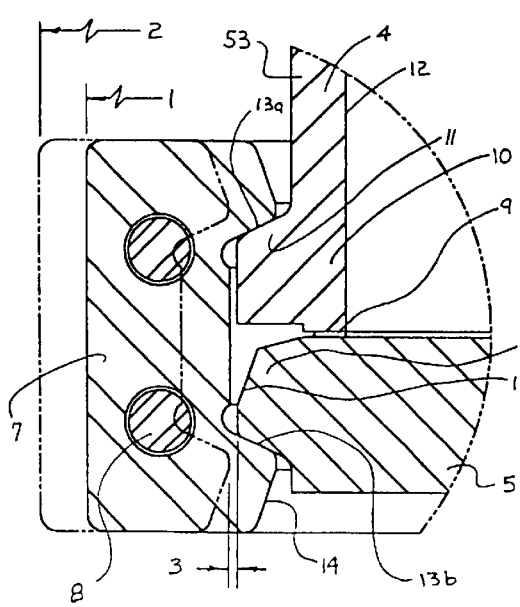
FIG. 4 is a partial section view of a preferred embodiment of the clamp segments and flange members, as seen along the lines 2—2. Bolts 8 are rotated in view from their true position.

The relationship between the flange members 5 and 10 and clamp segment 7 is better shown in FIGS. 2–4. The second flange member 5 is applied in a gasketed, sealing relationship to the first flange member 10, and acts as a lid closing the internal volume of vessel section 53. Other preferred embodiments of the flange retaining clamp can connect any plausible outer perimeter joint configuration, such as, but not limited to, cylindrical, elliptical, parabolic, oval, or polygonal or any other perimeter having flange hub ends.

FIG. 4 shows two flange members 5 and 10 in an abutting engagement with clamp segments 7. Flange member 10 is attached to the vessel section 53 at a neck 4. The flange member 5 is the closure at the opening in the vessel section 53. FIG. 4 illustrates a vessel closing device in which two flange members 5 and 10 both have matching outer clamp-engaging surfaces and are secured by the clamp segments 7.

Figure 4A:
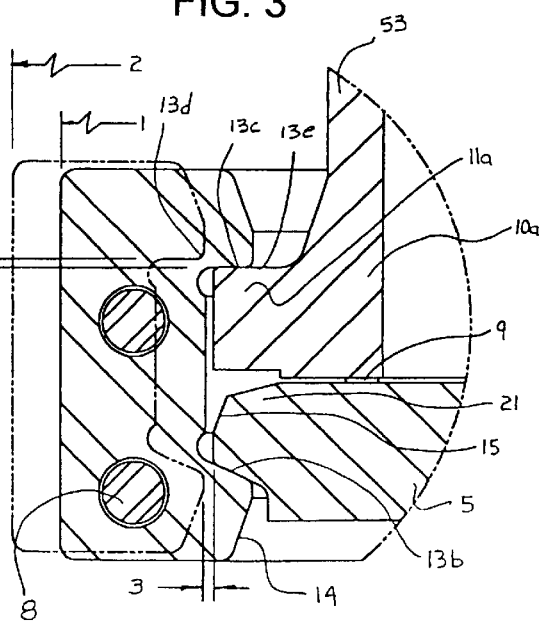
FIG. 4a is a partial section view similar to FIG. 15, illustrating a preferred embodiment of the clamp segments and flange members, where at least one flange member to clamp segment contact shoulder is substantially non-angled. Bolts 8 are rotated in view from their true position.

Flange member 10 is normally attached to the neck 4 by welding. Although not shown in FIG. 4, those skilled in the art will appreciate that the flange member 10 can be secured to the neck 4 by any number of fastening mechanisms, such as a threaded connection like a bolt. The neck 4 and the flange member 10 preferably have an internal perimeter 12 that is substantially collinear. As shown in FIG. 4, each flange member. 5 and 10 has at least one radially outwardly extending flange hub 11 and 21. Each hub contains make-up shoulders 13a and 13b. In this embodiment, the hub make-up shoulders are conical in nature, but it should be noted that other embodiments of the shoulder could be spherical, convex, or concave, among others. The make-up shoulders could be flat as shown in FIG. 4a, thereby allowing an existing manually bolted flange member disposed on vessel 53, such as a vessel 56, to be retrofitted for remotely controlled operation.

Each flange member 5 and 10 may contain a plurality of flange hub ends 11 and 21 each containing make-up shoulders 13a and 13b. The clamp segments 7 would have the same number of make-up shoulders 13a and 13b as do each flange member 5 and 10. The internal perimeter of the clamp segments 7 and the external perimeter of flange members 5 and 10 can interface each other in a conical male to female fit. Make-up shoulders 13a and 13b are contact surfaces between clamp segments 7 and flange members 5 and 10. These contact surfaces can make sliding contact or can be adapted with rollers to make rolling contact on a roller bearing surface.

When no energy is present in the clamping segments, they are said to be in the free state. In the free state, the clamping segments may put the clamping mechanism into either the open or closed position, depending on the bias of the segments used. When energy is stored in the clamping segments, the clamping mechanism will change state to either the open or closed state, once again depending on whether the segments are biased open or biased closed.

For illustrative purposes, a clamping apparatus utilizing open biased segments is used. That means, in the free state the clamping device is put into the open state. When energy is stored in the clamping segments, the segments flex and put the clamp into the closed state. One skilled in the art will realize that a clamp biased closed could just as easily be designed using the techniques described herein.

When the clamp segment conjoining elements ("bolts 8") are tightened, they force the perimeter of the clamp segments 7 to contract into flange members 5 and 10. This contraction is illustrated by the movement of clamp segments 7 from a open perimeter, shown as position 2 in FIG. 4, to a closed perimeter, shown as position 1 in FIG. 4. The conical make-up shoulders 13a and 13b transmit and multiply the force applied to bolts 8 through flange hub ends 11 and 21. This force drives members 5 and 10 together causing a large compressive load on gasket 9 in a sealing relationship between the flange hub ends, thus isolating the internal environment from the external environment of the vessel.

Referring to FIG. 4, in order to liberate the flange members 5 and 10 from clamp segments 7, the clamp segments 7 are moved away from their closed position 1 to their open position 2 creating a clearance 3 that allows the outer perimeter of the flange members 5 and 10 to separate from the inner perimeter of the clamp segments 7. This allows the joint between vessel 53 and flange member 5 to be disassembled.

In a preferred embodiment of the present invention, the clamp segments 7 are mounted to a flange member 5 or 10. One of the flange members to which the clamp segments 7 are mounted is generally attached to a structure, typically expected to be substantially stationary, i.e. the vessel section 53.

In an embodiment of the present invention, movable flange member 5 or 10 mates to the substantially stationary flange member 5 or 10. An alignment feature causes the movable flange member 5 or 10 to return to a substantially collinear relationship with respect to the substantially stationary flange member 5 or 10, so clamp segments 7, when closed, can sealingly secure the mating flange members 5 and 10 together. The internal perimeter of the clamp segments 7 has a receiving taper 14 that interfaces with the outer perimeter of the movable flange member 5 or 10 along a taper 15, creating a means to accommodate gross misalignment during initial alignment of the flange members. Interaction between the taper 15 and the taper 14 will force the movable flange member 5 or 10 into a more collinear relationship with respect to the substantially stationary flange member 5 or 10.

Referring to FIG. 4a, the apparatus in this figure is substantially similar to the apparatus in FIG. 4. Here the conical make-up shoulder 13a is replaced by a substantially non-angled make-up shoulder 13e, such as disposed on typical manually bolted flanges. These make-up shoulders can make sliding contact or can be adapted with rollers to make rolling contact on a roller bearing surface.

Figure 4B:
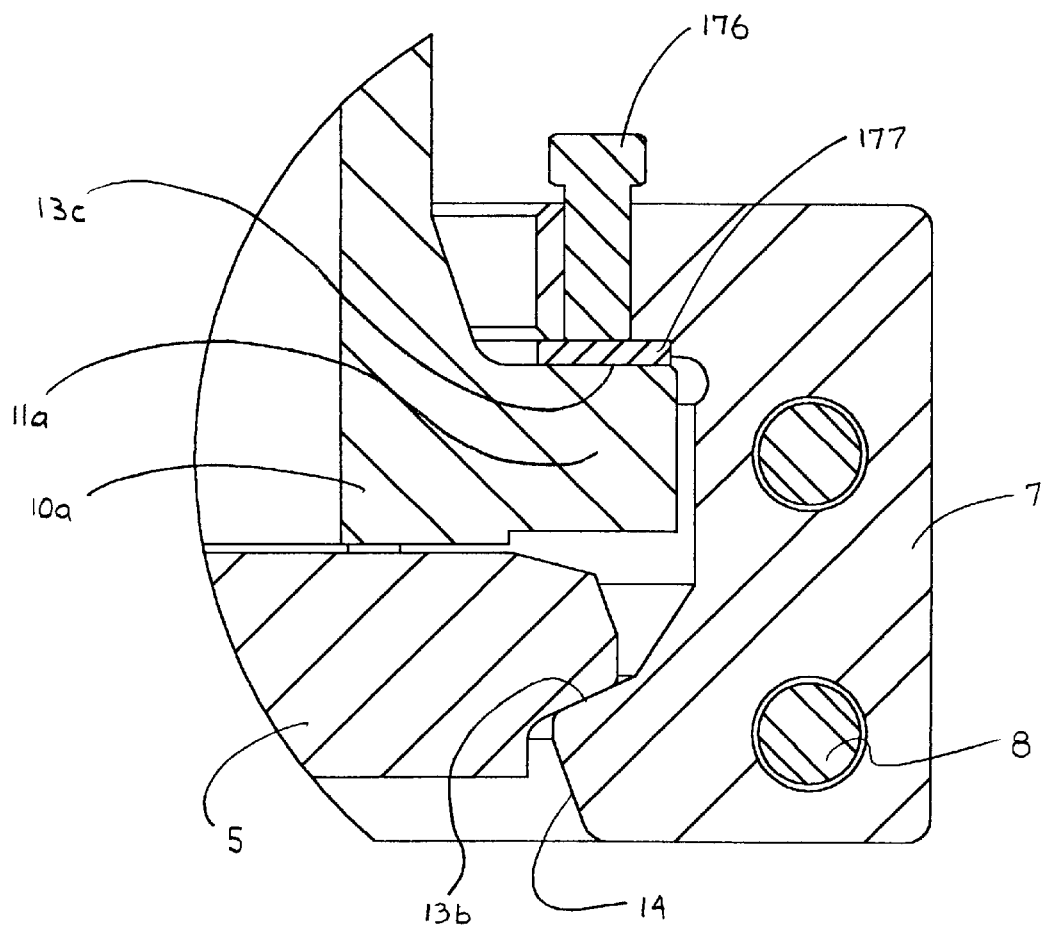

FIG. 4b is an illustration of an embodiment of the present invention adapted to a manually bolted flange member 10a. A plurality of force adjusters 176 are disposed along clamp segments 7 and space apart from one another. Force adjusters 176 can form a threaded interface with clamp segments 7; however, some other force reacting interface would suffice. When force adjusters 176 are adjusted the force between clamp segments 7 and flange members 5 and 10a changes causing stored energy to change. This force adjustment can occur differentially along the length of clamp segments 7.

A bearing 177 can be placed between bolts 176 and flange member 10a and/or flange member 5. The force adjusters 176 could make a roller contact with the bearing 177 or the surface 13c of flange member 10a. These force adjusters 176 can also be incorporated with connectors similar to FIG. 4.

Figure 14:
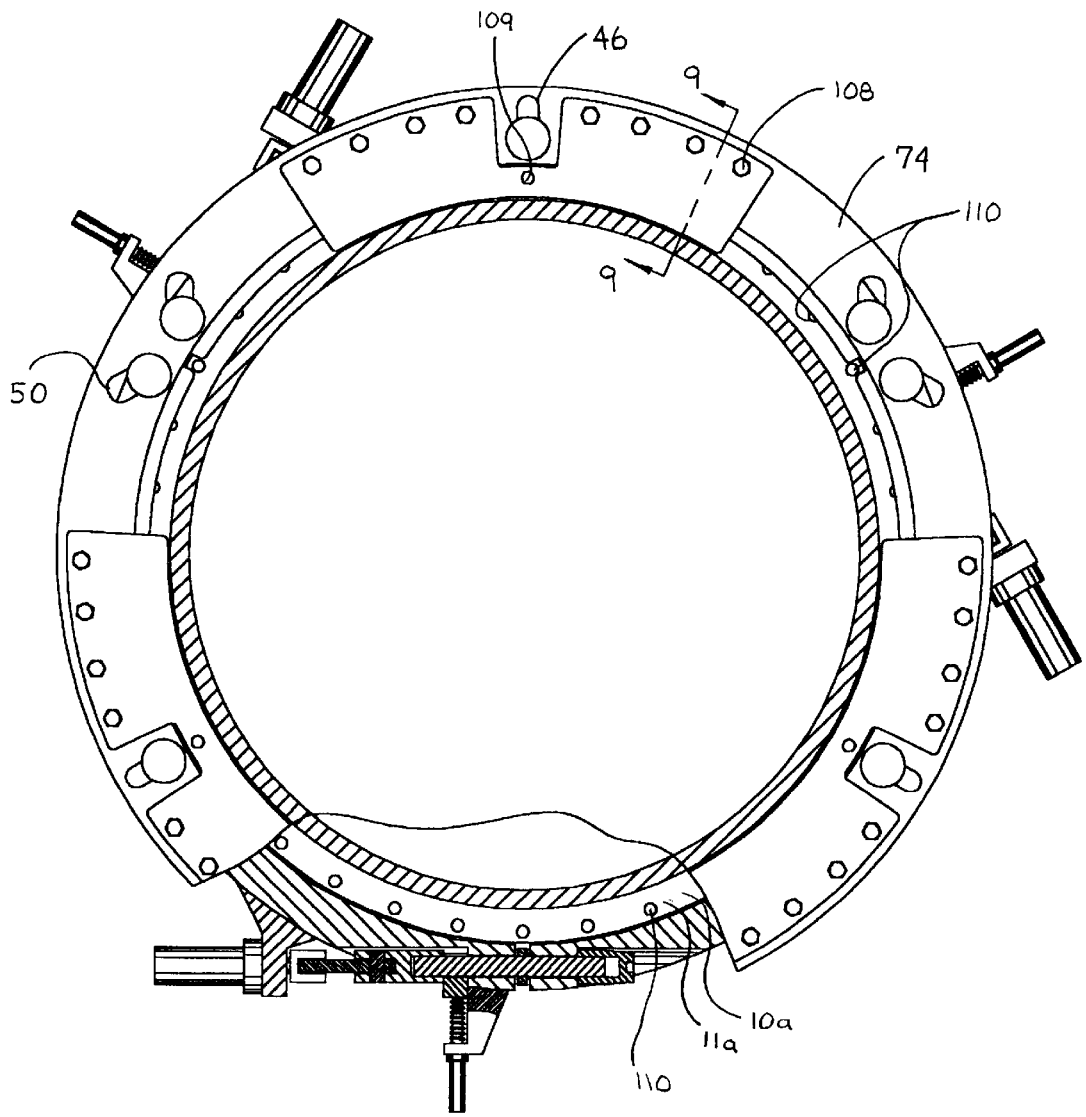
FIG. 14 is a section view of the contracted position of a preferred embodiment of the present invention.

The embodiments of FIGS. 4a and 4b allow an existing manually bolted flange to be retrofit for remotely controlled operation by removing the manual bolts and adapting the present invention about an existing flange 10a having flange hub end 11a. FIG. 14 illustrates a preferred arrangement for adapting the present invention about a typical manually bolted flange. Generally, an existing manually bolted flange pair will have been disposed on vessel 53 or a pipe. Hazardous conditions of or about the joining of this flange pair or the benefit of decreased joint connecting and/or disconnecting time gives birth to the need for remotely controlled devices, such as the present invention. Since the present invention can utilize a manually bolted flange 10a, already disposed on a vessel 53, such as on a vessel 56, significant cost savings is realized, as follows; retaining the investment in flange 10a, avoiding the expenses of removing this manual flange 10a, avoiding the cost of a replacement flange 10, avoiding the expense of fabricating new flange 10 to vessel 53 and the savings of avoidable downtime and the loss of production during this downtime.

In the foregoing arrangement it is beneficial for the clamp segment's open position to be sprung, such as to create a distance 3a between make-up shoulder 13c's open position and its closed position, thereby assuring reliable engagement of clamp segments 7 with the flange hub end 11a. Lead-in angle 13d is applied to further assure the foregoing reliable engagement.

The placement of bolts 8 may be biased toward the tapered shoulder 13b further away from shoulder 13c, as shown in FIG. 4a and FIG. 14. This placement would differ from the relatively equal distant placement of bolts 8 between two equally angled make-up shoulders as shown in FIG. 4. Those skilled in the art will realize this biased placement accommodates the load eccentricity created by dissimilarly angled make-up shoulders, such as 13b and 13c.

Referring to FIG. 2, an embodiment of the present invention includes a fine aligning mechanism. An aligning plate 16, preferably constructed from rolled plate, is attached to the flange member 5 or 10. The aligning plate 16 has a receiving taper 17 along its inner perimeter for receiving the flange member 5. The opposite flange member to which the aligning plate 16 is attached will have an interfacing taper 18 that interacts with the taper 17.

Referring to FIG. 3, another embodiment of a fine aligning feature consists of a box and pin type arrangement. A pin 19 has a tapered nose 20 that interfaces with box 22 to align flange member 5 to flange member 10. This box to pin arrangement will be utilized to align other devices embodying the present invention, and will be referred to by these numbers without particular reference to flange to flange alignment.

Figure 5:
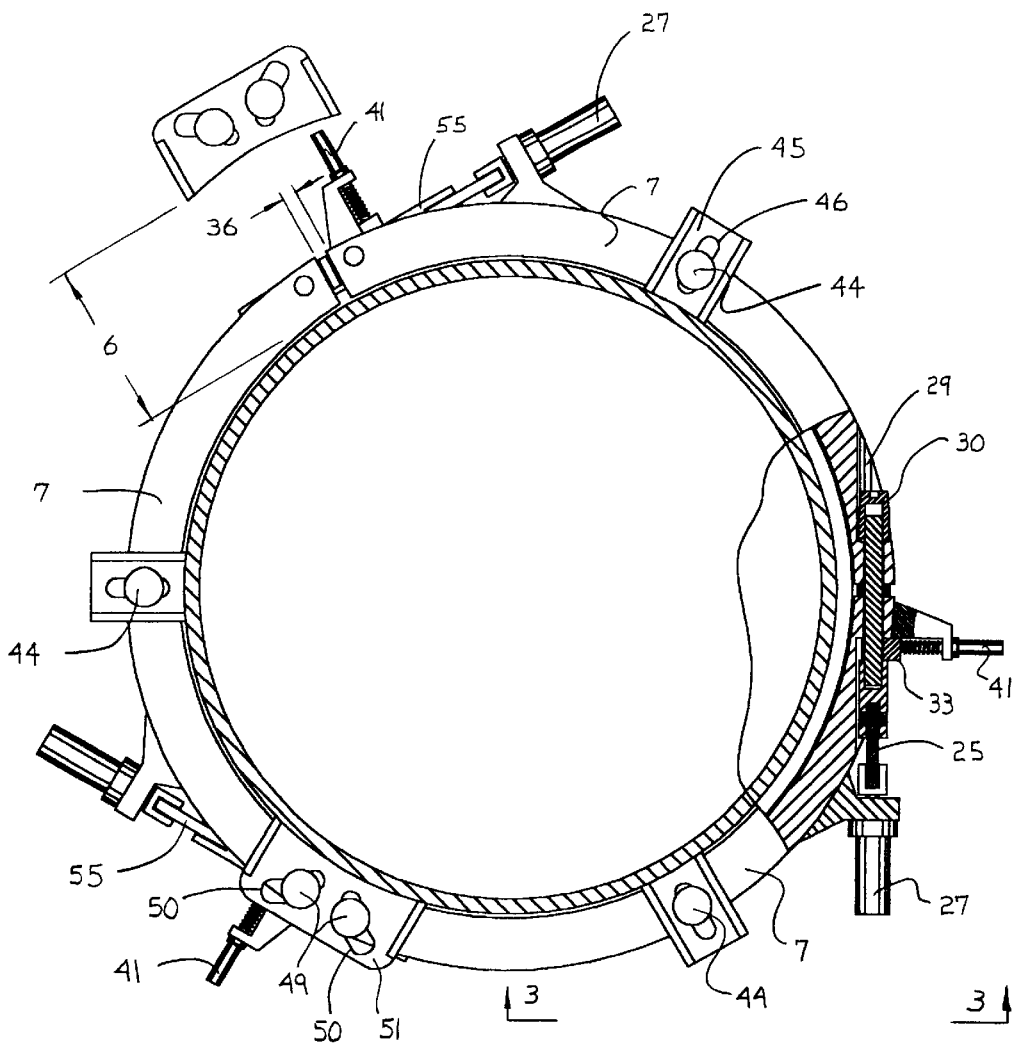
FIG. 5 is a section view of the contracted position of a preferred embodiment of the present invention as seen along the lines 1—1.
Figure 6:
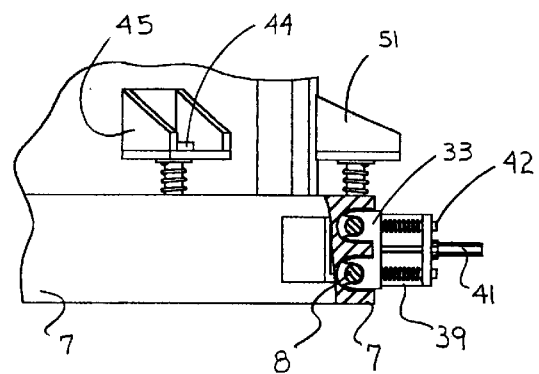
FIG. 6 is a partial side view, partially sectioned, of the automated flange retaining clamp of FIG. 5 as seen along the lines 3—3. The partial section shows the relationship between bolts 8 and locking devices 33, while in the closed position.
Figure 7:
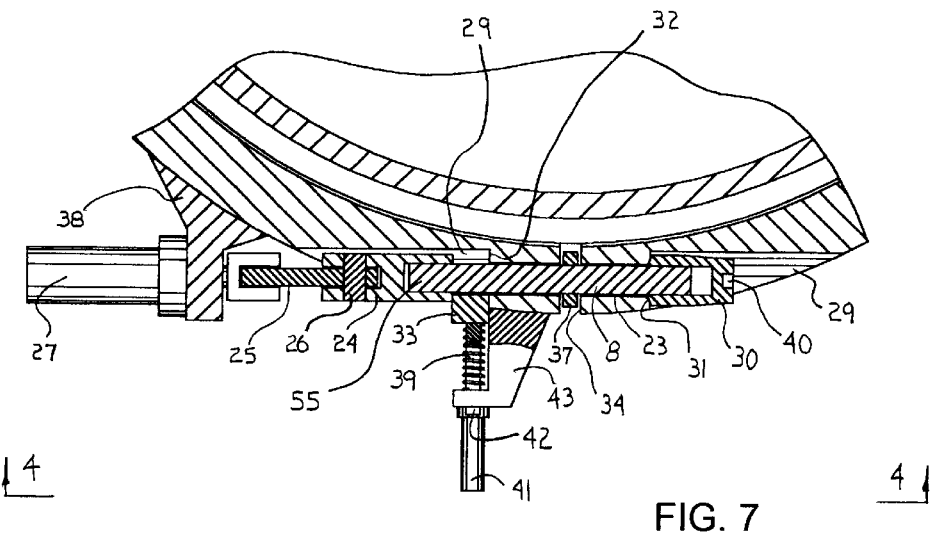
FIG. 7 is an enlarged view of the partial section shown in FIG. 5 illustrating a preferred embodiment of the present invention, focusing on a preferred embodiment of the redundant clamp segment fastening device as seen along the lines 5—5.
Figure 8:
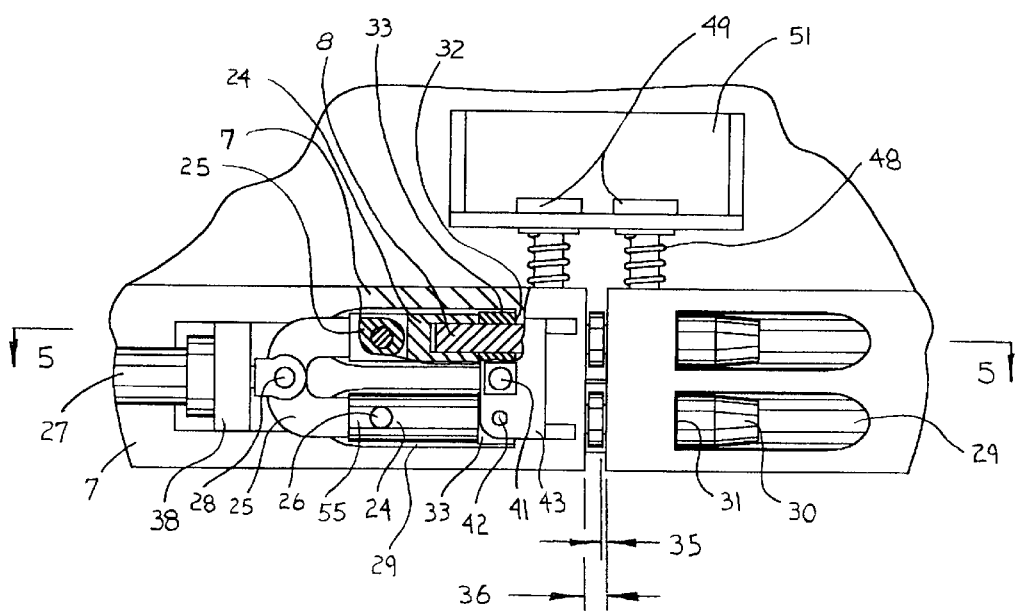
FIG. 8 is a partial side view, partially sectioned, as seen along the lines 4—4, illustrating a preferred embodiment of the present invention, focusing on a preferred embodiment of the redundant clamp segment fastening device.

Referring to FIGS. 5–8, most identifying number labels are shown in FIGS. 7 and 8 because they are enlarged partial views of FIG. 5. In a preferred embodiment of the present invention, shown in FIG. 5, the flange retaining clamp is divided into three separate clamp segments 7 at gaps 36. Each clamp segment division is defined by the gaps 36. Clamp segment fastening device 55 conjoins and interacts with the clamp segments 7 across gaps 36, controlling the magnitude of gaps 36 and securing gaps 36 such that clamp segments 7 are positively locked onto flange members 5 and 10. In a preferred embodiment of the present invention, each clamp segment fastening device 55 comprises a plurality of threaded bolts 8 with a locking nut 30, a locking device 33, a clevis nut 24, a motion limiting device 37, a yoke 25, pins 26 and 28, and at least one remotely actuable drive member 27.

An operator at a remote control panel can activate the remotely actuable powered drive member 27 causing the clamp segment fastening device 55 to automatically drive clamp segments 7 to an expanded open position or to a contracted closed and locked position.

In a preferred embodiment of the present invention, the flange retaining clamp is divided into a plurality of segments 7. Three clamp segments 7 are generally a preferred embodiment for large joints and two clamp segments 7 are generally acceptable for smaller joints. It should be noted that the clamp segments can have reduced sections, such as notchings, for providing further flex to the clamp segments.

In a preferred embodiment of the present invention, a passageway 23 in the clamp segments 7 are made to accept bolts 8. As shown in FIG. 5, the passageway 23 and bolts 8 are substantially tangent to and passing through the clamp segments 7. Attached to the bolts 8 are threaded clevis nuts 24. Attached to the clevis nut 24, by a pin 26, is a yoke 25. In turn the yoke 25 is attached to a remotely actuable powered drive member 27 by a pin 28. A passageway 29, substantially collinear to the passageway 23, is made to accept the clevis nut 24, locking nut 30, and the locking device 33. Since the several locking means 24, 30, and 33 cannot pass through the passageway 23, the junction of passageway 29 and 23 form reaction shoulders 31 and 32 (FIGS. 7 and 8).

To remotely close and lock the clamp segments 7 and, thereby, to produce an effective sealing barrier between the vessel's internal and external environment, a signal is sent from a remote control panel (not shown) that causes a power supply (not shown) to activate the remotely actuable powered drive member 27. The remotely actuable powered drive member 27 pulls yoke 25 towards anchor 38 attached to clamp segments 7. The yoke 25 evenly distributes a stretching force into bolts 8. Since the locking nut 30 cannot pass through the passageway 23, the locking nut 30 contacts the clamp segments 7 at the reaction shoulders 31, pulling the adjacent clamp segments together, thereby effectively reducing the clamp segments' perimeter. This reduction in perimeter of the clamp segments forces flange members 5 and 10 together and supplying a compressive sealing force on gasket 9.

Figure 10:
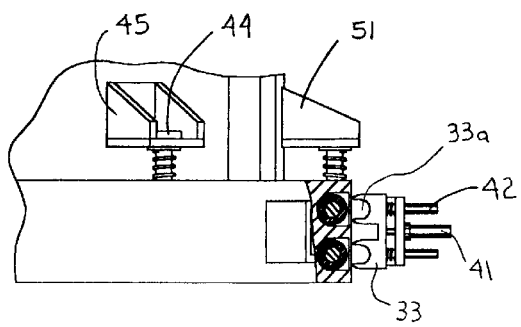
FIG. 10 is a partial side view, partially sectioned, of the automated flange retaining clamp of FIG. 9 as seen along the lines 6—6. The partial section shows the relationship between fastener 8, locking device 33, and clevis nut 24, while in the open position.
Figure 11:
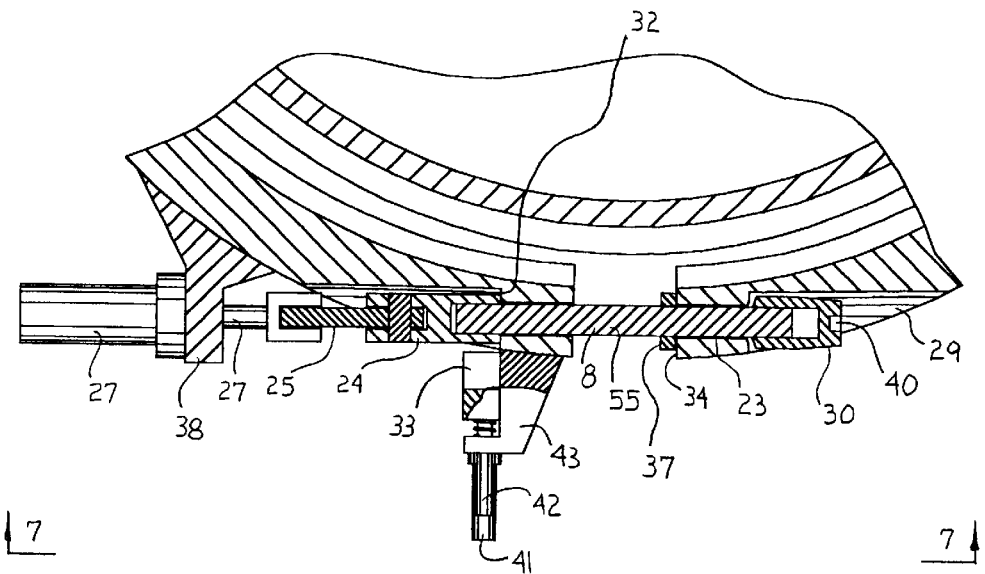
FIG. 11 is an enlarged view of the partial section shown in FIG. 9 illustrating a preferred embodiment of the present invention, focusing on a preferred embodiment of the redundant clamp segment fastening device as seen along the lines 8—8.
Figure 12:
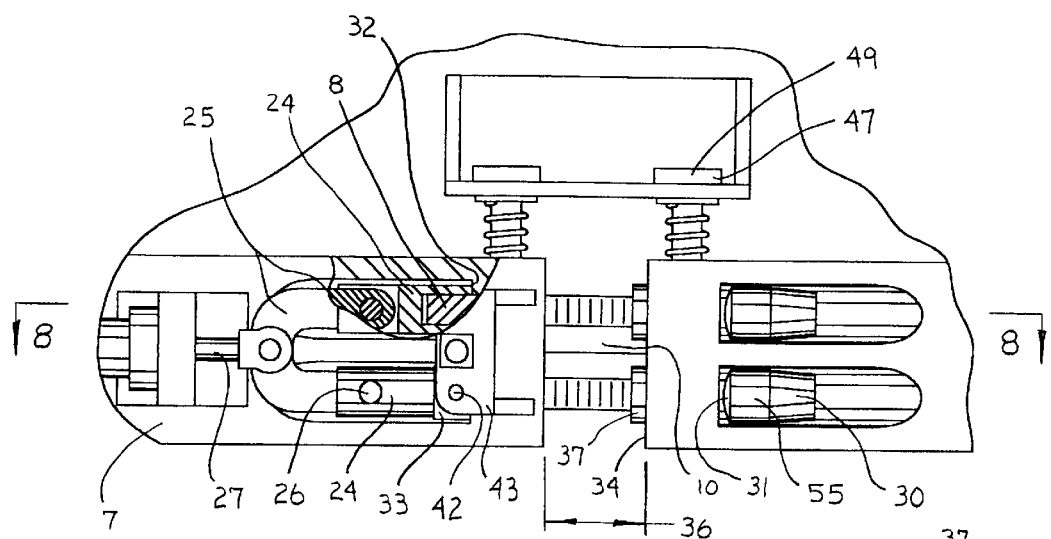
FIG. 12 is a partial side view, partially sectioned, as seen along the lines 7—7, illustrating a preferred embodiment of the present invention, focusing on a preferred embodiment of the redundant clamp segment fastening device.

Locking nut 30 and reaction shoulders 31 interface each other in a male to female spherical radii fit so as to prevent significant bending stress in bolts 8. When the remotely actuable powered drive member 27 causes a significant stretching force in the bolts 8, the bolts 8 elongate enough to allow the locking devices 33 to fit between the clevis nuts 24 and the reaction shoulders 32. The locking devices 33 have passageways 33a (FIG. 10) to allow passage of the bolts 8 but not allow passage of clevis nuts 24, thus positively locking the closing stored energy in the stretched bolts 8, and allowing isolation of the remotely actuable powered drive member 27. Since the remotely actuable powered drive member 27 is energized by a remote power source, the remotely actuable powered drive member 27 is generally not relied on to act as a continuous fastener to retain stored energy. It is beneficial to terminate the power source after energizing and locking bolts 8 with locking devices 33.

As shown in FIG. 6, the locking devices 33 have "C" shaped sections, which allow the bolts 8 to fit into the opening 33a of the "C" shaped sections. At the openings in the "C" shaped sections of the locking devices 33, tapers account for misalignment of the bolts 8, the clevis nut 24, and the passageways 29 with said locking devices 33. During tightening, when sufficient clearance is achieved under the clevis nuts 24, the remotely actuable powered locking device actuator 41 advances the locking device 33 under the clevis nut 24, power to the remotely actuable powered drive member 27 can then be disconnected. The clevis nut 24 reacts on locking device 33. Since the bolts 8 were significantly stretched from their original length, they will now maintain a substantial stored energy that will secure the clamp segments 7 onto the flange members 5 and 10. Although not required, but added as safety elements, springs 39 hold locking devices 33 from moving when the remotely actuable powered locking device actuator 41 is disconnected from the power source. The springs 39 contribute to moving the locking device 33 into locking position when the remotely actuable powered drive member 27 has created sufficient clearance between the clevis nut 24 and the locking device 33. The locking device 33 is a positive locking element that locks the stored energy into clamp segment fastening device 55 without relying on friction or a power supply to maintain the stored energy.

Locking devices 33 can be simple ridged structural elements. A cam lock made to interface 7 & 33 could also hold locking plate 33 into the closed and lock position. Locking device 33 could also make a slight angled contact with clevis nut 24 allowing the fastening device 55 to be further remotely tightened once the locking device is locked by simply stretching bolts 8 and advancing locking device 33's angled contact. This action further engages clevis nut 24 and results in more stretch in bolts 8. The magnitude of the angled contact could be made to be less than the contact friction angle, thus producing a self-locking or positive locking effect. This contact surface could also be serrated with interlocking teeth.

In another embodiment, clamp segments 7 are comprised of a segmented ring with external lugs. Each external lug contains passageways 23 and has reaction shoulders 31 and/or 32. The lugs are located near the ends of the clamp segments farthest away from the midpoint of the clamp segment.

Clamp segment fastening device 55 is both remotely or manually operable without changing or disconnecting any parts of the clamp. This provides very quick transition between remote and manual operation. To manually close the connector, the user may simply tighten threaded locking nuts 30 on the bolts 8. A standard wrench interface 40 is provided to locking means 30 to allow the manual tightening of the bolts 8. Alternatively, the user may attach a portable power supply to the remotely actuable powered drive member 27. Ease in transition between remote and manual operation is a very useful feature.

In another embodiment of the clamp segment fastening device 55, the force applied to the bolts 8 can be increased, decreased, or verified at any time without disconnection of any members simply by turning locking nut 30 with a standard wrench.

In another embodiment, bolts 8 is adapted for spring centralizers that forcefully centralize the bolts 8 in passageways 23.

In another embodiment, bolts 8 or passageways 23 are adapted for bearings to ease the relative motion of these components.

The remotely actuable powered drive members 27 are connected in series, so that a power source, connected to the remotely actuable powered drive member 27, supplies the same amount of power each individual drive member 27. This assures that clamp segments 7 act simultaneously to connect and disconnect the joint. The remotely actuable powered locking device actuator 41 are similarly interconnected to assure proper functioning of the locking devices 33. If required, a compressible force producing mechanism could be adapted between the clamp segments 7 assuring each gap 36 is closed substantially evenly.

Figure 13:
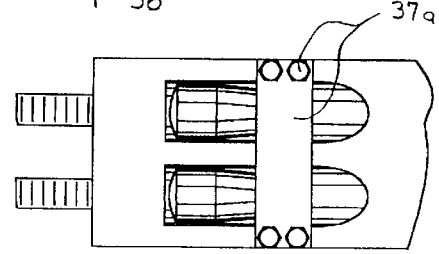
FIG. 13 is a partial side view of an alternative embodiment of the present invention that limits the motion of the clamp segment fastening device shown in FIG. 12. It is one of many possible means to perform the motion limiting function of device 37.

Referring to FIGS. 9–13, to automatically open the clamp segments 7, a signal is sent from a control panel (not shown) removed from the clamp segments 7. The signal activates a remote power supply (not shown) to activate remotely actuable powered drive members 27 to stretch the bolts 8 until the locking devices 33 are unloaded and can be retracted by actuating the remotely actuable powered locking device actuator 41. In an embodiment, the motion of the locking devices 33 is predictably guided by guide members 42 that travel through passageways in anchors 43. Once the locking devices 33 are clear of clevis nuts 24, a passageway is formed allowing clevis nuts 24 to be moved by the remotely actuable powered drive member 27 toward reaction shoulders 32. When the remotely actuable powered drive member 27 advances the bolts 8 through the passages 23, the gap 35 (FIG. 8) falls to nothing. A motion limiting means 37, attached to the bolts 8, makes contact with the clamp segments 7 at a contact surface 34. The motion forces the clamp segments to move apart expanding the parameter of the clamp segments 7 until clevis nuts 24 make contact with the reaction shoulders 32. At the reaction shoulders 32, clevis nuts 24 cannot pass through the passageways 23, limiting the expanding motion of the clamp segments 7 in a self-limiting manner. Thus, due to the limitations on movement of the parts comprising the clamp segment fastening device 55, the opening motion of the clamp is self-limited. Therefor, no motion monitoring devices are required. The motion limiting means 37 is adjustably attached to bolts 8. FIG. 13 shows an alternate embodiment of the motion limiting means 37, identified as 37a. The motion limiting means 37a is attached to the clamp segments 7 above the locking nut 30 and performs the same functions as the motion limiting means 37. Further, motion limiting means 37a is designed to allow unimpeded access to a standard wrench interface 40, to allow quick manual tightening of the clamp segment fastening device 55.

It should be noted that one skilled in the art would realize that a sensor could be used to indicate whether the clamping apparatus should remain in either the closed and locked position, or alternatively in the open position. This sensor would control and inhibit the state transition of the clamping mechanism when environmental conditions dictate it.

A manual operation controller can also be added to the device to provide a backup mechanism to adjust the stored energy in the clamp segments. To manually open the connection means, loosen threaded locking nut 30 on the bolts 8 and retract the locking device 33 by common rigging means. Extend the bolts 8 by common rigging means until clamp segments 7 are opened, as discussed in the previous paragraph. A portable power supply may be used to move the remotely actuable powered drive member 27 and the remotely actuable powered locking device actuator 41 to open the connection. The remotely actuable powered drive members can utilize any form of power, such as electric, pneumatic, or hydraulic power.

A preferred embodiment has clamp segments 7 that radially expand and contract to liberate and secure the flange members 5 and 10. When the clamp segments 7 are tightly fastened they engage the flange members 5 and 10, such that the weight of the clamp segments 7 is supported by the flange members 5 and 10. When the clamp segments 7 are opened the weight of the clamp segments 7 is supported by the springs 48 and the guide pins 44 and 49 attached to the guide pin support frames 45 and 51.

Figure 9:
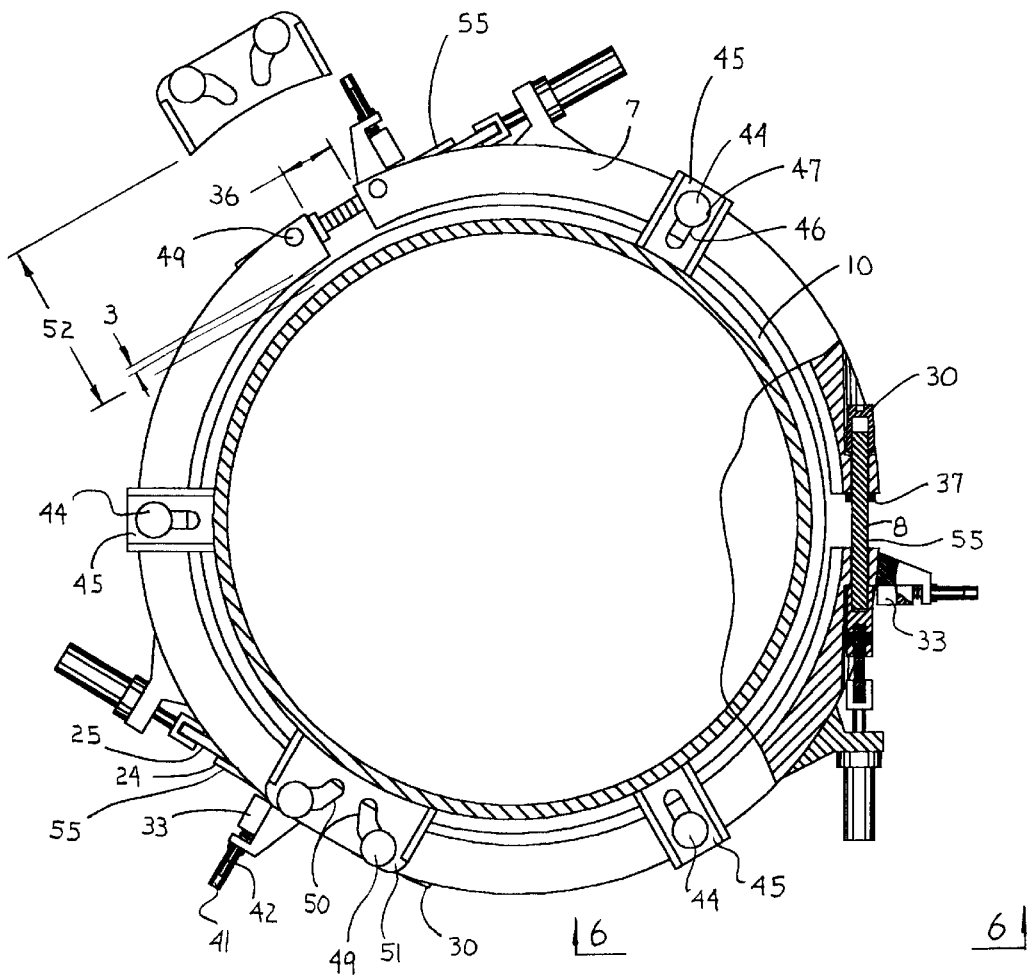
FIG. 9 illustrates the expanded position of a preferred embodiment of the present invention shown in FIG. 5.

Referring to FIGS. 1, 5 and 9, in an embodiment, guide pins 44 are located at the midpoint of each clamp segment, preferably evenly spaced from the clamp gaps 36. The guide pin support frames 45 and 51 each include a passageway 46. The guide pins 44 and 49 are attached to clamp segments 7 and are restricted to motion allowed by the passageways 46 and 50 through which the guide pins 44 and 49 travel, thereby predictably controlling the motion of the clamp segments. The guide pins 44 and 49 have shoulders 47 (FIG. 12) that have a diameter larger than the passageways 46 and 50 such that the guide pins 44 and 49 cannot pass fully through the guide pin support frames. Since guide pins 44 and 49 are attached to clamp segments 7 and cannot pass fully through the supports 45 and 51, the length of the guide pins 44 and 49 axially locate the clamp segments 7 a certain prescribed distance away from supports 45 and 51. This distance is maintained by the springs 48. The pins 44 and the passageways 46 in the supports 45 play an important role in aligning the segments of the clamp segments 7 to their first point of contact with the flange members 5 and 10. At the pin locations 44 and 49, the springs 48, confined between the clamp segments 7 and the supports 45 and 51, hold the position of clamp segments 7 such that the internal female tapered section of clamp segments 7 is maintained in a position for alignment of the male flange hubs of the flange members 5 and 10. Thus, the present invention provides a self-contained flange retaining clamp, which may be operated on any orientation with respect to gravity without modification.

Further, the guide pins 44 and 49, being restricted to travel in passageways 46 and 50, control the movement of the clamp segments 7, both relative to each other and relative to the flange members 5 and 10.

The function of the guide pins 44 and 49, and the supports 45 and 50 could be replaced by guide rods attached to the stationary neck 4 passing through or by the clamp segments 7 or by guide rods attached to the clamp segments 7 and restricted to motion in a slot attached to the neck 4.

Figure 20:
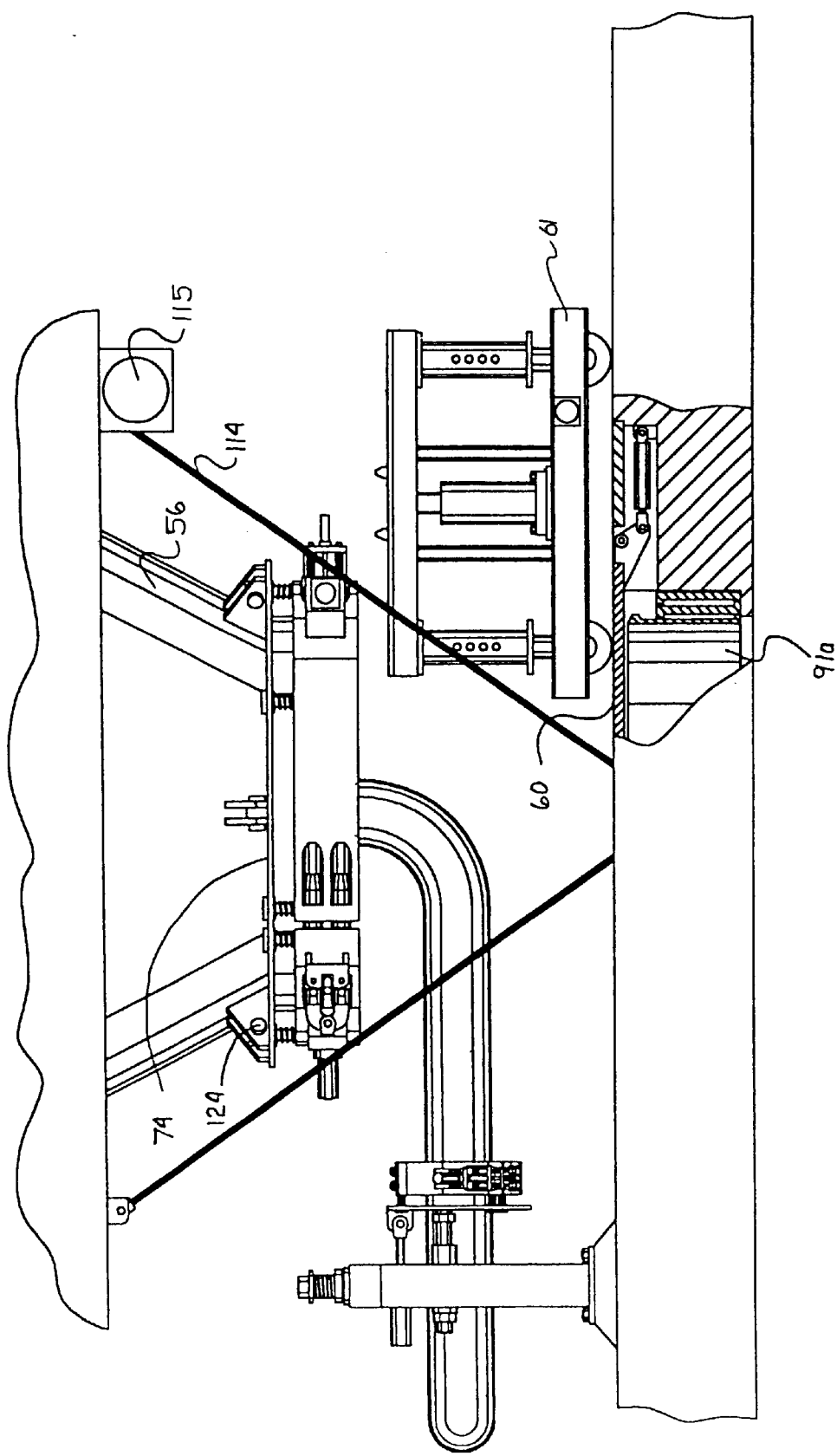
FIG. 20 is an elevation view of a preferred embodiment of an automated drum-bottom deheading system, shown in the closed position.

The guide passageways 46 and 50 may be part of a support plate 74 rather than in separate support frames 45 and 51. Support plate 74 is then mounted to one of the flange members 5 or 10 as discussed in upcoming paragraphs. FIG. 14 and FIG. 20 show alternate embodiments. In FIG. 20, support plate 74 is attached to vessel 56 by pins 124. The pins 44 and 49, the springs 48, and a support plate containing passageways 46 and 50 and, thereby the clamp segments 7, the clamp segment fastening devices 55, the remotely actuable powered drive members 27, the locking devices 33 and the remotely actuable powered locking devices actuators 41, could all be functionally assembled in a self-contained portable package, which could then be mounted or attached to flange members 5 or 10.

Figure 15:
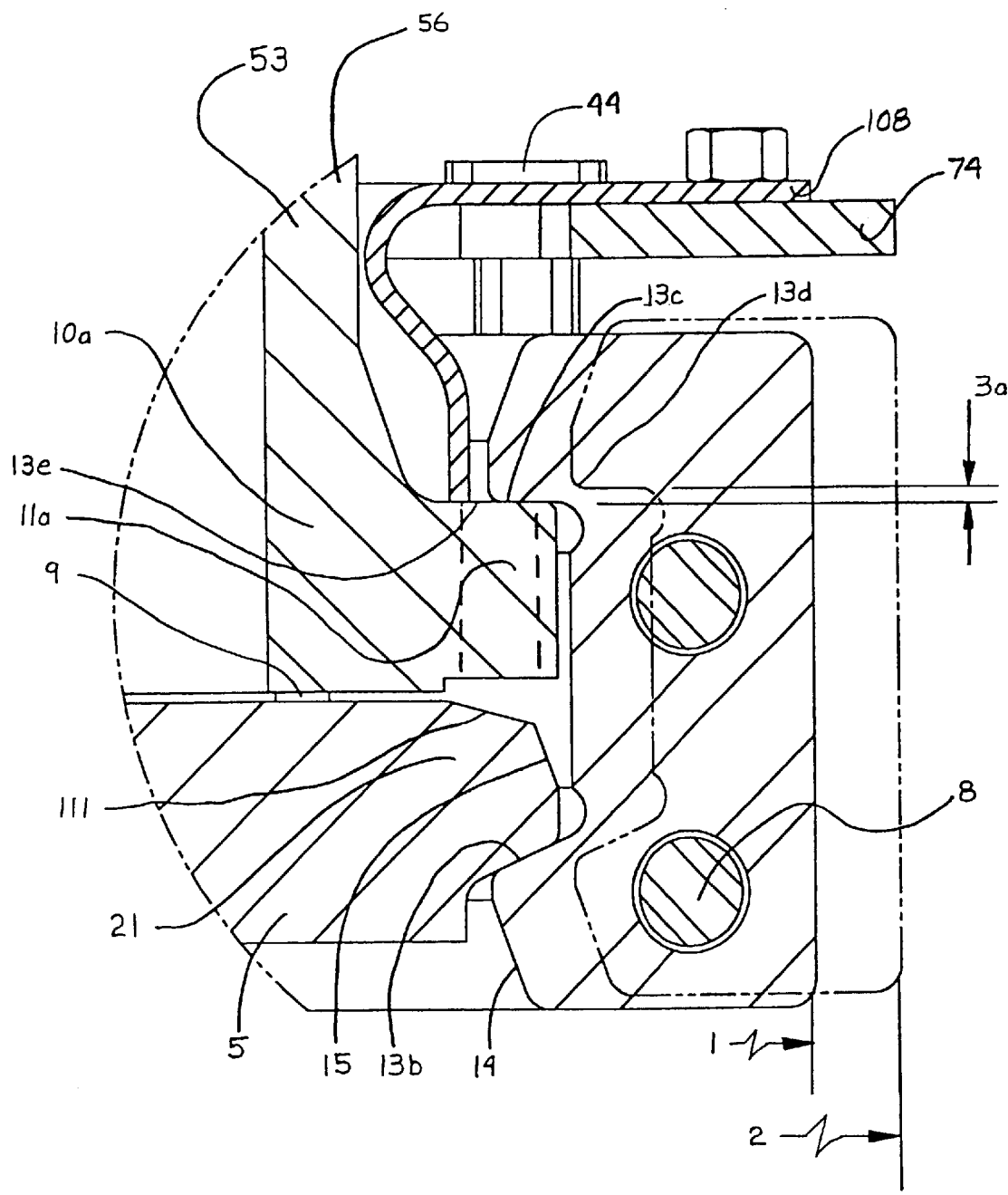

Referring to FIG. 14 and FIG. 15, the apparatus in these figures is substantially similar to the apparatus in FIG. 5. FIG. 14 is an illustration of how an embodiment is adapted to a manually bolted flanged member 10a. This embodiment is adapted to the flanged member 10a without the attachment of supports 45 or 51 to vessel 53, thereby eliminating the stress risers associated with this fabrication and their affect on the vessel 53. The abandoned bolt holes 110 of the manually bolted flanged member 10a are evident. In this embodiment the passageways 46 and 50 are adapted to a support plate 74 that, in this embodiment, is a continuous ring.

Spring members 108 interface flanged member 10a and support plate 74 and produce a clearance 3a by springing the clamp segments 7 vertically upward away from the flanged member 10a, assuring reliable positioning of clamp segments 7 relative to flanged member 10a. This further assures predictable remotely controlled operation between the open position to the closed position of the clamp segments 7.

Attachment 109 interfaces flange member 10a and spring members 108 to fix the placement of the spring members 108 to the flange member 10a. This embodiment can be installed between coking and decoking cycles, presenting very significant cost savings to coke drum owners.

Spillway 111 and make-up shoulder 13b on the clamp segment 7 facilitate removal of material from the vessel and create a self-cleaning engagement between all configurations of flange members and the various configurations of the clamp segments 7 when this area is flushed as the seal 9 is broken.

In an embodiment of the clamp segments 7 are adapted to make controlled contact ("CC clamp segments") at or about the midpoint of the clamp segment farthest away from the clamp segment fastening devices. These clamp segments 7 are predisposed to separate from flange members 5 and 10 at gaps 36 when unenergized by clamp segment fastening device 55. Clamp segment fastening device 55 forcibly and elastically flexes CC clamp segment 7 into engagement with the flange members. With CC clamp segments 7, the gaps 3, as shown in FIG. 9, quickly become significant at the ends of each clamp segment 7 when clamp segments 7 are opened as fastener 55 is loosened. When clamp segments 7 are loosened, the end segments of the clamp segments 7 initially flex radially outwardly away from the flange members 5 and 10. Each clamp segment 7 flexes about its midpoint farthest away from gaps 36. This causes gaps 3 to quickly become pronounced. This motion significantly reduces the distance the clamp segments 7 are required to move away from flange members 5 and 10, as can be measured by the required length of the passageways 46.

Compared to the mating of prior art clamp segments to substantially cylindrical flange members the present invention's CC clamp segments substantially reduce the distance the clamp segments 7 must move to open. Conical apexes of the conical contact surfaces 13 of CC clamp segments 7 mating with substantially cylindrically flanged members 5 and 10 are effectively close in the open position allowing the open position gaps 36 to be much smaller. Also, the initial contact area between the clamp segments 7 and flange members 5 and 10 is significantly greater than in the corresponding prior art mating components. Smaller open position gaps 36 result in cost saving because the components of the clamp segment fastening device 55 can be much shorter. The open perimeter of the clamp segments 7 is much smaller, saving space. Also frictional forces holding the clamp segments 7 onto the flange members 5 and 10 are partially overcome by the outwardly flexing action of the CC clamp segments 7 away from the flange members 5 and 10 when initially opened.

In an embodiment, clamp segments 7 are further adapted to maximize initial area contact between the flange members and the clamp segments 7. In this embodiment, CC clamp segments 7 connecting to the flange members 5 and 10 or 10a eliminate wear at the contact surfaces 13. When the CC clamp segments 7 are moved on and off the flange members 5 and 10, the contact stress on the surfaces 13 is significantly lowered because the contact area between the clamp segments 7 and flange members 5 and 10 is greatly increased.

Since the CC clamp segments 7 are resiliently flexed into engagement to close onto flange members 5 and 10, there exists a gap closing resistance force at gaps 36. This assures the remotely actuable powered drive members 27 associated with the clamp segment fastening devices 55 will move the clamp segments 7 substantially simultaneously and that a uniform closing resistance at the gaps between the segments is present.

Connectors 62, 63, and 88 are part of the total drum-bottom deheading system 5a, inlet pipe connecting system 72 and the drum-top deheading system 90, respectively.

The flange retaining clamp describes a device that is adapted to apply force to flange members to retain them. It has a channel shaped clamp segment 7 to mate to a flange member interface. It could also be applied without flange members. That is, the clamp segments may not have a channel shape. For example, it could be used to safely apply a substantially encompassing force to the outside of a substantially smooth pipe to seal a leaking hole in the pipe.

The components comprising the flange retaining clamp can be adapted to an optimized geometry and construction to produce the maximum strength to weight ratios. For example, the body of the clamp segments 7 could have locally reduced or removed sections. These locally reduced section could also be designed to improve the flexibility of the clamp segments 7.

Figure 16:
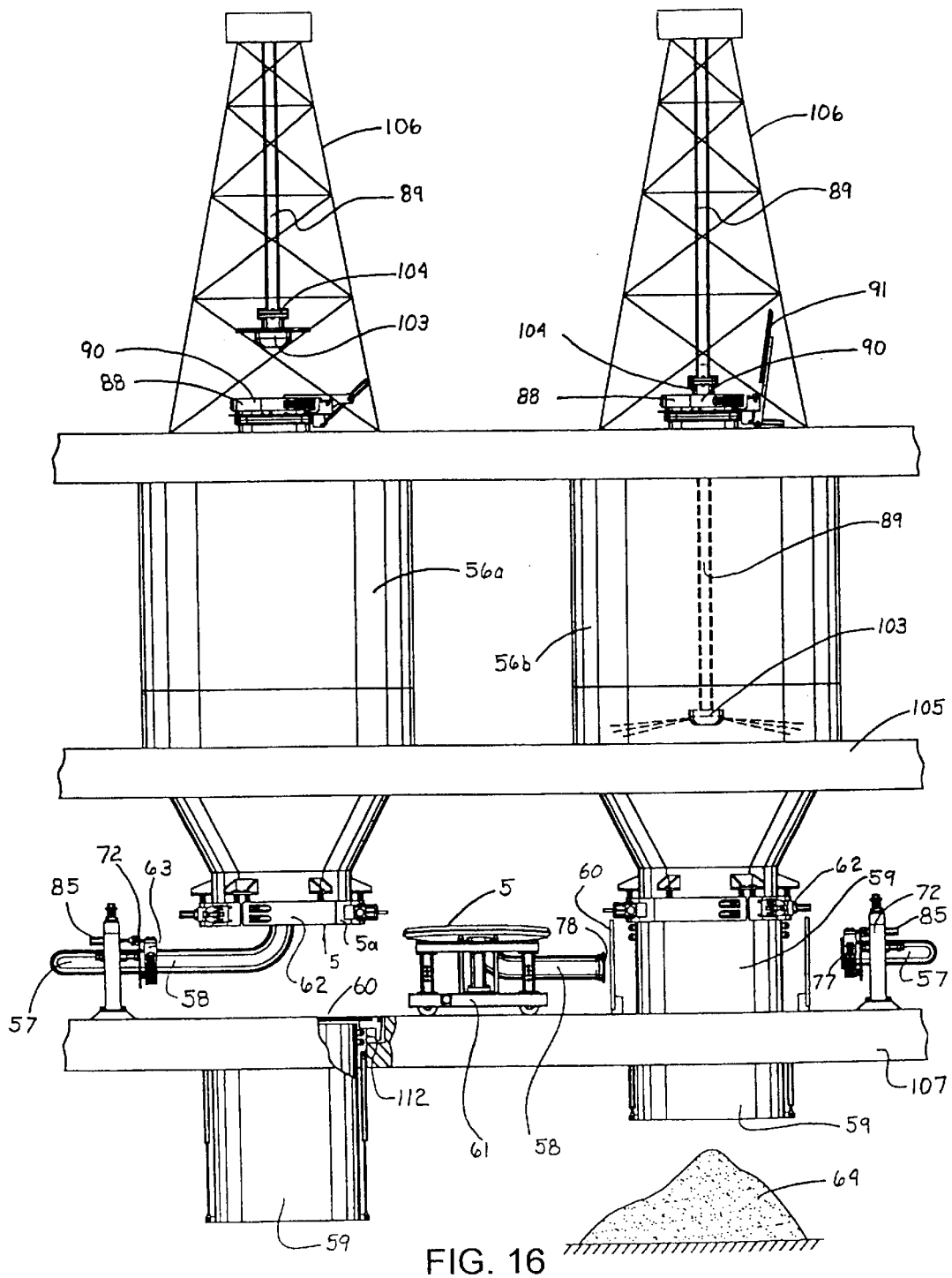
FIG. 16 is an elevation view of a coker, illustrating a preferred embodiment of automated coke drums with a drill rig atop, a preferred embodiment of an automated drum-top deheading system, a preferred embodiment of an automated inlet pipe connecting system, a preferred embodiment of an automated decoke chute and opening cover, and a preferred embodiment of an automated drum-bottom deheading system with a preferred embodiment of a closure transport.

Referring to FIG. 16, an embodiment is shown. The vessel structure of a coker unit is illustrated having a drilling rigs 106 shown above vessels 56a and 56b, a connector 88 at the top of vessels 56a and 56b, a drum-bottom deheading system 5a, between vessel support deck 105 and working surface 107.

Vessels 56a and 56b are utilized as containment vessels to isolate the coker's coking process from the external environment. The focus can apply to the transition between the coking process (joints closed) and the decoking process (joints open). Here, vessel 56a is coking and vessel 56b has been prepared for decoking.

Making a comparison between what is observed on vessel 56a to what is observed on vessel 56b facilitates understanding of the mechanical functions involved in preparing a vessel for coking, and in reverse, preparing a vessel for decoking.

Referring to vessel 56b, drill bit 103, attached to drill stem 89, is cutting coke 64 within vessel 56b; i.e. decoking. Flange member 91, liberated from vessel 56b by opening connector 88, is removed from the hole in the top of vessel 56b. Drill stem 89 is sealed to vessel 56b at drilling head 104, which is locked to drum 56b by closed connector 88. Loose coke 64 is falling through exit chute 59, that is attached to vessel 56b by closed connector 62. Opening cover 60 is swung open by the actuation of exit chute 59 toward vessel 56b. Flange member 5, liberated from vessel 56b by opening connector 62, is resting on closure transport 61, away from the opening in the bottom of vessel 56b. Connector 63 is open liberating flange members 77 and 78. Connector 63 and inlet pipe 57 are retracted back, further away from vessel 56b's longitudinal centerline by actuator 85.

Referring to vessel 56a, drilling head 104, liberated from vessel 56a by opening connector 88, is resting on extracted drill bit 103. Flange member 91, replaced to cover the hole in the top of vessel 56a, is locked to vessel 56a by closed connector 88. Opening cover 60, closed by the retraction of exit chute 59, covers hole 112 in working surface 107. Flange member 5, replaced to cover the hole in the bottom of vessel 56a by closure transport 61, is locked to vessel 56a by closed connector 62. Inlet pipe 57 and connector 63 are advanced closer to is vessel 56a's longitudinal centerline by actuator 85; whereby, flange members 77 and 78 are aligned and locked together by closed connector 63.

Imagine that vessel 56a has been coking (joints closed) for several hours, where inside vessel 56a extreme heat and moderate pressure has turned hydrocarbon residuum into lighter products and gradually filled with a much heavier residuum-coke 64. It should be noted that vessel 56 can be any other material containing vessel and the coke can be any other material in such a vessel. In the case of a coking vessel, lower temperature quench water is introduced into vessel 56a through inlet pipe 57 to dissipate the high heat in the huge volume contained by vessel 56a. As the heat is dissipated, the heavy residuum solidifies into harder coke 64. Vessel 56a is plugged with coke 64 that must be removed (decoking) before vessel 56a can return to coking.

In coking units vessel 56a is generally twenty four feet in diameter and one hundred feet high. A worker with an impact wrench manually opening connector 62 or 63 stands a good chance of being injured by the scalding water in the vessel or by fact that the self supporting nature of coke in the open "bottleneck" disposed at the bottom of vessel 56a could be compromised.

Safely decoking a vessel 56a or 56b involves: (1) opening and/or removing opening cover 60 which covers hole 112, serving as a coke 64 passageway through working surface 107, thereby creating an opening in working surface 107 for coke 64 to pass; (2) remotely aligning and engaging a closure mover to flange member 5, i.e. 61 or 113; (4) remotely energizing flange member 5 to the vessel with closure mover 61 or 113, or by some other method, (5) remotely unlocking and opening connector 63, thereby disconnecting and separating the joint between inlet pipe 57 and connector pipe 58; (6) remotely unlocking and opening connector 62, thereby disconnecting the joint between flange member 5 and the vessel; (7) remotely disengaging the flange member 5 from the vessel in a controlled manner; (8) remotely removing flange member 5 from the opening in the bottom of the vessel; (9) securing a passageway between the opening in the bottom of the vessel and hole 112 in working surface 107; i.e. exit chute 59; (10) remotely unlocking and opening connector 88 and removing flange member 91 away from the opening in the top of the vessel; (11) lowering drill bit 103 into the vessel through the opening in the top of the vessel; and (12) engaging drilling head 104 to connector 88, then remotely closing and locking connector 88, thus securing drilling head 104 to the vessel.

The foregoing functions prior to opening connector 62 or 63 could be performed locally, but for safety, any of the functions after either connector 62 or 63 is open and until all coke 64 is removed from vessel 56a should be remotely performed.

Once all of coke 64 is removed from vessel 56a or 56b they can be safely prepared for their return to the coking phase by: (1) removing drill bit 103 from the vessel and replacing flange member 91 to the vessel; (2) closing and locking connector 88, thereby locking flange member 91 to the vessel; (3) remotely decommissioning exit chute 59 or 59a and replacing opening cover 60, thereby covering hole 112 in working surface 107; (4) replacing flange member 5 and aligning it to cover the hole in the bottom of the vessel and locking it to vessel 56a by closing and locking connector 62; and (5) remotely aligning flange members 77 and 78 by activating actuator 85 and locking them together by closing and locking connector 63. Once a vessel has been cooled and decoked it poses much less of a hazard to workers. These five steps could be performed locally, however automatically controlled equipment, such as connectors 62, 63 and 88 will be helpful in reducing incident rates of injuries. All steps in preparing a vessel for coking or decoking are detailed more fully in this specification.

Figure 16A:
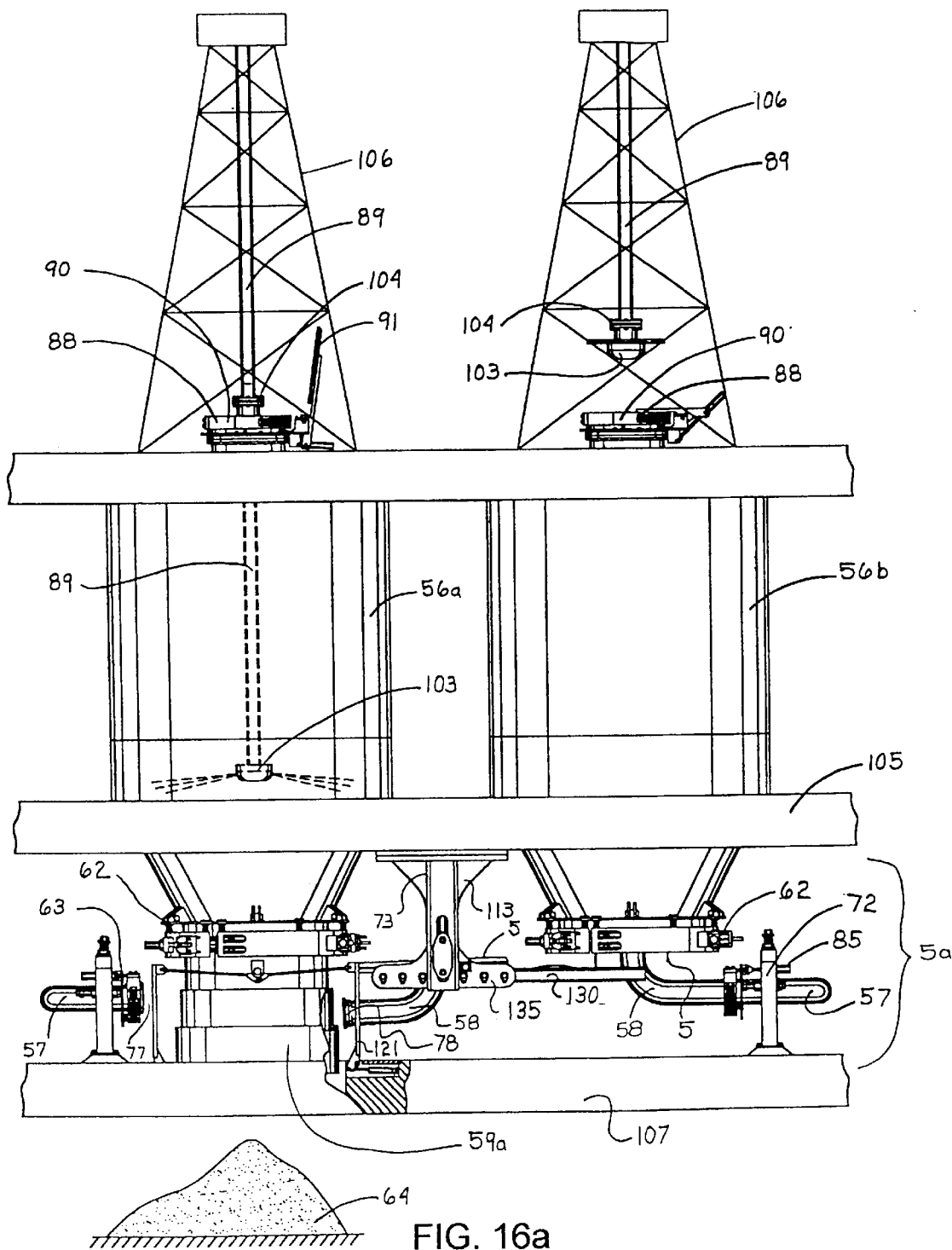
FIG. 16a, similar to FIG. 16, is an elevation view of a coker, illustrating a preferred embodiment of automated coke drums with a drill rig atop, a preferred embodiment of an automated drum-top deheading system, a preferred embodiment of an automated inlet pipe connecting system, a preferred embodiment of an automated decoke chute and opening cover, and a preferred embodiment of an automated drum-bottom deheading system with a preferred embodiment of a closure transport.

Referring to FIG. 16a, one embodiment is shown. Here, vessel 56a is being prepared for decoking and vessel 56b has been prepared for coking.

The major difference in FIG. 16a compared to FIG. 16 is that closure transport 61 is replaced by closure transport 113. Also, another feature present is deploying telescoping exit chute 59a.

Referring to vessel 56a, connector 63 is expanded to the open position, thereby liberating flange members 77 and 78, unlocking inlet pipe 57 from vessel 56a. Connector 63 and inlet pipe 57 are retracted back further away from vessel 56a. Closure transport 113 has already captured flange member 5 as connector 62 was unlocked and expanded to its present open position. Now flange member 5, having been lowered and retracted by closure transport 113, rests on it away from the opening in the bottom of vessel 56a, thereby allowing deployment of exit chute 59a. Exit chute 59a is being remotely lifted and aligned to flange member 10 disposed on vessel 56a. Connector 62 will eventually close and lock exit chute 59a to vessel 56a.

Vessel 56b having been completely remotely closed and connected to the inlet pipe 57 is coking (joints closed).

Figure 17:
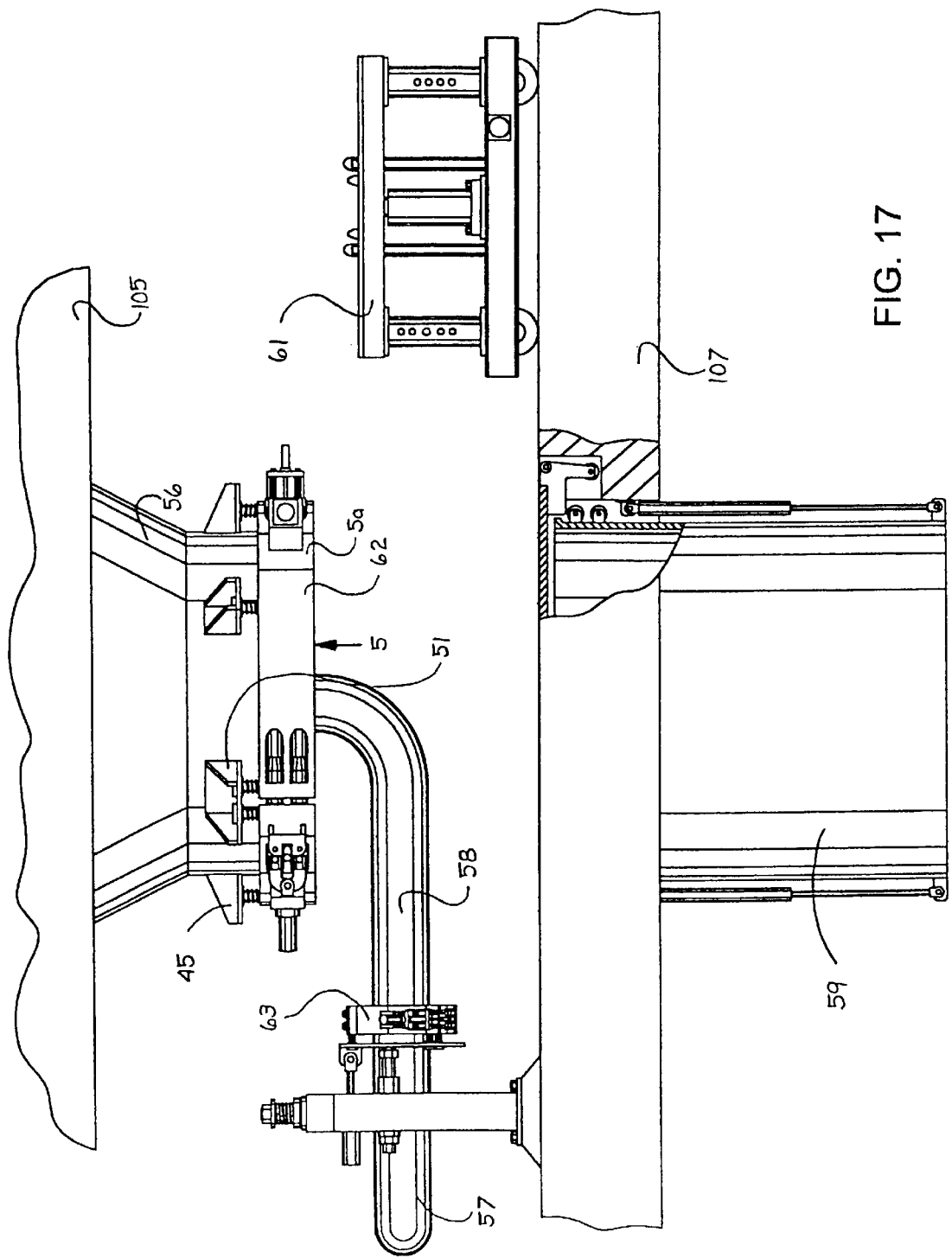
FIG. 17 is an exploded elevation view of a preferred embodiment of an automated drum-bottom deheading system, shown in the closed position.
Figure 18:
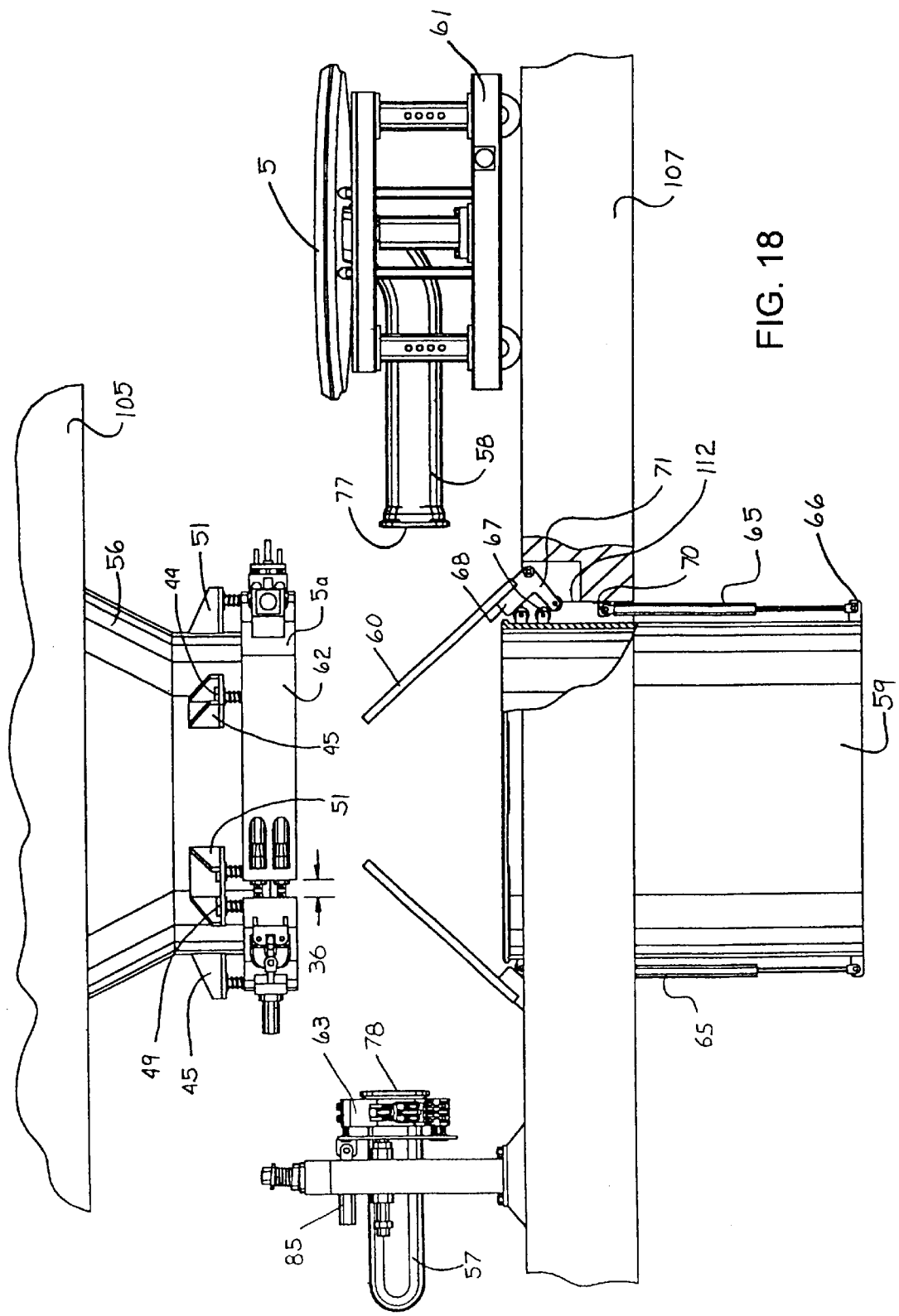
FIG. 18 is an exploded elevation view, similar to FIG. 17, showing a preferred embodiment of a automated drum-bottom deheading system in the open position. The view has a partial section view, illustrating the decoke chute and movable opening cover interacting as the decoke chute ascends out of the working surface to meet the coke drum.

Referring to FIG. 17 and FIG. 18, exit chute 59 is raised from its position in working surface 107 to join vessel 56. As exit chute 59 is raised, opening cover 60 is activated by the motion of exit chute 59 and opens, allowing the exit chute 59 to travel to the vessel 56. In an embodiment opening cover 60 comprises grating, but it could be comprised of any type of decking material.

In FIG. 18, connector 62 is expanded to the open position allowing it to align, capture and lock exit chute 59 to vessel 56. When connector 62 is expanded to the open position the weight of connector 62 is supported by guide pins 44 and 49 that interface with clamp member supports 45 and 51. Clamp member supports 45 and 51 are in turn attached to vessel 56.

In the opposite transition, exit chute 59 is lowered into working surface 107, as shown in FIG. 17. As exit chute 59 is lowered, it makes contact with opening cover 60 causing the cover to close flush with working surface 107. When opening cover 60 is flush with the working surface 107, closure transport 61 moves flange member 5 to a position where it could be connected to vessel 56. After the joint is connected by connector 62, the joint between connecting pipe 58 and inlet pipe 57 is secured by the inlet piping connector 63.

Referring to FIG. 17, an embodiment of the drum-bottom deheading system 5a is shown in the closed position. The drum-bottom deheading system 5a is the complete system that prepares vessel 56's drum bottom for coking or decoking.

The joint between vessel 56 and flange member 5 is securely connected by connector 62. The joint between the connecting piping 58 and inlet pipe 57 is securely connected by connector 63. The exit chute 59 is positioned in working surface 107 and opening cover 60 is flush with the surface of working surface 107.

Figure 19:
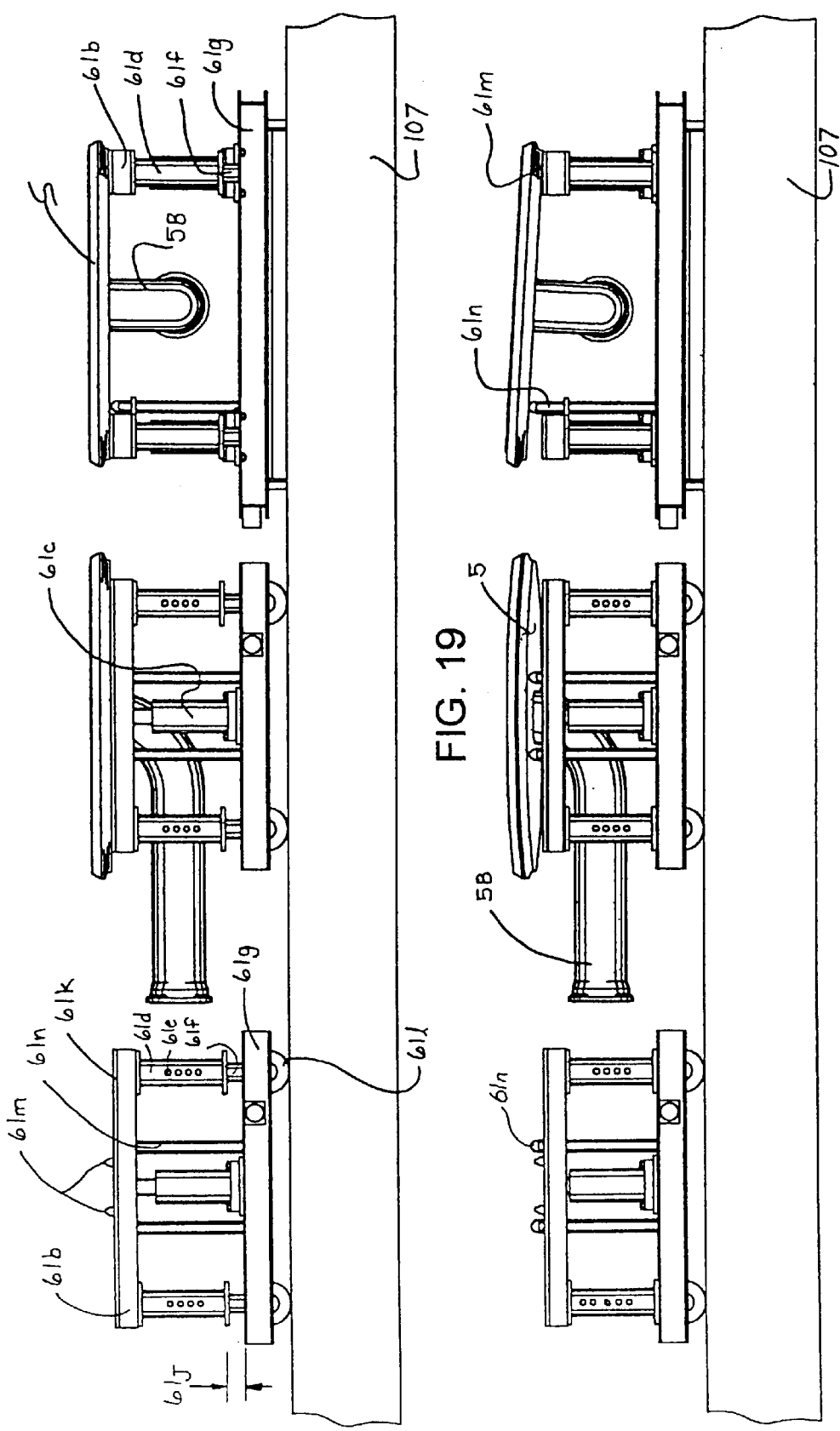
FIG. 19 is a side view of a preferred embodiment of a closure transport shown in the raised position.

A mechanism for moving the closure to and from the vessel is detailed in FIG. 19 and FIG. 19a. The closure transport has a table or surface for supporting the vessel closure. In an embodiment, closure transport 61 has a base 61g that acts as a rigid structural frame. Attached to base 61g are a plurality of wheels 61h, a plurality of wheel drivers 61l, a plurality of stabilizing poles 61f, and a plurality of elevators 61c. Closure transport 61 separates along gap 61j. In an embodiment, elevators 61c are a plurality of hydraulic cylinders that change the magnitude of gap 61j. The function of elevators 61c could also be completed using a single elevator. The motion allows closure transport 61 to translate flange member 5 vertically upward and downward. The vertical movement allows flange member 5 to move relative to stationary vessel 56. This allows flange member 5 to be lowered sufficiently so that flange member 5 can clear connector 62. Elevator 61c can be designed such that it can force flange member 5 against vessel 56 with enough force to overcome the loads imposed on flange member 5 by the contents of the vessel 56. This causes a sealing barrier to be imposed between flange member 5 and flange 10 disposed on vessel 56.

A plurality of rails 61b are attached to the plurality of sleeves 61d at the top of the sleeves 61d. Cross-members provide structural rigidity by cross-linking sleeves 61d at the bottom of the sleeves 61b. The sleeves 61b form a male to female fit with stabilizer poles 61f to assure a uniform change in gap 61j, at each individual stabilizer pole 61f location, as elevator 61c is activated, thus stabilizing the vertical separating motion of closure transport 61. Locking pins, not shown, can be inserted through sleeves 61d and stabilizer poles 61f at locations 61e, thus manually locking the gap 61j to a desired position.

When activated, a plurality of wheel drivers 61l, linked to wheels 61h, causes closure transport 61 to translate horizontally and guides it to and from vessel 56's longitudinal centerline, positioning flange member 5's centerline relative to vessel 56's longitudinal centerline.

In an embodiment, closure transport 61 is a wheeled cart that travels along rails, not shown, sunk into working surface 107. Closure transport 61 also provides a vertical motion to force the loaded flange member 5 to a completely sealed position against vessel 56.

In an embodiment, closure transport 61 contains a tilter. This tilter variably tilts flange member 5 with respect to flange member 10. This is particularly useful to control the magnitude and direction of flow of loose coke and quench water from the vessel 56. Here tilters 61n, attached to base 61g, engage flange member 5 in a manner that lifts one side of flange member 5 from surface 61k when surface 61k's elevation is below the top of tilters 61n, as shown in FIG. 19a. Tilters 61n can be of any construction and could be detached from base 61g and separately remotely actuated.

When closure transport 61 is elevated as shown in FIG. 19, the top of tilters 61n are below surface 61k, thereby allowing flange member 5 to be parallel to surface 61k. This is useful because flange member 5 should be parallel to flange member 10 when the vertical motion of cover transport 61 forces flange member 5 against flange member 10.

As the elevation of surface 61k is lowered, the tilters 61n start to make contact with flange member 5, tilting it relative to surface 61k. The vertical motion of the closure transport 61 will vary the degree of tilt, thus controlling the magnitude and direction of the flow of loose coke and quench water from vessel 56.

Some cokers use rail cars to carry loose coke 64 away but, the volume of coke is much larger than the capacity of one rail car. The flow of coke must be regulated as new rail cars move into position under the vessel 56.

To prevent flange member 5 from falling off closure transport 61, tilters 61n and pins 61m interface flange member 5 in a pin 19 and box 22 arrangement, such as shown in FIG. 3.

Remotely controlled closure transport 61 is adapted to control the magnitude and direction of the flow of material from vessel 56 using only the elevators 61c. No local intervention is required, and is then safer than other types.

It should be noted that flange member 5 can also be pivoted in a swinging motion away from vessel 56. Or, alternatively, flange member 5 can also be horizontally translated along rails attached to vessel 56 by an elevator that moves the rails in a vertical direction, thus positioning bottom closure 5 against or away from vessel 56.

Turning now in more detail to the coke unloading system and referring to FIG. 18, an embodiment of the drum-bottom deheading system 5a is shown in the open position. Exit chute 59, which is shown partially extended out of working surface 107, illustrates the relationship between the exit chute 59 and the opening cover 60. In normal decoke position, exit chute 59 completes an enclosed coke passageway from vessel 56 to working surface 107 to allow coke 64 to be evacuated from vessel 56. The joint between the connecting pipe 58 and inlet pipe 57 is disconnected since inlet piping connector 63 is in the open position. Inlet pipe 57 and connector 63 are retracted back further away from the longitudinal centerline of vessel 56 by actuator 85. The joint between vessel 56 and flange member 5 is also disconnected. Connector 62 is expanded to the open position, thus allowing flange member 5 to be disjoined. Flange member 5 is removed from vessel 56 and rests on closure mover 61, thus clearing an opening at the bottom of vessel 56 to be enclosed by exit chute 59. As shown, gap 61j can become nil, such that the top portion of closure transport 61 firmly rests on the bottom portion of the closure transport 61.

In an embodiment, actuator 65 is remotely activated to power movement of exit chute 59 in the vertical direction. Actuator 65 is attached to exit chute 59 at location 66 and to working surface 107 at anchor 70. An embodiment incorporates hydraulic cylinders as actuator 65. Although not shown, the actuator 65 could be any plausible actuator having different benefits, such as a cable or chain wench.

As exit chute 59 travels in the upward vertical direction, upper chute rollers 67 contact floor plates 68, attached to movable opening covers 60, causing the covers 60 to pivot about pivot 69 until covers 60 completely swing away, allowing passage of the exit chute 59 to the vessel 56. As exit chute 59 is moved close to vessel 56, rollers) could be attached to ends 71 of floor plates 68 and to anchors 70 to guide the motion of exit chute 59 to a position that creates a enclosed path from the vessel 56 to the working surface 107. The rollers, attached to the ends 71, would act as positive stops limiting the motion of covers 60, thus disallowing over pivoting of covers 60 in the opening direction.

In a reverse manner, as exit chute 59 descends, lower chute rollers 67 contact floor plates 68 at ends 71 causing covers 60 to pivot about pivot 69 until covers 60 become flush with the surface of working surface 107, as shown in FIG. 2. Further, covers 60 and floor plates 68 are designed to allow covers 60 to be manually opened while exit chute 59 remains in working surface 107. Exit chute 59 will have provisions for secondary manual operation in order to backup remotely operable actuator 65.

The benefit of this remotely controlled exit chute deployment is that exit chute actuators 65 can also actuate opening cover 60. No local intervention is required Also, in a similar manner, exit chute 59 or 59a is remotely deployed, aligned and locked to vessel 56.

In FIG. 20 vessel 56 is being prepared for decoking. This depicts another remotely operable deployment embodiment of exit chute 59a and, if present, the deployment of opening cover 60. Here a single actuator, draw works 115, replaces the plurality of actuators 65 of FIG. 18, simplifying drum-bottom deheading system 5a. Exit chute 59a is a telescoping version of exit chute 59. Actuators 116 are shown but are not required. At least one line "cable" 114, controlled by draw works 115, interfaces exit chute 59a. As draw works 115 draws in cable(s) 114 exit chute 59a elevates upward to vessel 56.

The opening cover 60 can be made to interface exit chute 59a as discussed earlier. It can also be activated by actuators 116.

Figure 21:
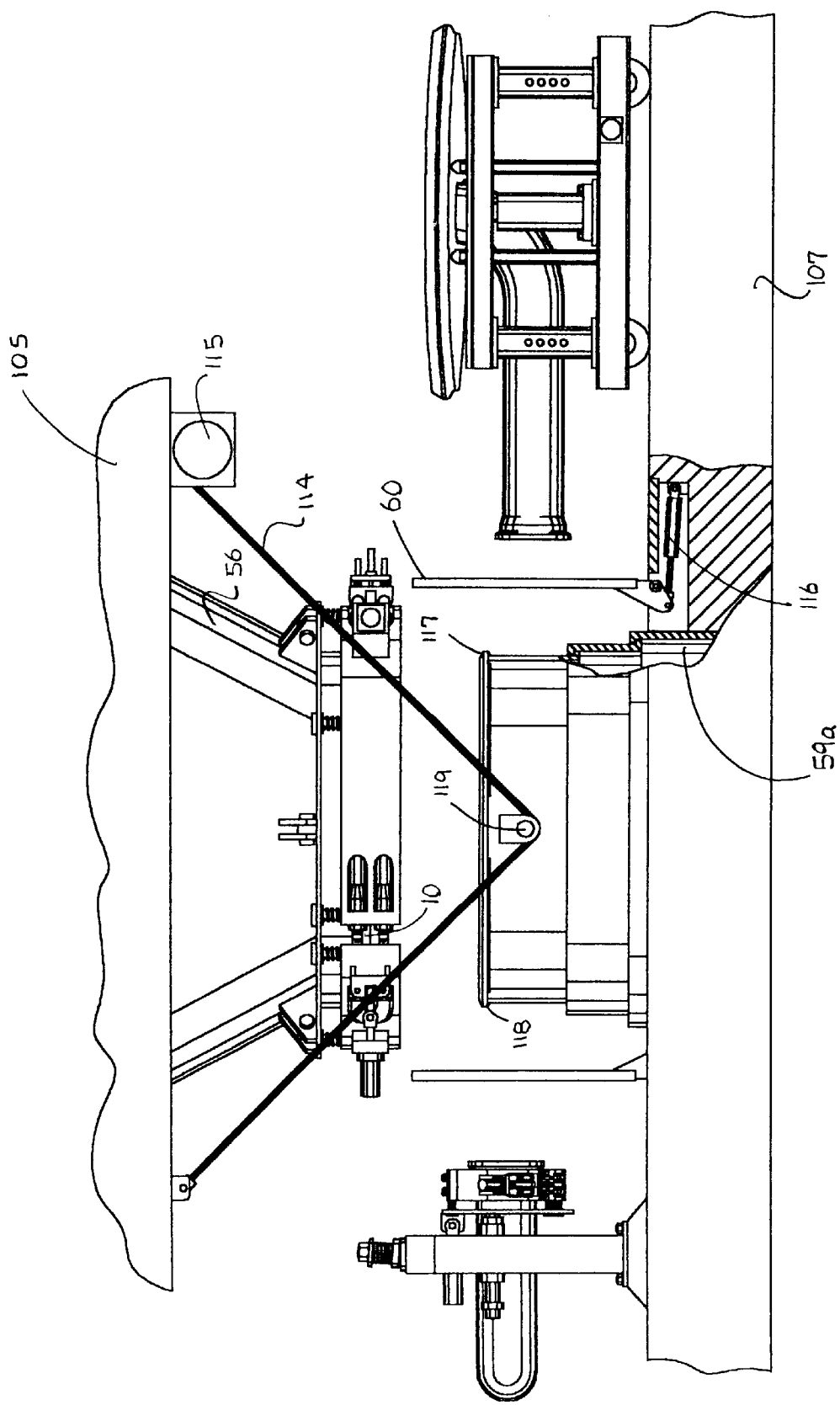
FIG. 21 is an elevation view of a preferred embodiment of an automated drum-bottom deheading system. It illustrates actuation of FIG. 20. Here, coke drum 56 is being prepared for decoking; whereby, connector 62 is expanded to the open position awaiting the capture of the decoke chute, as it is raised by the draw works.

FIG. 21 further illustrates the deployment of exit chute 59a and, if present, the deployment of opening cover 60, and the function of cable(s) 114, draw works 115 and actuator 116.

Exit chute 59a is depicted in an elevated position and on its way to mate with flange member 10. Remotely actuated draw works 115 is shortening the active length of cable(s) 114, which interfaces exit chute 59a at a plurality of saddles 119 spaced about exit chute 59a, thus causing it to rise. Saddles 119 can comprise rollers. Especially beneficial is the flexible and self-centering nature of this embodiment. Its self-centering nature evolves as the force of gravity tends to cause the exit chute to be located at the lowest elevation of cable(s)114. This assures exit chute 59a is relatively concentric with vessel 56 and, therefore, connector 62. As exit chute 59a approaches opened connector 62, taper 117 interfaces taper 14 on clamp segments 7. The flexibility of cables 114 allow the gross aligning of exit chute 59 or 59a to a position indicative of allowing connector 62 to close around the flange hub end 118 of exit chute 59. The inherent nature of the connecting behavior predicts reliable connection of the exit chute 59 or 59a to the vessel 56.

When connector 62 closes, the tapered make-up shoulder 13b of the clamp segments 7, together with the tapered flange hub end 118, allow connector 62 to capture and secure a substantially misaligned exit chute 59 or 59a. This capturing nature is especially useful because it assures the reliability of the remote connecting of exit chute 59 or 59a to vessel 56. It equally applies to the embodiments illustrated in FIG. 21a and FIG. 21b, FIG. 21c, FIG. 21d, FIG. 21e, and FIG. 22.

Opening cover 60 can be adapted to interface exit chute 59a; whereby, both can be deployed and decommissioned by a single draw works 115.

Heretofore, no prior art remotely locks a exit chute to the vessel 56 and, therefor, they are semi automated and unsafe.

Cable(s) 114 can be drawn upward out of the way of workers by locally disengaging cable(s) 114 from saddles 119 when it is safe to do so. This local step can also be performed remotely. One embodiment illustrates this remote function in FIG. 21a, FIG. 21b, FIG. 21c and FIG. 21d. FIG. 22 illustrates another exit chute deployment requiring no local intervention.

Exit chutes 59 or 59a can further be comprised of a flange hub end 118 allowing connector 62 to align and secure it to vessel 56. Remotely controlled deployment, alignment, and locking of exit chute 59a to vessel 56 is much safer than in previous versions.

Figure 21A:
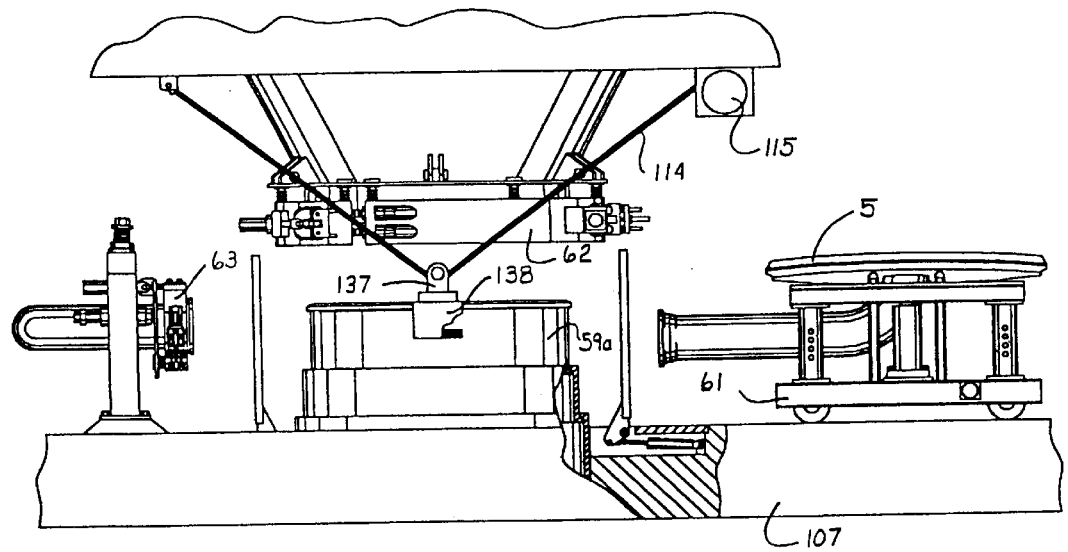
FIG. 21a is an elevation view of a preferred embodiment of an automated drum-bottom deheading system similar to FIG. 21. Here, the decoke chute is deployed by a actuable magnet riding on cable(s) 114. Coke drum 56 is being prepared for decoking.
Figure 22:
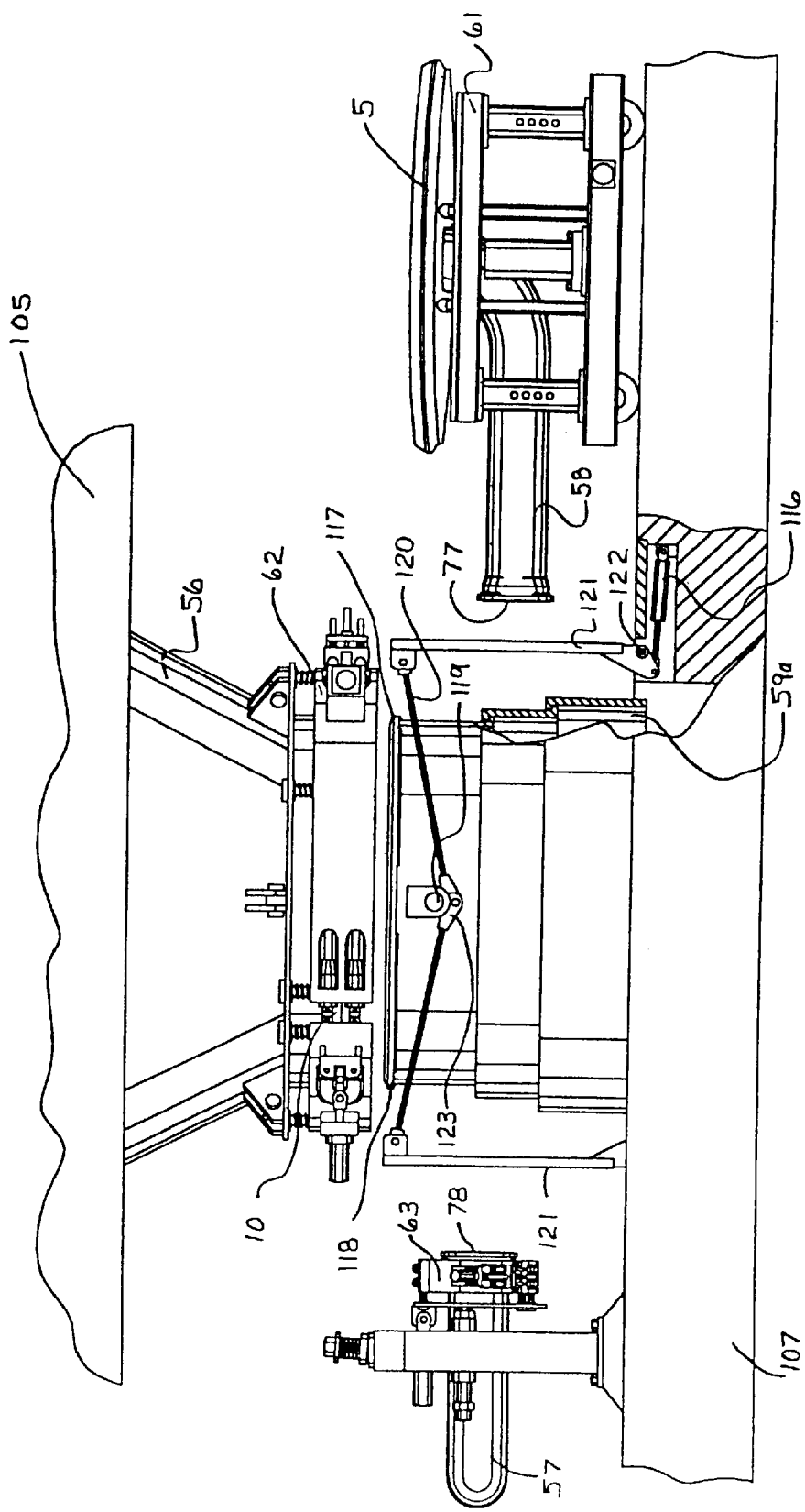
FIG. 22 is an elevation view of a preferred embodiment of an automated drum-bottom deheading system. Here, coke drum 56 is being prepared for decoking; whereby, connector 62 is expanded to the open position awaiting the capture of the decoke chute, as it is raised by actuators 116. Flange member 5 is resting on closure transport 61. Here, the opening cover and decoke chute can be deployed by the same actuators.

FIG. 21a, substantially similar to FIG. 21, further illustrates another embodiment concerning the deployment of exit chute 59a and, if present, the deployment of opening cover 60, and the function of cable(s) 114, draw works 115 and actuator 116.

Exit chute 59a is depicted as elevated and on its way to mate with flange member 10. Remotely actuated draw works 115 shortens the active length of cable(s) 114, which interfaces exit chute 59a via at least one energizable magnet 137 that interfaces exit chute 59a at a plurality of chute pads 138 spaced about exit chute 59a. This shortening of the cable causes exit chute 59a to rise.

A chute pad 138 is partially cutaway to illustrate its attachment to exit chute 59a. Its construction allows draw works 115 to pull exit chute fully up to flange member 10.

Opening cover 60 can be adapted to interface exit chute 59a; whereby, both can be deployed and decommissioned by a single draw works 115.

Figure 21B:
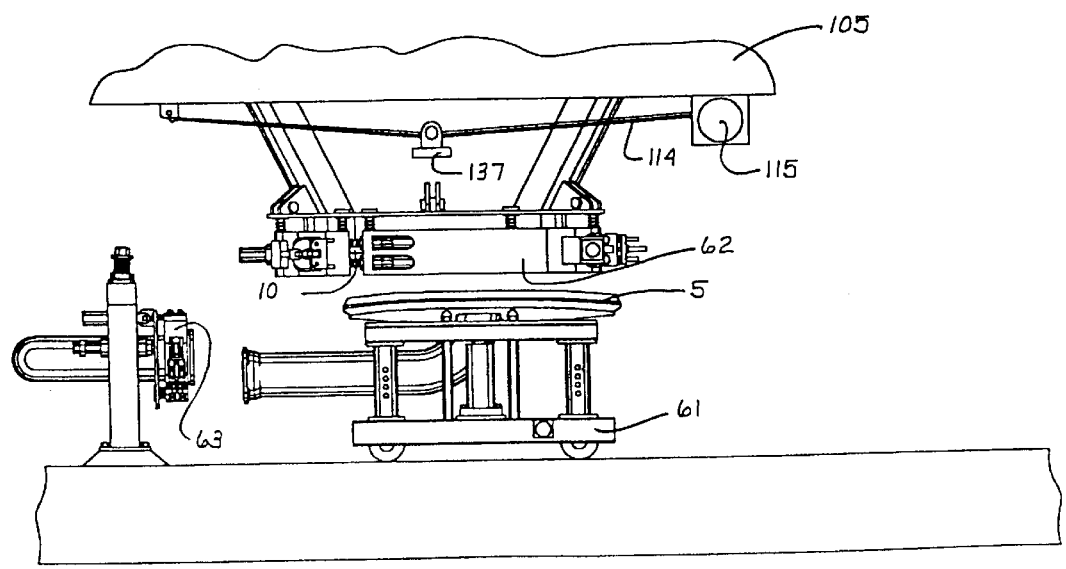
FIG. 21b is an elevation view of a preferred embodiment of an automated drum-bottom deheading system similar to FIG. 21 and FIG. 21a. Here, the actuable magnet is stored out of the way of workers. Coke drum 56 is being prepared for coking; wherein, closure transport 61 is moving flange member 5 into position for connector 62 and 63 to connect the inlet pipe to the coke drum.

FIG. 21b shows magnet 137, exit chute 59a, and opening cover 60 in a decommissioned state with no local intervention.

The magnet 137 of FIG. 21a and FIG. 21b interfaces cable 114 in a roller contact, thereby allowing magnet 137 to center itself at the midpoint of cable 114 and align itself to chute pad 138.

Figure 21C:
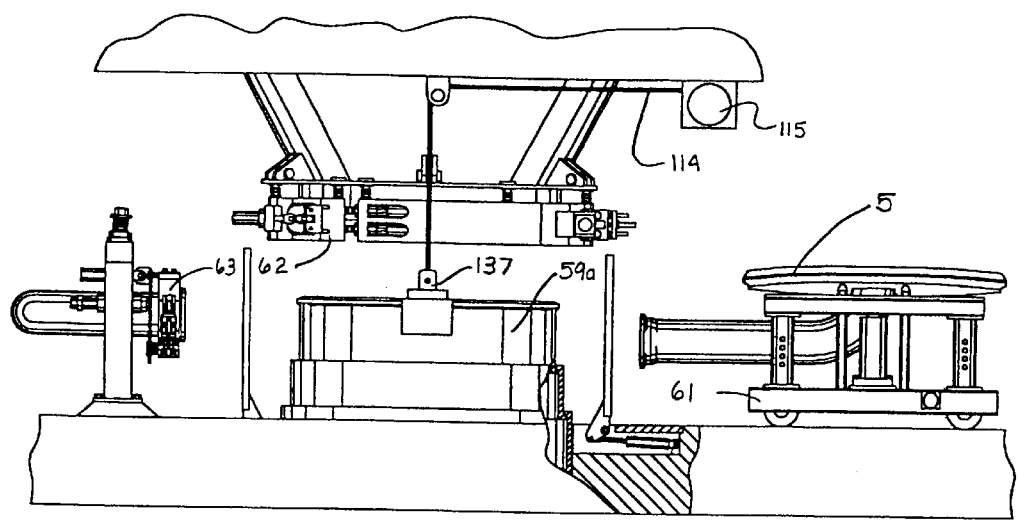
FIG. 21c is similar to FIG. 21a. Here a different magnet actuation is shown.
Figure 21D:
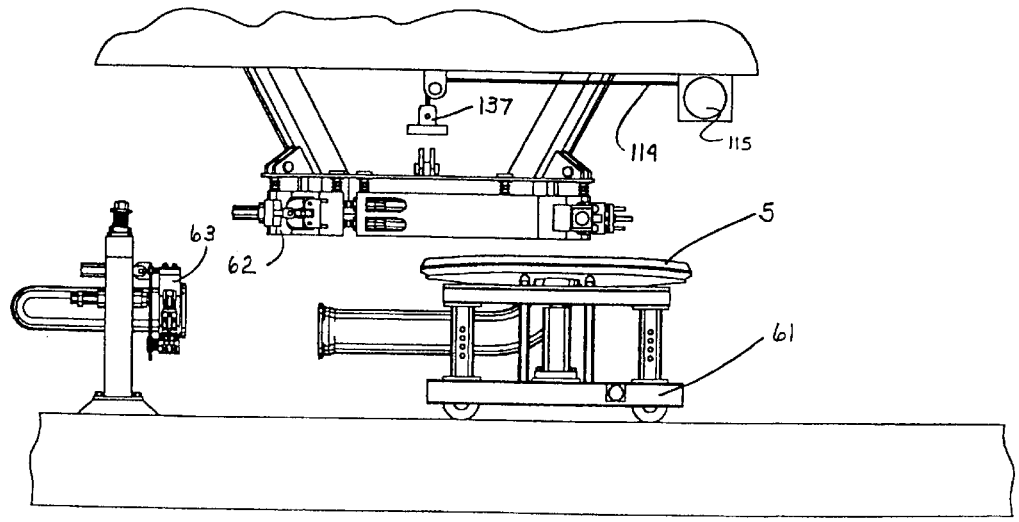
FIG. 21d is similar to FIG. 21b. Here a different magnet actuation is shown.
Figure 21E:
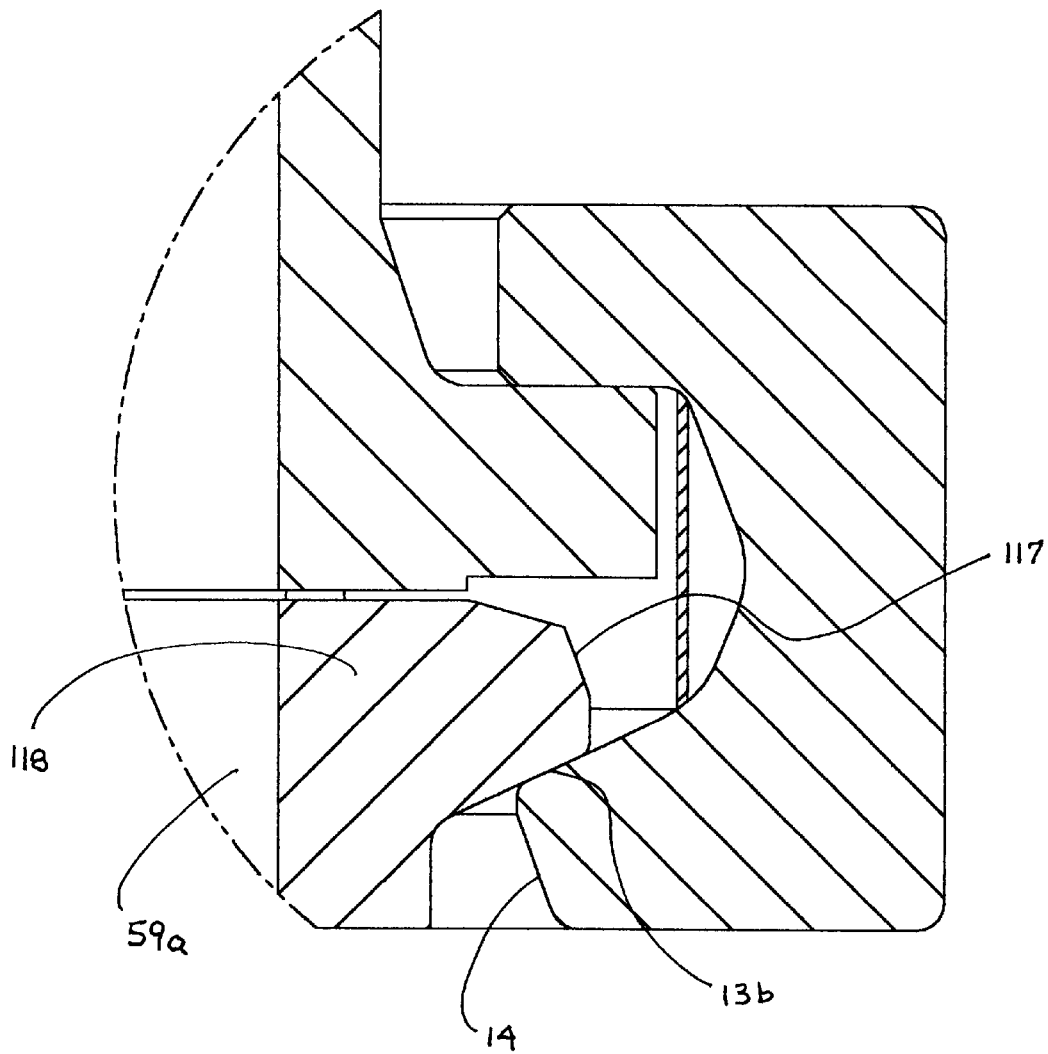
FIG. 21e is a partial exploded section view showing connector 62 capturing the decoke chute and connecting it to the vessel.

FIG. 21c and FIG. 21d, substantially similar to FIG. 21a and FIG. 21b respectively, illustrate another embodiment. Magnets 137 are simply attached to the ends of cable 114 and remain flexible.

A benefit of the remotely controlled deployments and decommissionings of exit chute 59a and, if present, the deployment of opening cove 60, is that exit chute 59a and opening cover 60 actuators can function with the same actuators. In addition, a single draw works 115 can deploy both exit chute 59a and opening cover 60, replacing numerous exit chute actuators and opening cover actuators. This saves expense and maintenance. In FIG. 22 the drum-bottom deheading system 5a is similar to the one shown in FIG. 21. Vessel 56 is being prepared for decoking in this depiction that illustrates another remotely controlled deployment, alignment, and locking of exit chute 59a to vessel 56, and if present the remotely controlled deployment of opening cover 60. The remote functioning of the cable(s) 114 and draw works 115 of FIG. 21 are replaced by cable(s) 120 and hinge extensions 121 of hinge 122. Cable(s) 120 interface exit chute 59a at a plurality of saddles 119 spaced about exit chute 59a. When actuators 116 swing hinge extensions 121 upward toward vessel 56. The cable(s) 120 emerge from their resting area below the surface of working surface 107. As the midpoint apparatus 123 on cable 116 rises with the actuation of hinge extensions 121, they contact saddles 119 disposed on exit chute 59a elevating it towards vessel 56 in a flexible, self-aligning manner.

Exit chute 59a is partially elevated by actuators 116 and will interface to connector 62. It will be aligned and locked to vessel 56 as previously described. Actuators 116 cause hinge extensions 121 to pivot about hinge 122 and force is transmitted through hinge extensions 122 and to cable(s) 120. Hinge extensions could comprise any type of construction including a grated opening cover or simple poles that can open outside of the envelope containing connector 62. Cable(s) 120, interfacing saddle 119, are connected to opposing hinge extensions 121. These swing upward toward connector 62, thereby raising exit chute 59a to meet flange member 10. When connector 62 closes about flange members 10 and 118, exit chute 59a is aligned and locked to flange member 10 disposed on vessel 56.

A difference between this embodiment and that shown in FIGS. 20 and 21 is the nature of cable(s) deploying and decommissioning. Cable(s) 120 recess themselves below the surface of working surface 107 when actuators 116 are activated to lower exit chute 59a and, if present, close opening cover 60. Cable(s) 120 can be weighted and/or spring biased by device 123 to close opposite ends of cable 120, near or about device 123, assuring the remotely operable nature of their decommissioning and deployment.

A benefit of this remotely controlled deployment of exit chute 59a and, if present, the deployment of opening cove 60, is that separate exit chute 59a and opening cover 60 actuators are not required. Further this system stores itself below the surface of working surface 107 out of the way of workers, and no local intervention is required.

Figure 23:
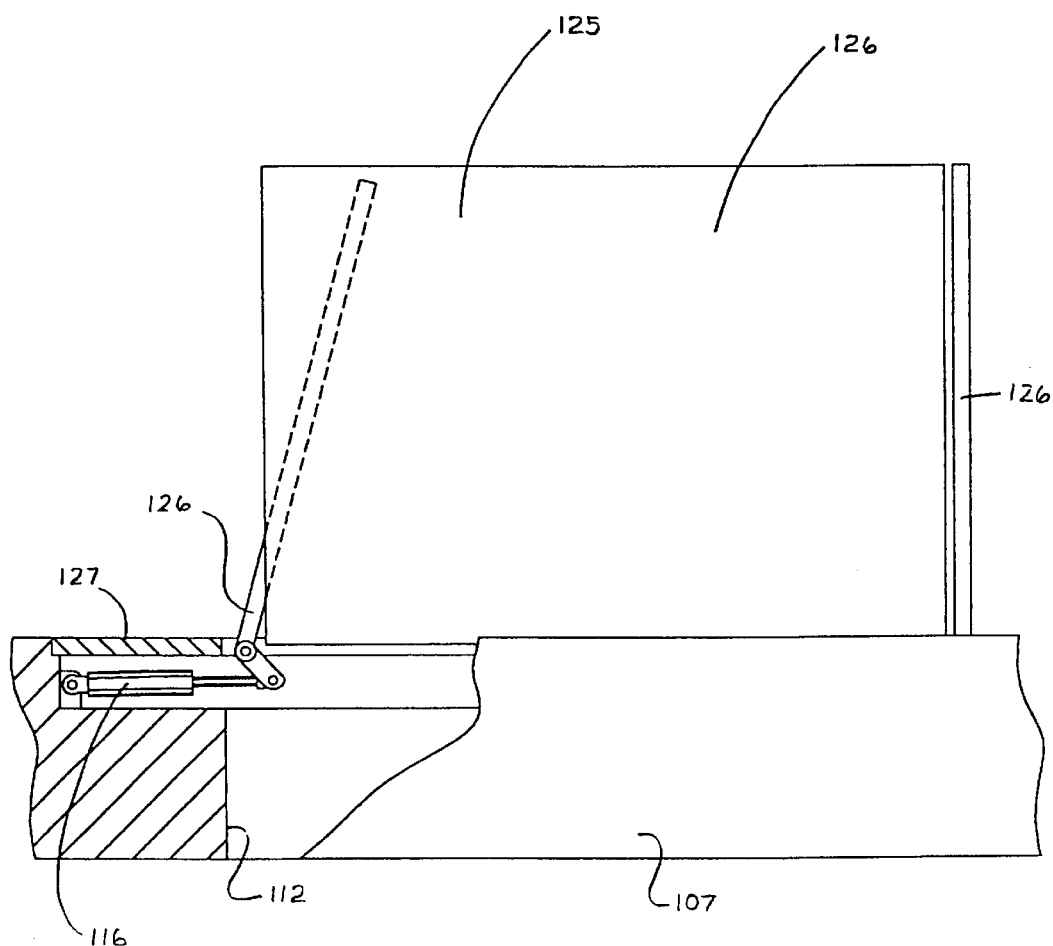
FIG. 23 is an elevation view of a deploying opening cover that comprises a plurality of layered floor plates. When this system is deployed, the floor plates create a passageway for coke to traverse. A swinging flange member 5 could comprise one side of this passageway.

FIG. 23 shows an alternate opening cover 125 being remotely deployed. Opening cover 125, deployed by at least one actuator 116, is comprised of at least one floor plate 126. A plurality of floor plates 126, layered when decommissioned, can be deployed forming a partial or full passageway between working surface 107 and vessel 56 allowing loose material to pass.

This embodiment is particularly useful when it is associated with a closure transport that tilts or swings, thereby controlling the direction of the flow of material from vessel 56 against floor plates 126 and down hole 112.

Figure 29:
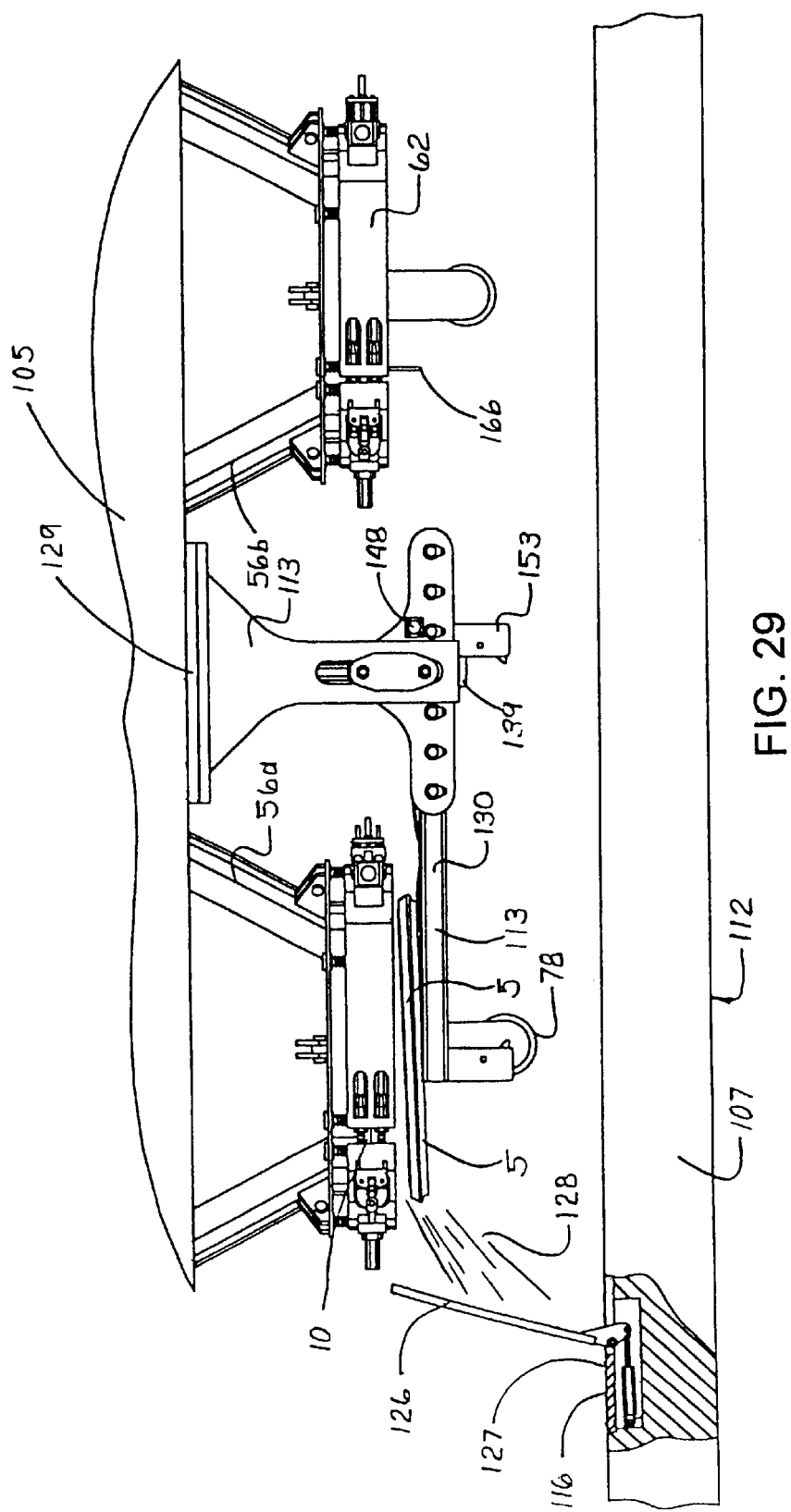
FIG. 29 is an elevation view, partially sectioned, of a coker illustrating the interaction of a closure transport with respect to a pair of coke drums. In this preferred embodiment of the present invention, coke drum 56a is being prepared for decoking. The inlet pipe connecting system is removed for clarity.
Figure 29A:
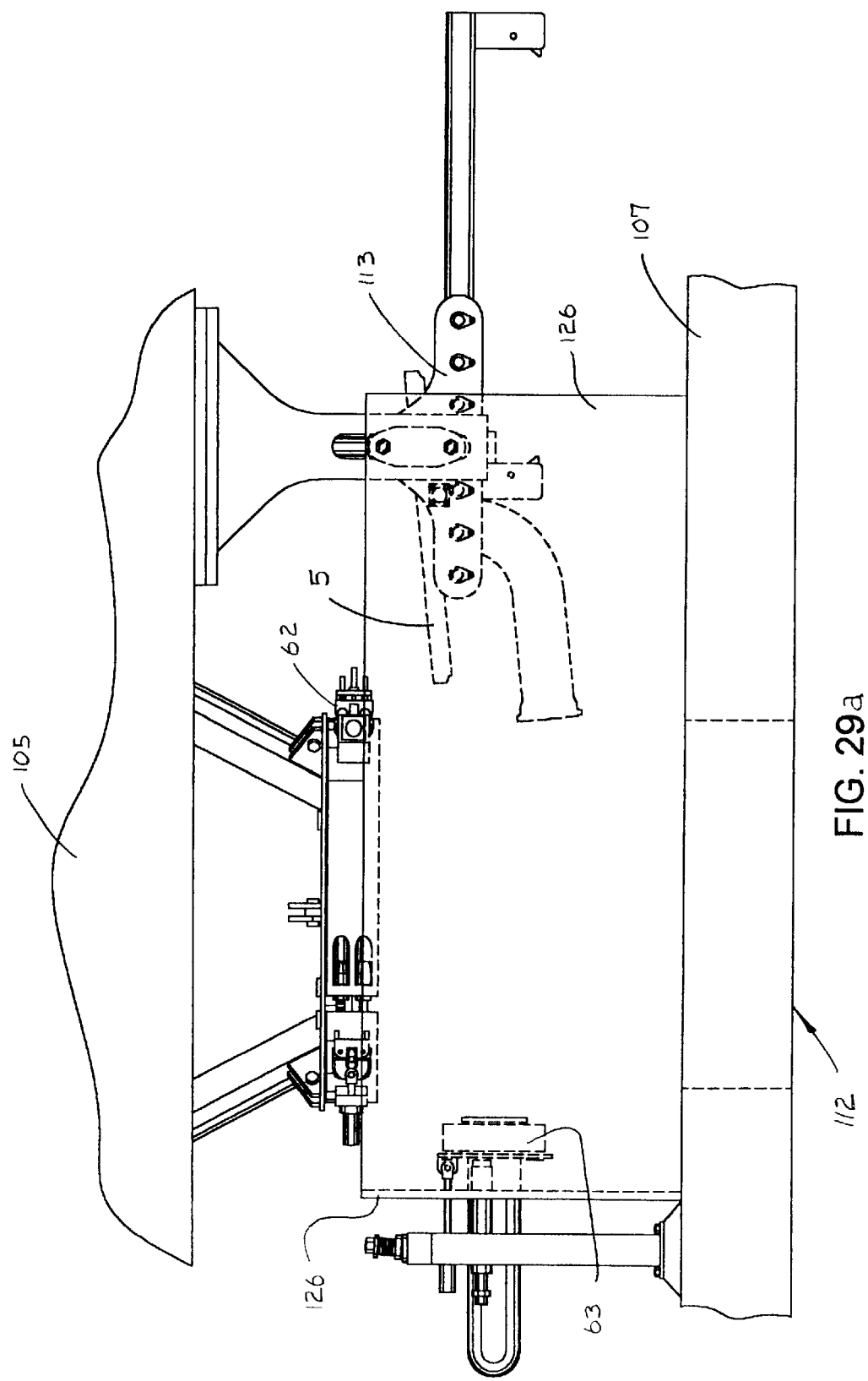
FIG. 29a is an elevation view of a coker with a plurality of floor plates deployed about the bottom of the coke drum. The flange member 5 is displaced by a closure transport.

At least one opening cover 125 would deploy to divert the flow 128 into hole 112 in working surface 107, such as shown in FIG. 29. Opening cover 125 interacts with a closure transport 113, that tilts and lowers flange member 5. This motion controls the direction of the flow from vessel 56 against opening cover 125 and down hole 112.

Figure 23A:
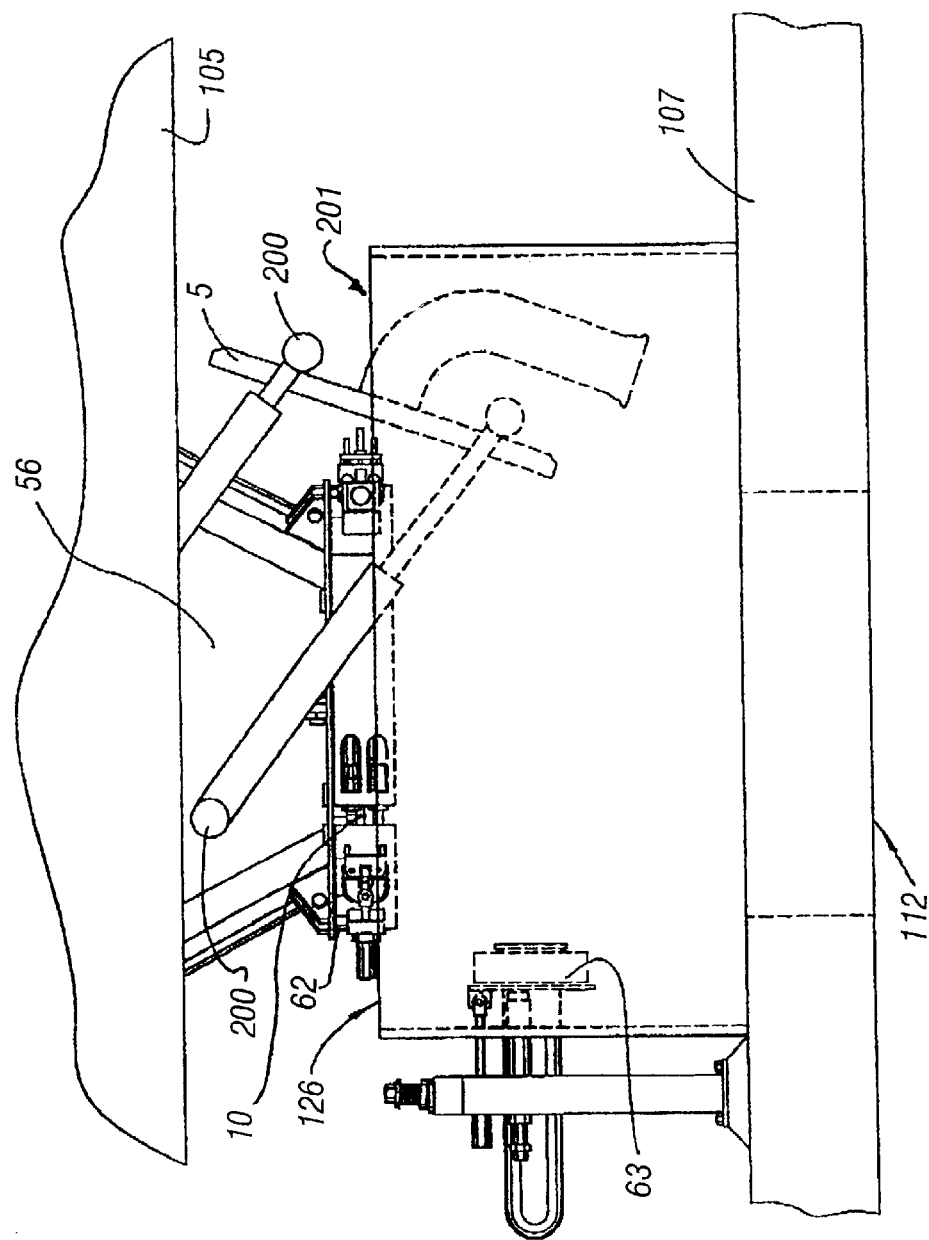
FIG. 23a is an elevation view of a coker with a passageway formed about the bottom of the coke drum. Flange member 5 is swingably displaced from an opening in the coke drum.

In another embodiment shown in FIG. 23a, at least two deployed floor plates 126, together with flange member 5, adapted to swing open at a hinge location 200 about vessel 56, would complete an enclosing passageway 201 for flow. This arrangement requires space between the elevation of flange member 10 and working surface 107 so flange member 5 can swing open.

This embodiment is particularly useful in vessels containing loose, unpacked material.

Moving to an alternative closure transport 113, attention is shifted to FIG. 24 through FIG. 28. Closure transport 113 is disposed on vessel support deck 105 by base 129. Closure transport 113 could also be inverted and disposed on working surface 107. However, working surface 107 is sometimes not strong enough to support the force generated by closure transport 113 as it forces flange member 5 against flange member 10, so it should be disposed on the support deck in these instances.

The motion of closure transport 113 is similar to closure transport 61. It translates flange member 5 vertically upward and downward and also to and from the longitudinal centerline of drum 56. Its vertical motion can automatically and measurably tilt flange member 5 relative to flange member 10.

The vertical movement allows flange member 5 to move relative to substantially stationary vessel 56. This allows flange member 5 to be lowered sufficiently such that it clears connector 62. Further, at least one elevator 145 can be designed such as to force flange member 5 against vessel 56 with enough force to overcome the loads imposed on flange member 5 by the contents of the vessel 56. This force causes a sealing barrier between the flange member 5 and flange member 10 or 10a disposed on vessel 56.

Figure 25:
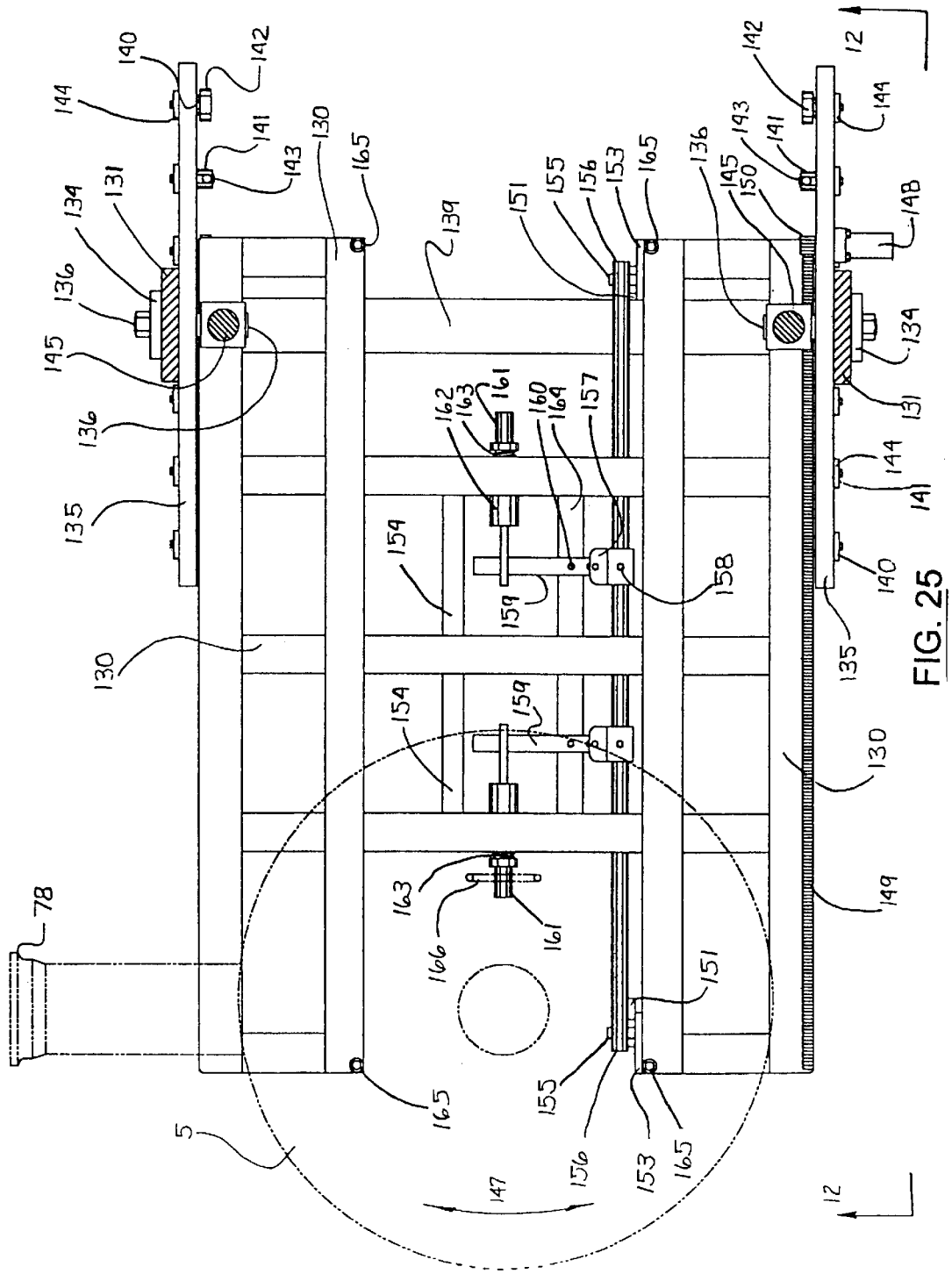
FIG. 25 is sectional plan view of a preferred embodiment of the present invention. A closure transport is illustrated in the lowered position, as seen along lines 10—10.

Base 129 can be fixed or can swivel. This allows flange member 5, resting on the closure transport, to move in a rotational direction 147 about base 129, as shown in FIG. 25. Disposed on base 129 are a plurality of support arms 131, which can be joined to at least one table support 139. These elements form a table or surface for supporting the closure.

Figure 26:
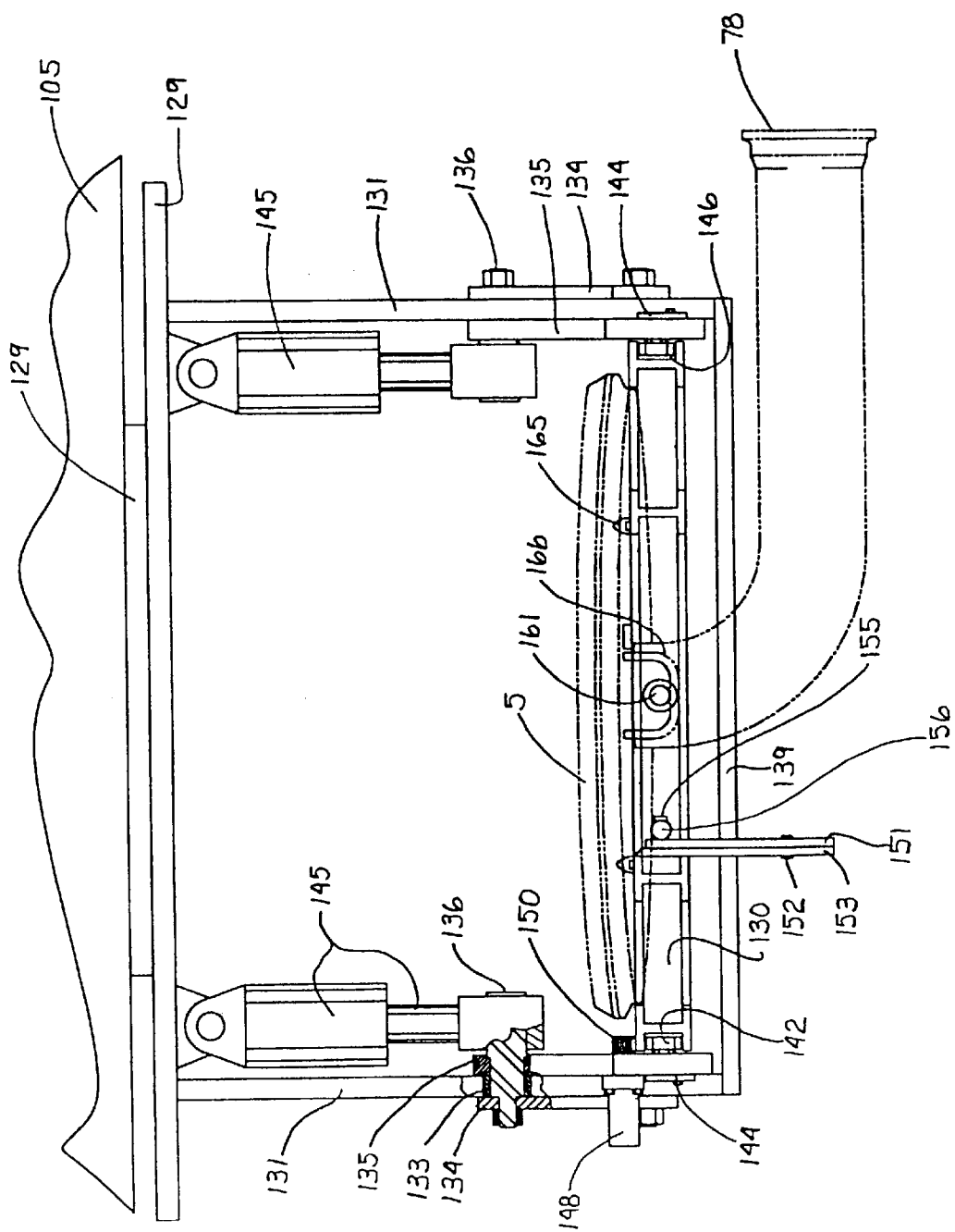
FIG. 26 is side view of a preferred embodiment of the present invention. A closure transport is illustrated in the lowered position, as seen along lines 11—11.

Each support arm 131 has at least one slot 132, interfacing a plurality of rollers 133 adapted to roll about pins 136. Rollers 133 are hidden behind stabilizers 134. FIG. 26 gives a cutaway view of rollers 133. A plurality of pins similar to 136 can be utilized to attached table supports 135 to stabilizers 134, through slots 132.

Figure 24:
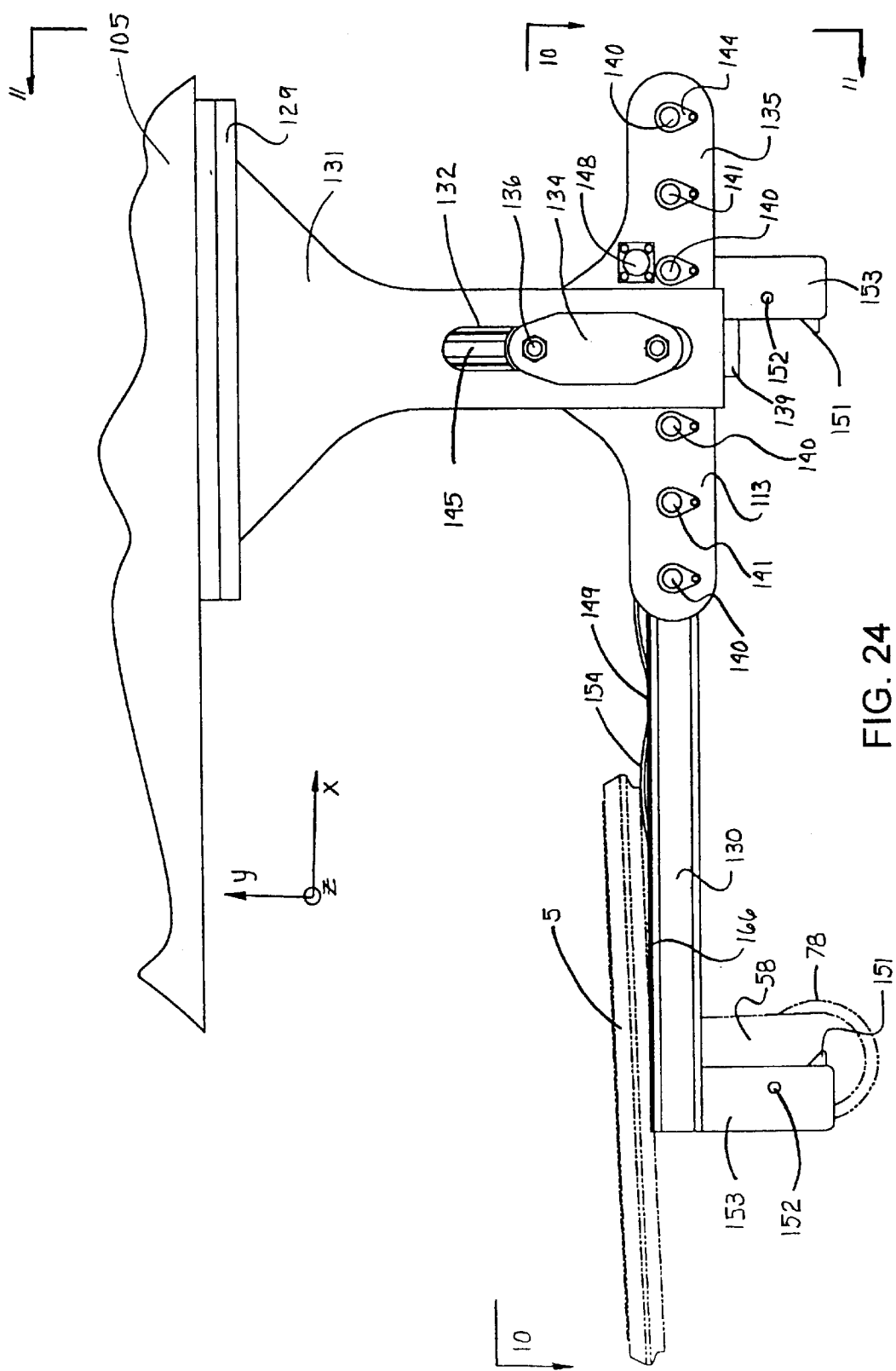
FIG. 24 is an elevation view of a preferred embodiment of the present invention. A closure transport is illustrated in the lowered position, as seen along lines 12—12.

A frame of reference is shown in FIG. 24 to facilitate the following discussion. The positive Z axis is out of page and the XZ and YZ planes are perpendicular to the page.

The component forces and moments imposed on rails 130, in the XY plane and/or YZ plane are reacted by rollers 142 that roll about pins 140. Rollers 142 hidden from view in FIG. 24 are shown best in FIG. 25 and FIG. 26. Rollers 142 are constrained in a plurality of channels 146 on rails 130.

The component forces and moments imposed on rails 130 acting in the XZ plane are reacted by rollers 143, disposed on pins 141, at channels 146. Pins 140 and 141 have pin face 144 that prevents them from rotating because they are fixed to table supports 135.

The component forces and moments imposed on rails 130, reacted by rollers 142 and 143, are transferred to pins 140 and 141 respectively. Since pins 140 and 141 are disposed on table supports 135, the component forces and moments are further transferred onto them.

The component forces and moments acting in the XY plane are transferred to rollers 133 and pins 136. Rollers 133 further interface slots 132 in support arms 131 transferring these component forces and moments to base 129.

The component forces and moments acting in the XZ plane and/or YZ plane are transferred to rollers 133, stabilizers 134 and table supports 135 and further to support arms 131 and to base 129.

Elevators 145 are shown in FIG. 26 in the lowered position. In an embodiment they are hydraulic cylinders attached between base 129 and pins 136. Actuation of elevators 145 vertically raises and lowers almost all parts comprising closure transport 113. Parts that do not move vertically are base 129, support arms 131 and cross member (s) 139.

Downward vertical motion is controlled by the interaction of rollers 133 at the bottom of slots 132. Thus no motion limiting devices are required.

Figure 27:
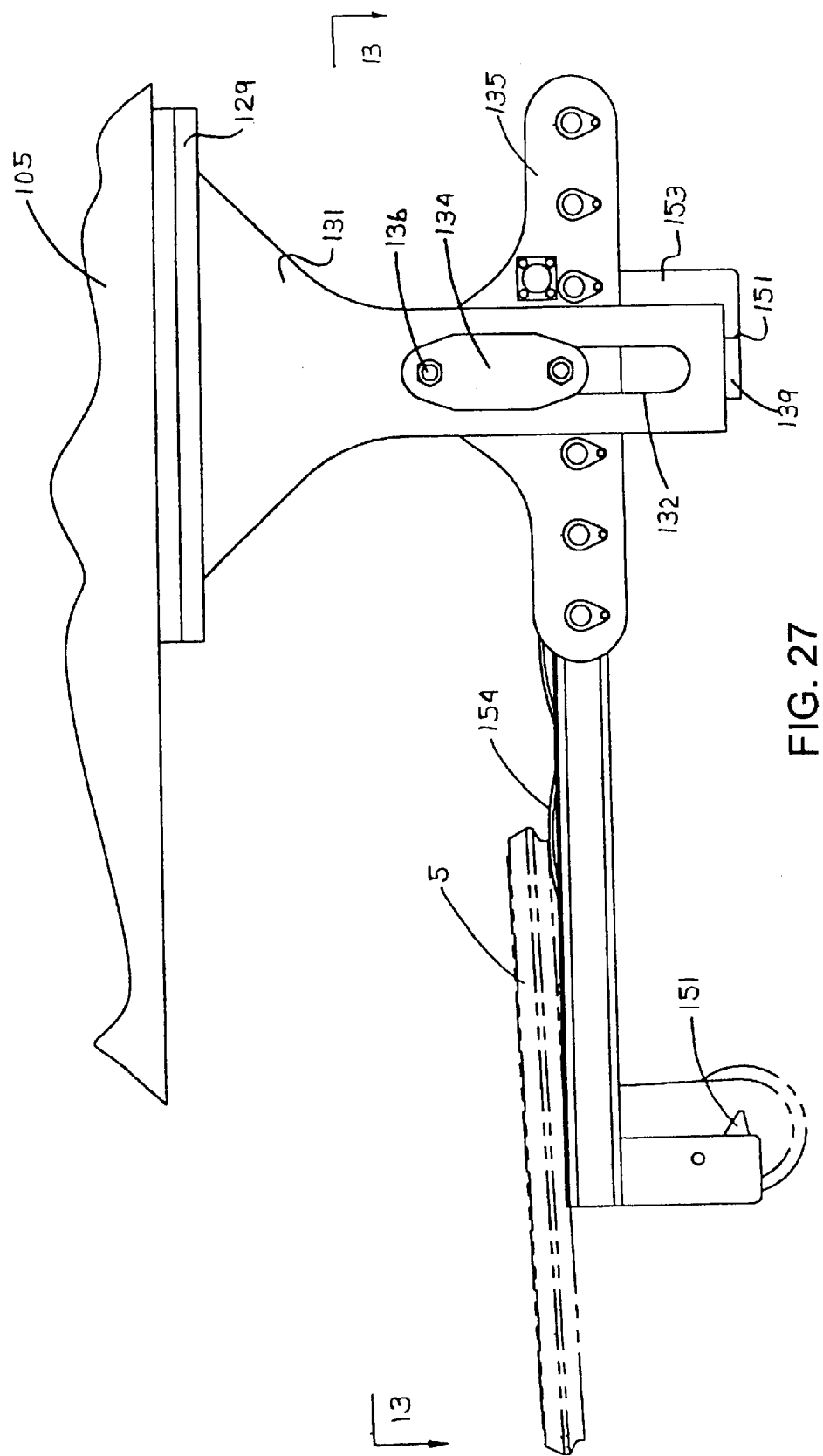
FIG. 27 is an elevation view of a preferred embodiment of the present invention. A closure transport is illustrated in the raised position, as seen along lines 14—14.
Figure 28:
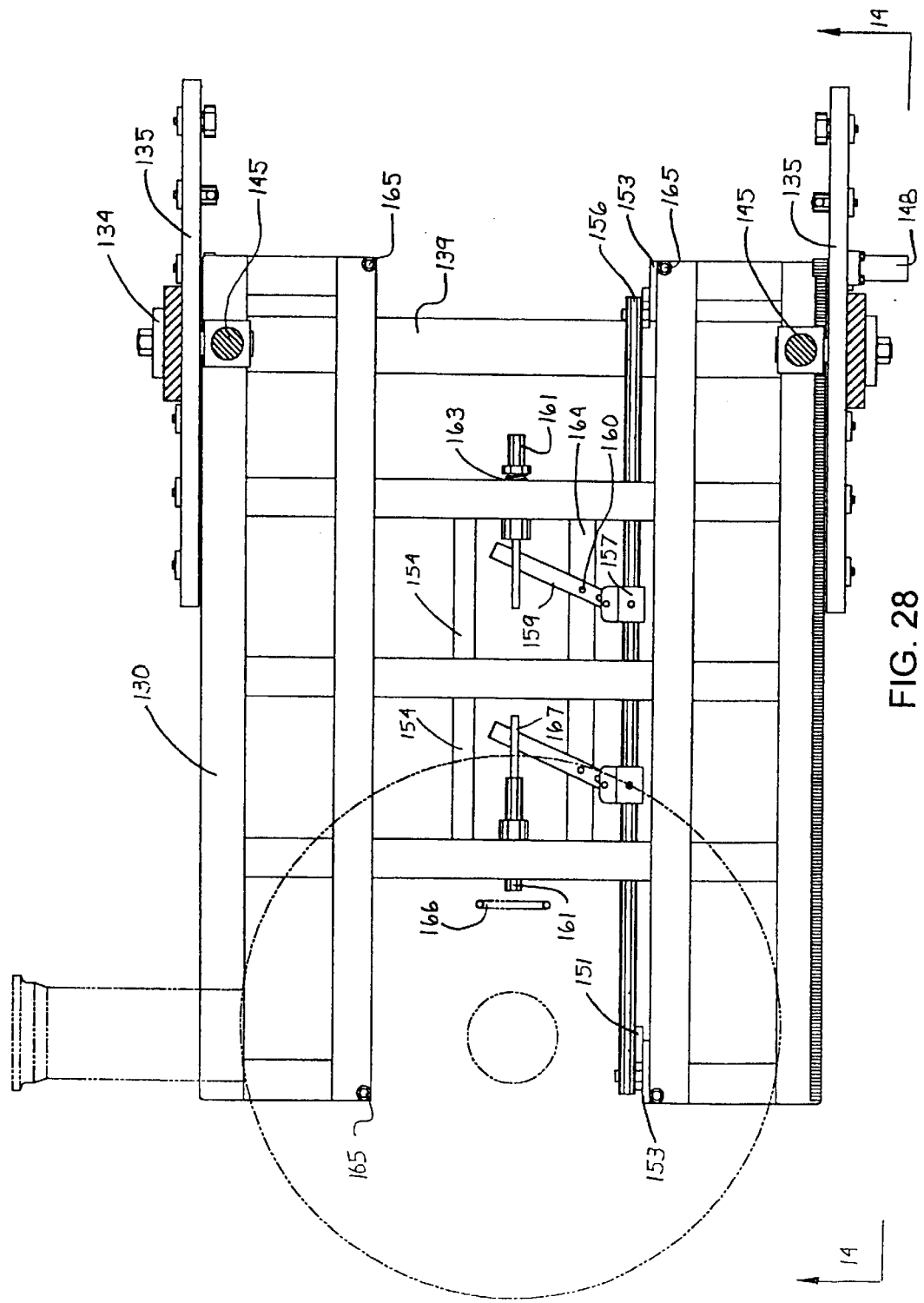
FIG. 28 is sectional plan view of a preferred embodiment of the present invention. A closure transport is illustrated in the raised position, as seen along lines 13—13.

FIG. 24, FIG. 25 and FIG. 26 show closure mover 113 in a lowered position indicative of allowing flange member 5 to clear connector 62 as it is moved away from the longitudinal centerline of vessel 56 by actuator 148. FIG. 27 and FIG. 28 show the opposite raised position of closure transport 113. FIG. 25 and FIG. 28 are substantially similar, as well as, FIG. 24 and FIG. 27. When the closure is disposed on the closure transport, the closure transport is powered to move to and from vessel 56.

Figure 30:
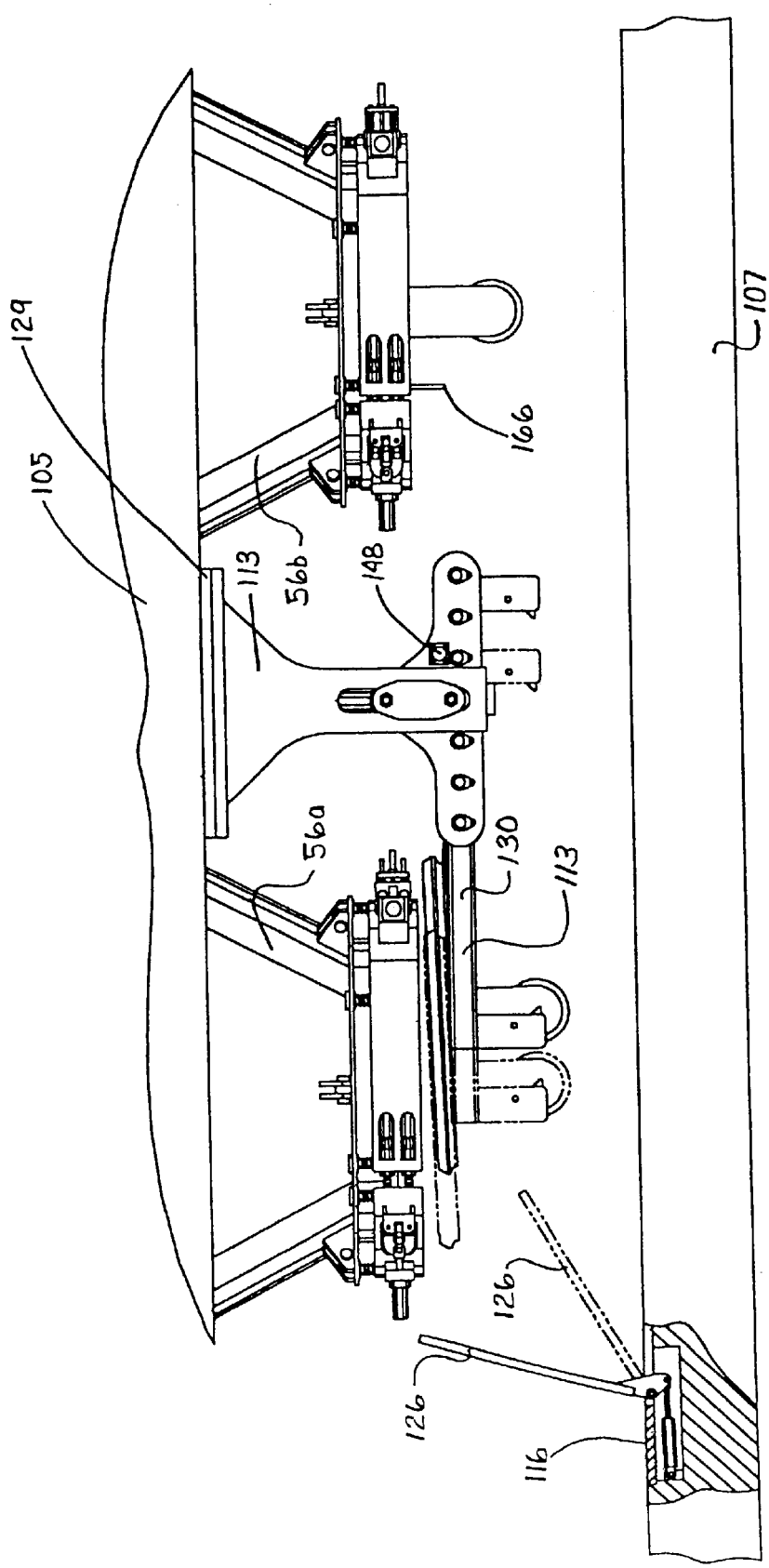
FIG. 30 is an elevation view, partially sectioned, of a coker illustrating the interaction of a closure transport with respect to a pair of coke drums. In this preferred embodiment of the present invention, coke drum 56a is being prepared for decoking. Herein is illustrated the deployment of floor plates and the movement of the closure transport. The inlet pipe connecting system is removed for clarity.

When flange member 5 is lowered by closure transport 113 it can then move relative to the longitudinal centerline of vessel 56, thus clearing the hole in the bottom of vessel 56 for flow 128 to pass. This can be accomplished by swiveling base 129 or it can be activated by actuator 148. In an embodiment, actuator(s) 148 is a hydraulic motor that engage rails 130 in a rack 149 and pinion 150 interface. Rack 149 and pinion 150 are disposed on top of rails 130. However, when applied in practice, they may appear on the bottom of rail 130 for cleanliness. FIG. 30 illustrates this motion where rails 130, currently under vessel 56a, can be fully activated to extend under vessel 56b, allowing closure transport 113 to service more than one vessel, adding to the functionality.

The motion of closure transport 113, to and from the longitudinal centerline of vessel 56, produced by actuator(s) 148, is controlled by stops 153, thereby, no motion sensors are required.

When vessels 56a and 56b are widely separated, a plurality of bases 129, support arms 131 and table supports 135 together with all necessary rollers, pins and motors could interface rails 130.

Pins 165 interface flange member 5 in a pin and box arrangement similar to that shown in FIG. 3. This arrangement aligns closure transport 113 to flange member 5 and prevents it from sliding off closure transport 113.

Springs 154 are compressed level to the top of rails 130 when flange member 5 and 10 contact and when closure transport 113 forces them together. In FIG. 24, FIG. 25 and FIG. 26, closure transport 113 is in the lowered position. Spring 154 is free to tilt flange member 5, thus controlling the magnitude and direction of flow 128. This function could also be actuated, but a lower number of remote controls simplifies, the present invention.

In FIG. 24, FIG. 25 and FIG. 26 cams 151 are disengaged. Their function is more apparent when closure transport 113 is raised. The difference between FIG. 25 and FIG. 28 illustrates a further aspect. The upward vertical motion of closure transport 113 is used to automatically restrain and liberate flange member 5 at the handle 166 to lock 161 interlocking interface. A benefit of this embodiment is that lock 161 automatically restrains flange member to prevent it from tilting off rails 130, and automatically releases it when closure transport 113 positions it such that closing connector 62 captures it. This restraining and liberating nature is activated by the vertical motion of closure transport 113 and is performed automatically, without human intervention and avoiding human error that could damage anyone or closure transport 113. This function could also be actuated, but a lower number of remote controls simplifies the present invention.

In FIG. 25, flange member 5 is restrained because lock 161, biased by spring 163 to the restraining position, is in an interlocking position relative to handle 166 that is disposed on the bottom of flange member 5. In FIG. 28, the reverse released position is shown. Thus, lock 161 is retracted back farther away from handle 166.

When restrained flange member 5 is raised by closure transport 113 toward flange member 10, cam 151, closest to cross member 139, makes contact with it at or about the time when flange member 5 is in position for closing connector 62 to capture it. When cam 151 is engaged it causes the lock 161 farthest away from it to release flange member 5 for capture by connector 62, as shown in FIG. 28. Cam 151 pivots about pin 152 disposed on stop 153.

Once flange member 5 is locked to vessel 56 by connector 62, closure transport 113 is lowered. When lowered, engaged cam 151 becomes disengaged, and springs 163 advance locks 161 back to the restraining position. However, at this time flange member 5 is now locked to vessel 56 and did not lower with closure transport 113. If it had not been lock to vessel 56 it would have been restrained to closure transport 113 by lock 161 as it was lowered.

Attached to rods 156 are collars 157, adjustably fixed to rods 156 by set screws 158. Here, linkages 159 are rotated about pin 160 according to the motion of rod 156. Linkages 159 interface pins 161 in a slotted arrangement; whereby, they engage pins 161 only at the far end 167. Linkages 159 also interface collars 157 in a slotted arrangement.

In FIG. 25, support arms 131, rail supports 135, stabilizers 134 and elevators 145 are symmetric about rails 130. It is apparent that rails 130 are adapted to service two vessels 56 because spring 154, locks 161, stops 153, cams 151 and pins 165 are symmetric about the midlength of rails 130.

FIG. 29, FIG. 30, FIG. 31 and FIG. 32 are substantially similar and illustrate closure transport 113's relationship to vessel 56a and/or 56b. Connector 63 that interfaces flange member 78 in not shown in these figures for clarity.

In an embodiment shown in FIG. 29, vessel 56a is being prepared for decoking. Here, flange member 5 has been remotely liberated by expanded connector 62 and is secured to closure transport 113, which is tilting and lowering flange member 5 from the opening in the bottom of vessel 56a. The magnitude and direction of flow 128 of loose coke and quench water from vessel 56a is being controlled be the positioning of flange member 5. Variance in the position of flange member 5, produced by motion of closure transport 113, regulates flow 128.

Flow 128 is being directed toward a least one floor plate 126, openly actuated by actuator 116. A plurality of floor plates 126, as shown in FIG. 23a, can be utilized to divert flow 128 down hole 112.

Remotely controlled movement, created by actuators 148 in moving flange member 5 under vessel 56a, has been stopped since stop 153 made contact with cross member 139.

Referring to vessel 56b, flange member 5 is sealingly secure to flange member 10, disposed on vessel 56b, by closed and locked connector 62. Restraining handle 166 is disposed on flange member 5 and extends below connector 62.

Here, exit chutes 59 or 59a are stored below the surface of working surface 107. Panel 127 is an access panel to service actuator 116.

FIG. 30 illustrates the remotely controlled opening of one floor plate 126 and the remotely controlled movement of flange member 5 and closure transport 113 as actuators 148 move rails 130 and flange member 5 away from the longitudinal centerline of drum 56a, thereby clearing the hole in the bottom of vessel 56a.

Figure 31:
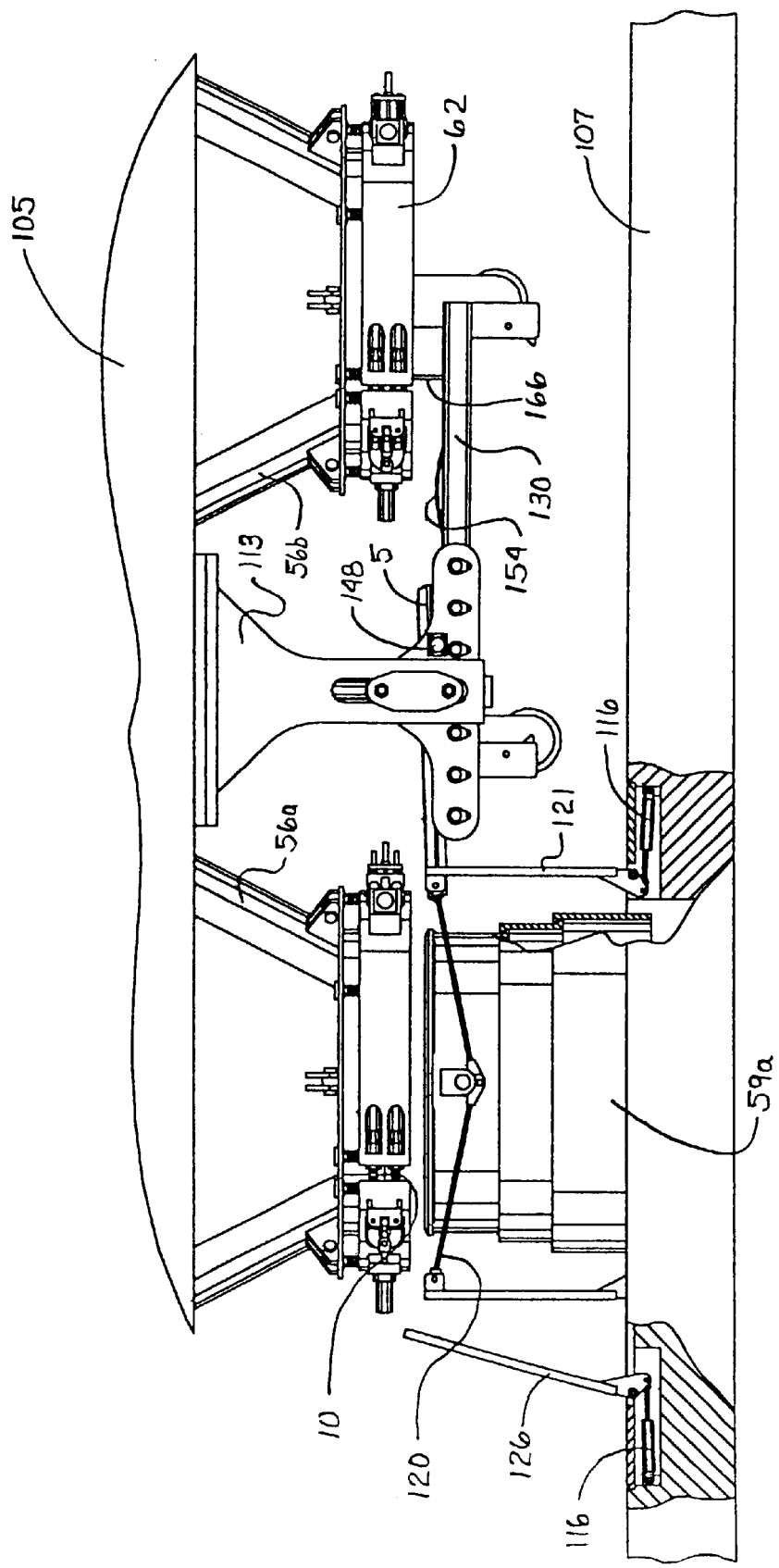
FIG. 31 is an elevation view, partially sectioned, of a coker illustrating the interaction of a closure transport with respect to a pair of coke drums. In this preferred embodiment of the present invention, coke drum 56a is being prepared for decoking. Herein is illustrated the deployment of the decoke chute. The inlet pipe connecting system is removed for clarity.

In FIG. 31, flange member 5 is moved back farther away from vessel 56 to allow deploying exit chute 59a to mate with flange member 10 dispose on vessel 56a. Exit chute 59a will be completely deployed, captured, aligned and locked to vessel 56a as has been described in the foregoing disclosure.

Here, hinge extensions 121 and cables 120 are actuated by actuators 116 to raise exit chute 59a.

Connector 62 disposed about vessel 56a is open to receive exit chute 59a. Connector 62 on vessel 56a is closed and locked.

Figure 32:
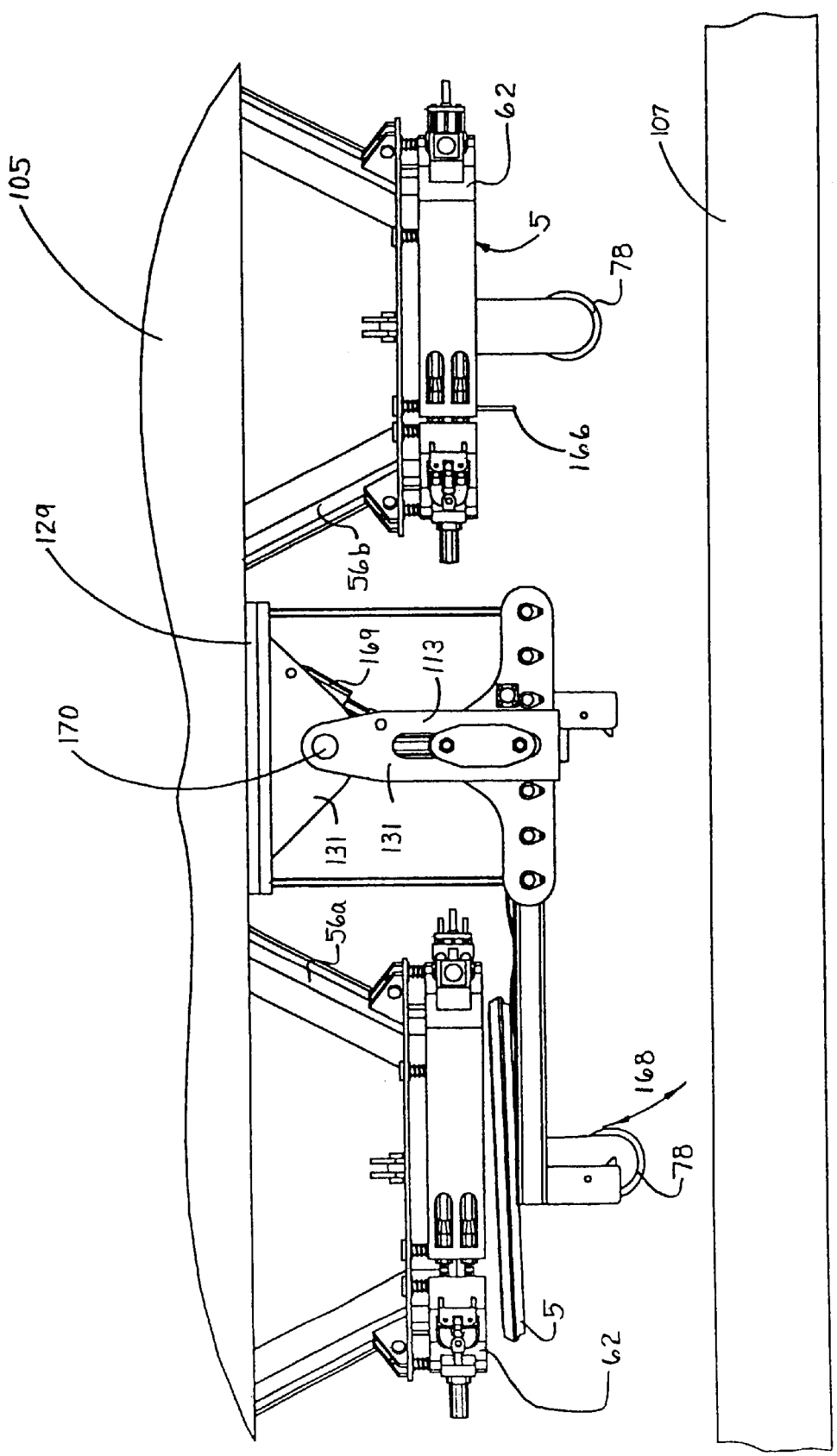
FIG. 32 is an elevation view, partially sectioned, of a coker illustrating the interaction of a closure transport with respect to a pair of coke drums. In this preferred embodiment of the present invention, coke drum 56a is being prepared for decoking. Herein is an illustration of a swinging closure mover. The inlet pipe connecting system is removed for clarity.

Another embodiment is shown in FIG. 32. FIG. 32 is substantially similar to FIG. 29. Here, another degree of freedom, added to closure transport 113, allows flange member 5 to swing in direction 168. This is accomplished by splitting support arms 131 into a plurality of pieces and hinging them together at hinges 170. Motion in direction 168 is remotely controlled by adapting at least one actuator 169 between base 129 and supports arm 131 or between different pieces of support arms 131. In this embodiment safety cables limit the motion in direction 168.

Figure 33:
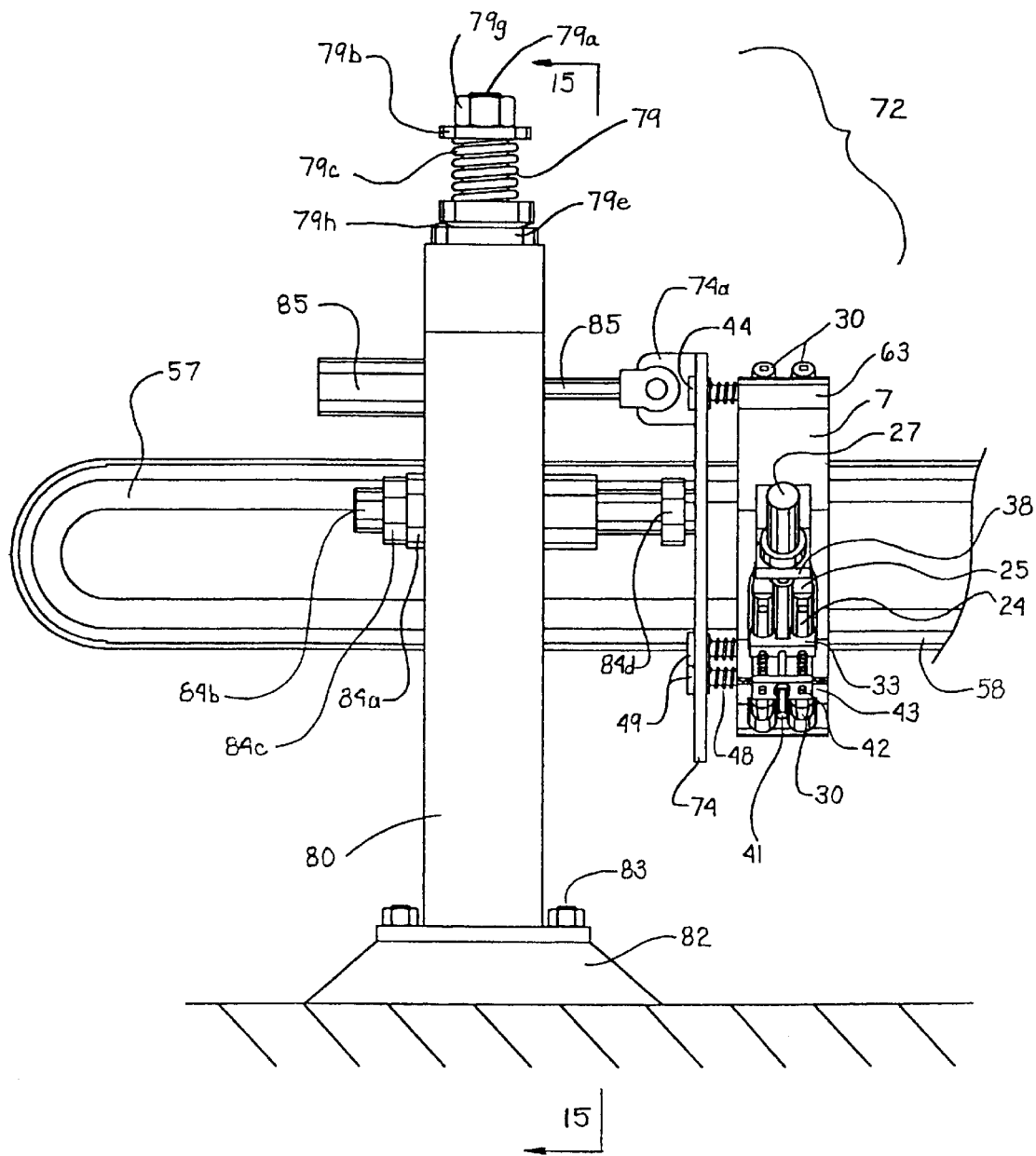
FIG. 33 is an elevation view of a preferred embodiment of the inlet pipe connecting system. The view illustrates connector 63 in the coking (joints closed) position.
Figure 34:
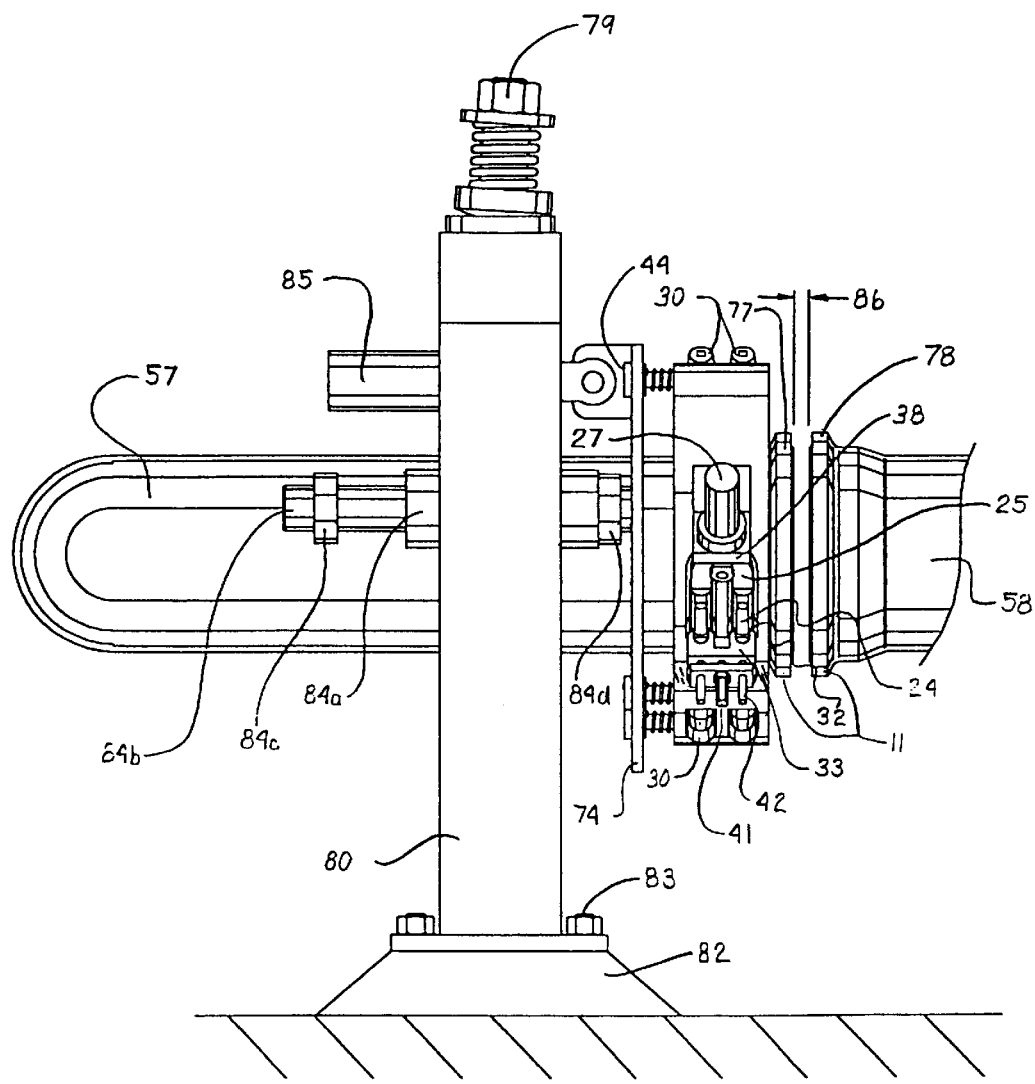
FIG. 34 is an elevation view of a preferred embodiment of the inlet pipe connecting system. The view illustrates connector 63 in the decoking (joints open) position. Here, connector 63 and inlet pipe 57 are retracted by actuator 85.

Referring to FIG. 33, an embodiment of inlet pipe connecting system 72, in accordance with the present invention, is shown in the coking (joints closed) position. The joint connector 63 is substantially identical to the flange retaining clamp comprising joint connector 62 previously described in this disclosure. As previously mentioned, a embodiment includes a flange retaining clamp, where clamp segments are separated into a plurality of segments. Those of ordinary skilled in the art can appreciate the substantially identical embodiment of joint connector 63 as it relates to connector 62 that connects flange member 5 to flange member 10 at the drum bottom. Herein, connector 63 connects inlet pipe 57 to connector pipe 58. Joint connector 63 has a fastener, actuator, and flanged member to clamp member interface identical to the joint connector 62, although here, instead of connecting a flange member 5 to a flange member 10 connector 62 connects two flange members 77 and 78 substantially similar to flange member 10. FIGS. 2–4a equally apply to the joint connector 63. Joint connectors 62 and 63 should be considered the same except for the dissimilar novelties and characteristics specifically related to the joint connector 62 that are discussed further. Since connectors 62 and 63 are almost identical, FIG. 33 and FIG. 34 are not sectioned and do not contain meticulous details already discussed in this disclosure. Like components in FIG. 33 and FIG. 34 are labeled identically as the corresponding components labeled in FIGS. 2–13.

Alternatively, clamp segments 7 could contain two segments with external lugs. Those skilled in the art can appreciate, due to the inlet piping joint's small size, raw material weight and, therefor, cost is reduced by producing clamp segments 7 as shaped forgings. The shaped forgings would consist of a segmented ring with integral external lugs. Passageways 23 terminate at reaction shoulders 31 and 32 formed on these external lugs. The shoulders 31 and 32 are required since the stored energy produced in bolts 8 is reacted at the shoulders 31 and 32, thus securely closing the joint. Connectors 62 and 63 have clamp segments 7 machined from a split ring forging without external lugs. Shoulders 31 and 32 are created by the junction of the machined passageways 23 and 29.

Connector 62, 63 and 88 could be produced by fabricating external lugs to a split ring forging, producing a external lug shape. Construction of shoulders 31 and 32 in integral or external lugs is generally predicted by manufacturing constraints or stress analysis.

The conical section of vessel 56, shown in several figures, extending below vessel support deck 105, undergoes significant thermal expansion between the decoking and coking process. The decoking process is a quenching process while the coking process is an extremely high temperature process (900 to 1000° F.). This thermal expansion drives inlet pipe 57 closer to working surface 107. A mechanism to accommodate this expansion is needed thereto..

Figure 35:
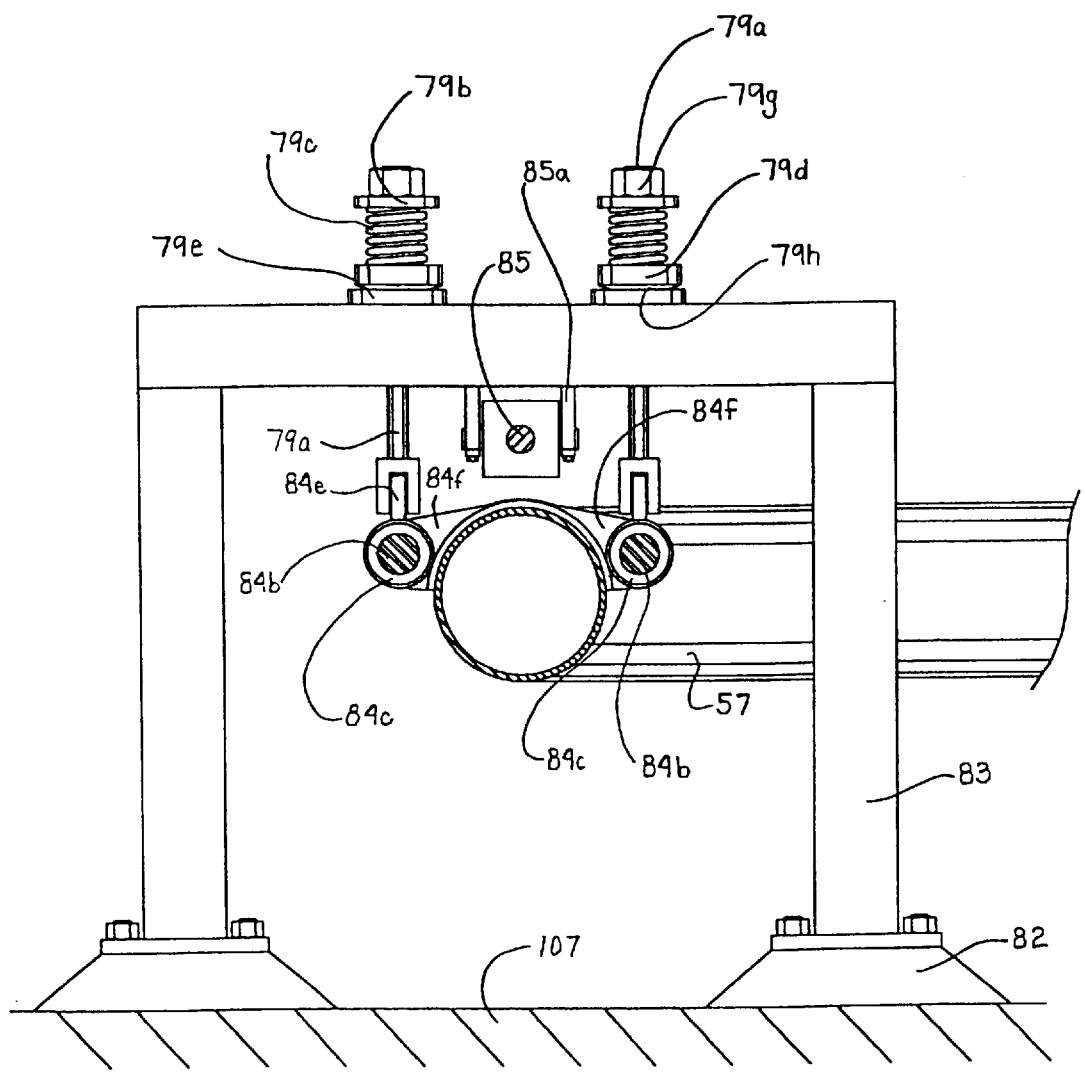
FIG. 35 is a section view of the inlet pipe connecting system, as seen along lines 15—15.

Referring to FIGS. 33–35, a plurality of spring supports 79 are designed to support the weight of inlet pipe 57 and the joint connector 63. Spring supports 79 are adjustable in order to supply an adaptable balancing force. Supports 79 function to vertically align flange members 77 and 78 when free and disconnected. They also function to allow thermal expansion to drive the members closer to working surface 107. Spring supports (not shown) could similarly be attached to the inlet piping to align the hub members in the horizontal plane. These supports would be rotated approximately 90° from vertical supports 79. They would supply an adjustable centering force that horizontally aligns the flange members 77 and 78 in the open position. Two supports 79 could be adapted relative to both the vertical and horizontal planes, thereby allowing alignment of flange members 77 and 78 in both planes. Further, the supports could be remotely actuated from a location away from the supports to allow automatic alignment of the inlet piping flange member 77 with the drum side flanged member 78 in the horizontal and vertical planes, such that these members could be reliably remotely joined by the connector 63. The fine aligner shown in FIG. 2 and FIG. 3 could be incorporated with the supports to further predict successful automatic alignment of the flange members 77 and 78.

Referring to FIGS. 33–35 and focusing on FIG. 35, supports 79 can be of any known useful construction that causes an adjustable balancing force to align flange members 77 and 78. Further the supports are preferably remotely adjustable. The aligning supports 79 of an embodiment consists of a threaded rod 79a, bearing member 79b, springs 79c, spherical bearing member 79d, spherical bearing member 79e, attachment mechanism 79f, and adjustment mechanism 79g. Attachment mechanism 79f joins inlet pipe 57 to supports 79. The balancing force supplying springs 79c are confined by bearing members 79b and spherical bearing members 79d. The balancing force is adjusted by rotating threaded adjustment mechanism 79g about threaded rod 79a, compressing and decompressing springs 79c. Members 79d and 79e interface at male to female spherical surfaces 79h. The spherical surfaces reduce bending stress in members 79a, when they pivot about the spherical surface. The pivoting occurs because of the movement of the inlet pipe 57, attached to attachment mechanism 79f, relative to members 79e, that are in turn attached to fixed support frame 80. The attachments allow disconnection of the attached members.

Support frame 80 contains passageways sufficient to allow support rods 79a to pass through it. The passageways are designed to allow sufficient clearance to account for any misalignment of support rods 79a with the corresponding passageways when support rods 79a pivot about members 79e. Support frame 80 acts as an anchor. Support frame 80 is designed to react the forces imparted into the frame by supports 79 and actuator 85. Support frame 80 is tightened down to raised pads 82 by threaded anchor bolts 83 firmly secured in working surface 107.

Supports 79 are attached to retraction guider 84 by attachment frame 84f and lugs 84e. Pipe retraction guider 84 is securely fixed to inlet pipe 57 by fabrication or some other acceptable means. In an embodiment, pipe retraction guider 84 consists of collars 84a, rods 84b, rear stops 84c, forward stops 84d, lugs 84e, and attachment frame 84f. An attachment frame 84f is a structural member rigidly fixing members 84 to each other and to inlet pipe 57. The attachment frame 84f is fabricated to the inlet pipe 57 but can also be attached to the inlet pipe 57 by a removable fastener. Cylindrical rods 84b travel in cylindrical collars 84a and impart movement into the inlet pipe 57. Forward stops 84d and rear stops 84c are adjustably attached to rods 84b. The rods are attached to clamp support plate 74. Rods 84b support the weight of the joint connector 63 and guide its motion back and forth along the inlet pipe 57. This allows movement of clamp segments 7, attached to clamp support plate 74, and of inlet pipe 57. This allows the inlet pipe 57 and connector 63 to be moved towards or away from connector pipe 58. When moving away from connector pipe 58, the inlet pipe 57 and connector 63 are moved away from the separation plane of the flanged members 77 on 78, thus exposing the flanged members' flanged hub ends 11. The motion allows the flange members 77 on 78 to move relative to one another, and to either seal a complete passageway or to break the completed passageway. Actuator 85, connected to clamp support plate 74 at lugs 74a and to the support frame 80, at attachment mechanism 85a, serves to impart the motion into inlet pipe connecting system 72 heretofore described. Actuator 85 is preferably remotely operable.

Inlet pipe 57 and connector 63 are driven by a single actuator 85. Actuator 85 creates motion of clamp segments 7 relative to the flange members 77 and 78. This action separates flanged hub members 77 and 78 from each other. As actuator 85 is remotely actuated, rods 84b travel back and forth in collars 84a and, the weight to connector 63 is supported by rods 84b and collars 84a during the actuation. Forward stops 84d and rear stops 84c, adjustably attached to rods 84b, limit the motion of the rods 84b in the collars 84a. Inlet pipe 57 is moved back and forth by actuator 85 so as to control the magnitude of clearance distance 86, shown in FIG. 34. This clearance distance 86 is required to disconnect inlet pipe 57 from the vessel 56 and, remove flange member 5 and connector pipe 58 away from the bottom opening of vessel 56. The magnitude of clearance distance 86 becomes larger when actuator 85 moves joint connector 63 backwards until forward stops 84d contact collars 84a, attached to inlet pipe 57. The stops 84b cannot pass through the collars 84a. Continued movement of the actuator 85 is imparted to inlet pipe 57, thus increasing clearance distance 86. The magnitude of clearance distance 86 becomes smaller when connector 63 is moved forward until rear stops 84c are driven into collars 84a, thus driving inlet pipe 57 forward.

Referring to FIGS. 36–41, an embodiment of the drum-top deheading system 90 is detailed. It comprises connector 88 that further comprises the same flange retaining clamp design as does connector 62 and connector 63 described previously.

Connector 88 has a fastener, actuator, and flanged member to clamp segment interface. These members are substantially identical to those of joint connector 62. Joint connectors 62 and 88 should be considered the same except for the dissimilar novelties and characteristics specifically related to joint connector 88 that are discussed further. Since the two connectors 62 and 88 are almost identical, FIGS. 36–41 are not sectioned and do not contain the meticulous details already discussed in this disclosure. Like components are labeled identically in FIGS. 36–41 as the components labeled in FIGS. 2–15.

Figure 36:
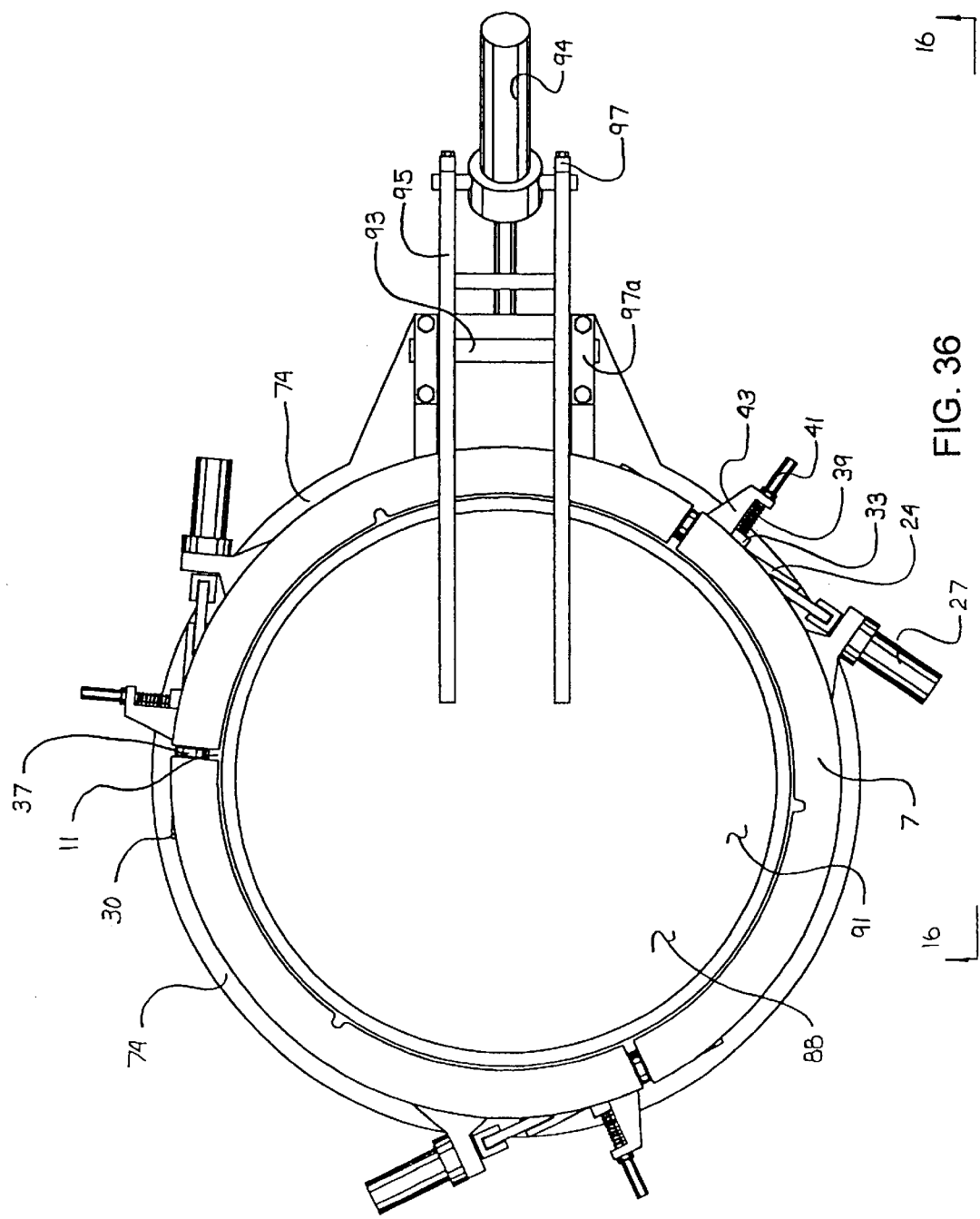
FIG. 36 is a top plan view of a preferred embodiment of a drum-top deheading system. The view illustrates this embodiment in the coking (joints closed) position.
Figure 37:
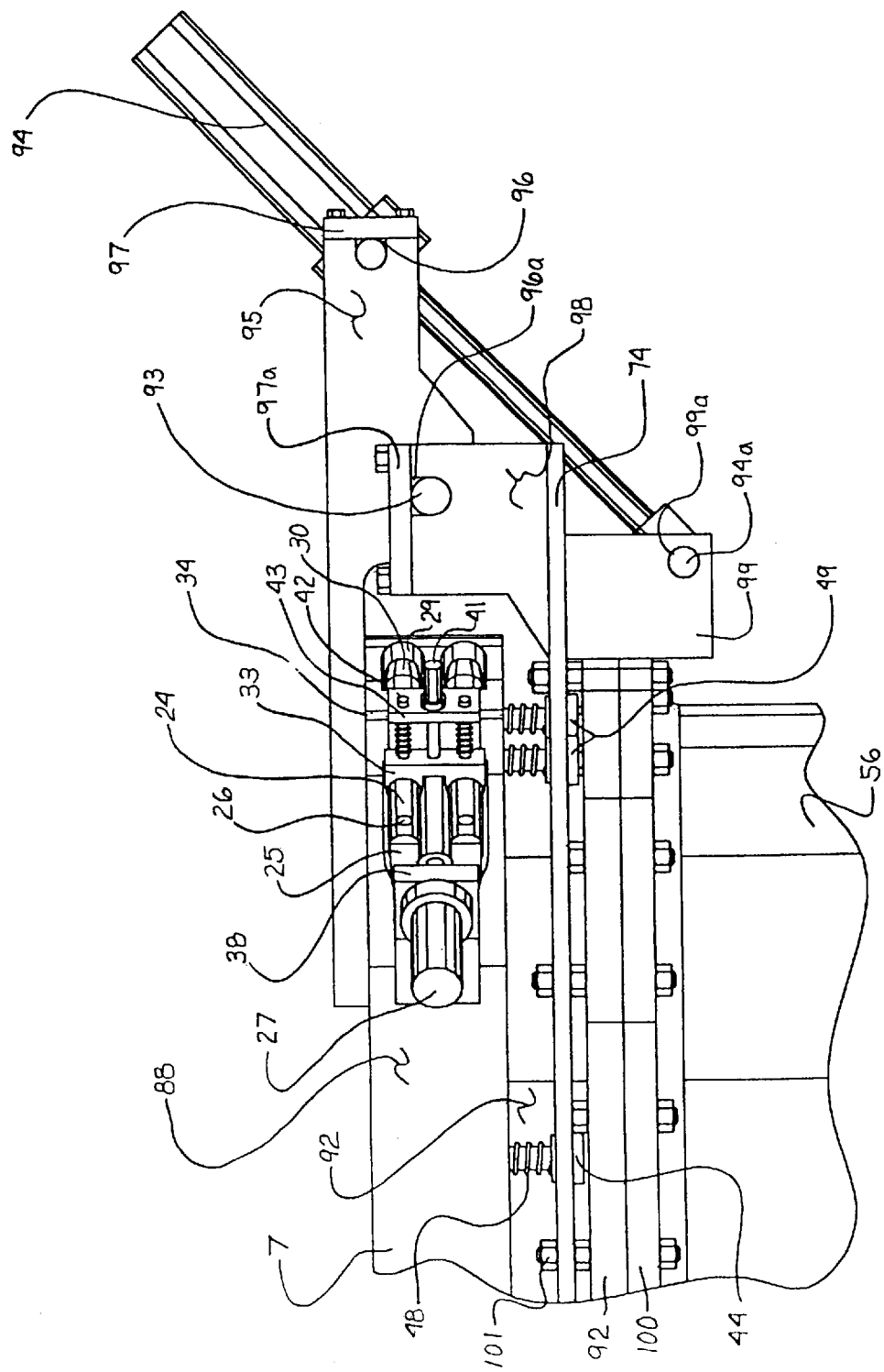
FIG. 37 is a partial elevation view of a preferred embodiment of a drum-top deheading system, as seem along the lines 16—16. The view illustrates this embodiment in the coking (joints closed) position.

An embodiment of drum-top deheading system 90 is shown in the plain view, FIG. 36, and in an elevation view, FIG. 37. Clamp segments 7, securely fastened by bolt members 8, are in the closed position, forcing a seal barrier to occur between flange member 91 and the top flange adapter 92. The drum-top cover removal and replacement occurs by hinging flange member 91 to and from vessel 56. It should be realized that other forms of removal and replacement are possible, such as sliding flange member 91, or using a crane-type device to lower and raise flange member 91. It should also be noted that the cover need not be on the top of vessel 56, but may be at any exterior surface of vessel 56.

In an embodiment of the invention, flange member 91 is pivoted about trunnion 93 by actuator 94. Actuator 94 moves flange member 91 from the coking position, FIG. 36 and FIG. 37 to the decoking position shown in FIG. 38 and FIG. 39. Flange member 91 is connected to the actuator 94 by a rocker arms 95. Rocker arms 95 are preferably attached to flange member 91 by fabrication, but they can also be fastened together by any other secure fastening method, such as bolting. Actuator 94 is a front trunnion mounted hydraulic cylinder having male trunnions that interface with female trunnion sockets 96 machined into the end of the rocker arms 95. Trunnion end plates 97 are fastened to the rocker arms by fasteners, thus securing the actuator 94 to the rocker arms 95. When actuator 94 is activated, trunnion sockets 96 and the trunnions mounted to actuator 94 rotate relative to each other. Trunnion 93 is attached to rocker arms 95 and rests in trunnion sockets 96a. Trunnion 93 is held in trunnion sockets 96a by trunnion end plates 97a. Trunnion 93 rotates relative to fixed trunnion sockets 96a that are machined into trunnion mounts 98. Trunnion mounts 98 are fabricated to clamp support plate 74, thus fixing trunnion 93's location with respect to the center of the top flange adapter 92. This assures that the flange member 91 can be replaced to its original closed position, once hinged opened. Anchor plates 99, fabricated to clamp support plate 7, have holes 99a to allow passage of actuator pivot pin 94a. However, it should be noted that several methods and means exist to actuate movement of flange member 91 and should be apparent to those skilled in the art.

Figure 38:
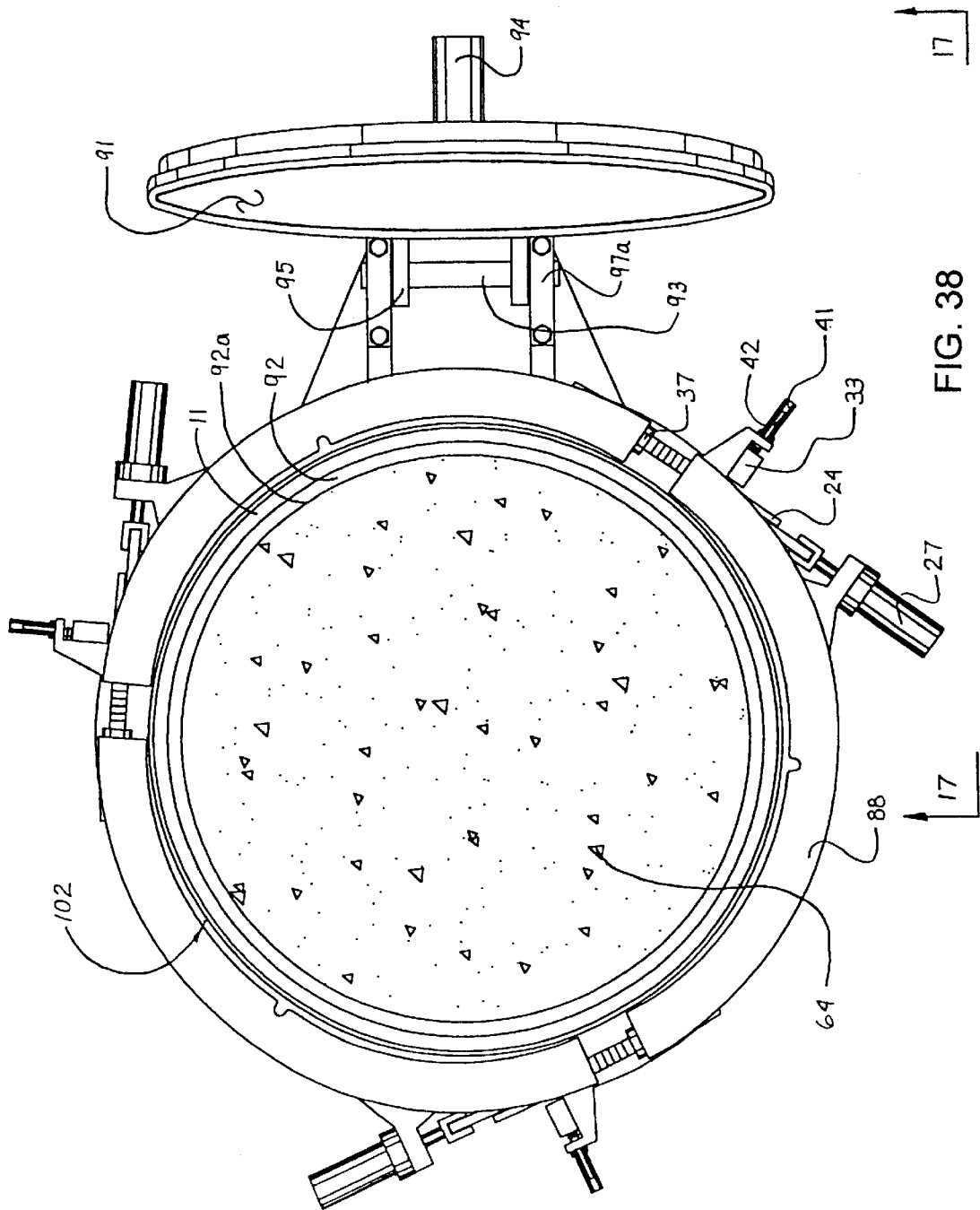
FIG. 38 is a top plan view of a preferred embodiment of a drum-top deheading system. The view illustrates this embodiment in the decoking (joints open) position.
Figure 39:
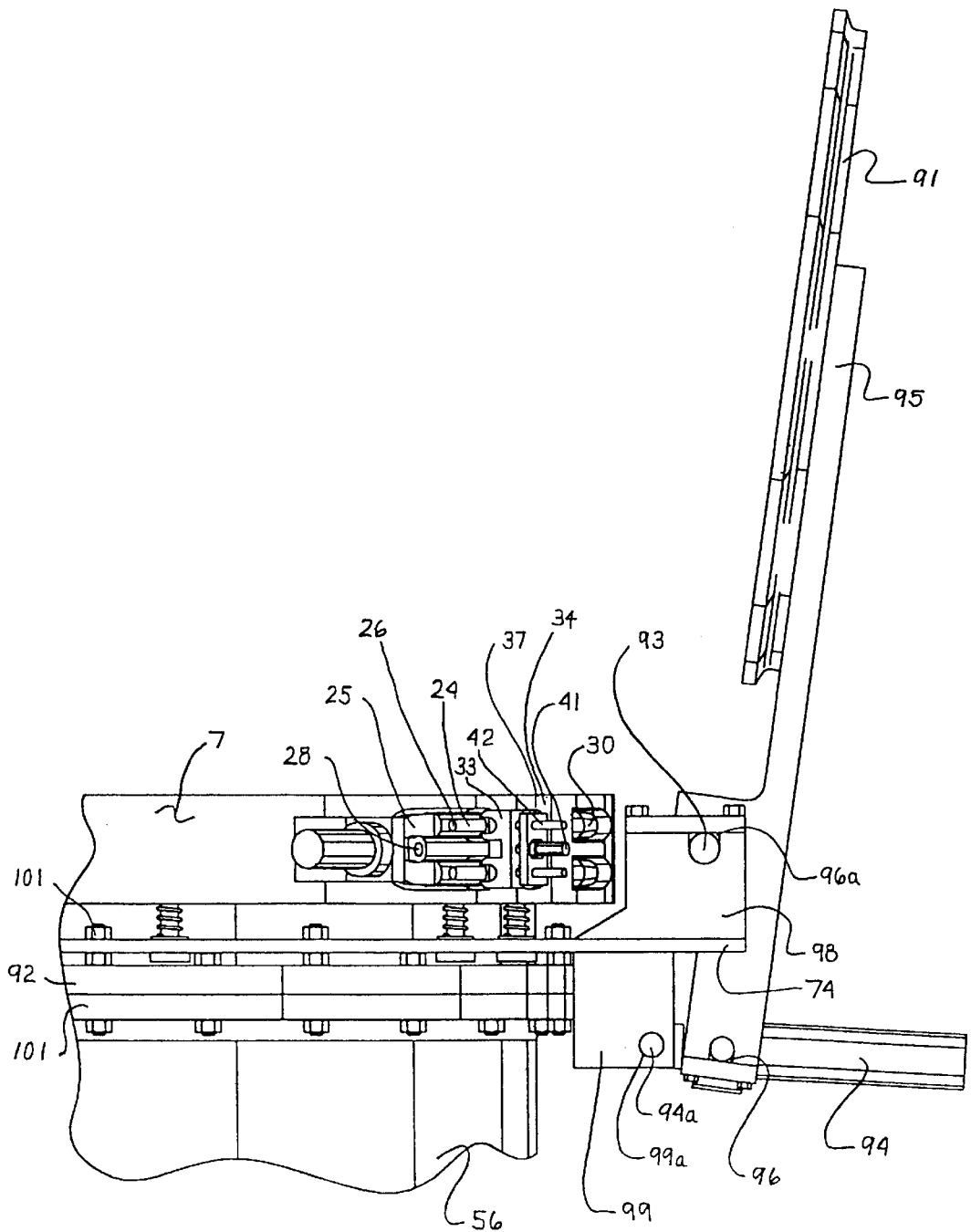
FIG. 39 is a partial elevation view of a preferred embodiment of a drum-top deheading system, as seen along the lines 17—17. The view illustrates this embodiment in the decoking (joints open) position.

The joint connector of the drum-top deheading system 90 is opened by remotely activating actuator 27 causing bolts 8 to stretch. This relieves the contact stress between clevis nuts 24 and locking plates 33. This action allows remote activation of actuator 41 to move locking plates 33 into their open position as shown in FIG. 38 and FIG. 39. When locking plates 33 are clear from clevis nuts 24, actuators 27 moves the clamp segments 7 into their open position, shown in FIG. 38 and FIG. 39. When the clamp segments 7 are opened the male to female interface of clamp segments 7 to top flange adapter 92 and drum-top flange member 91 is disengaged allowing flange member 91 to freely pivot about trunnion socket 96a when actuator 94 is remotely activated.

Referring to FIG. 37, the equipment above and including clamp support plate 74 or attached to clamp support plate 74 is a self-contained assembly which can be removed and replaced as an assembly. The assembly is fastened to top flange adapter 92 and top flange 100 by fasteners 101. As shown is FIG. 38, support plate passageway 102 allows passage of top adapter flange 92 when the aforementioned self-contained assembly is removed and replaced.

Referring to FIG. 38 and FIG. 39, an embodiment of drum-top deheading system 90 is shown in the plan view, FIG. 38, and elevation view, FIG. 39. Drum-top deheading system 90 is shown in the open position. Drum-top flange member 91 is hinged into a open vertical position by actuator 94. Remote activation of the actuator 94, pivotally attached to the rocker arms 95, causes rocker arms 95 and flange member 91 to rotate from a horizontal to a vertical position.

Material 64, which will be removed from vessel 56, is visible through vessel hole 92a. Flange member 91 is cleared away from drum hole 92a. Clamp segments 7 are in an open position, allowing drilling head flange 104 to be lowered onto the top flange adapter 92.

Figure 40:
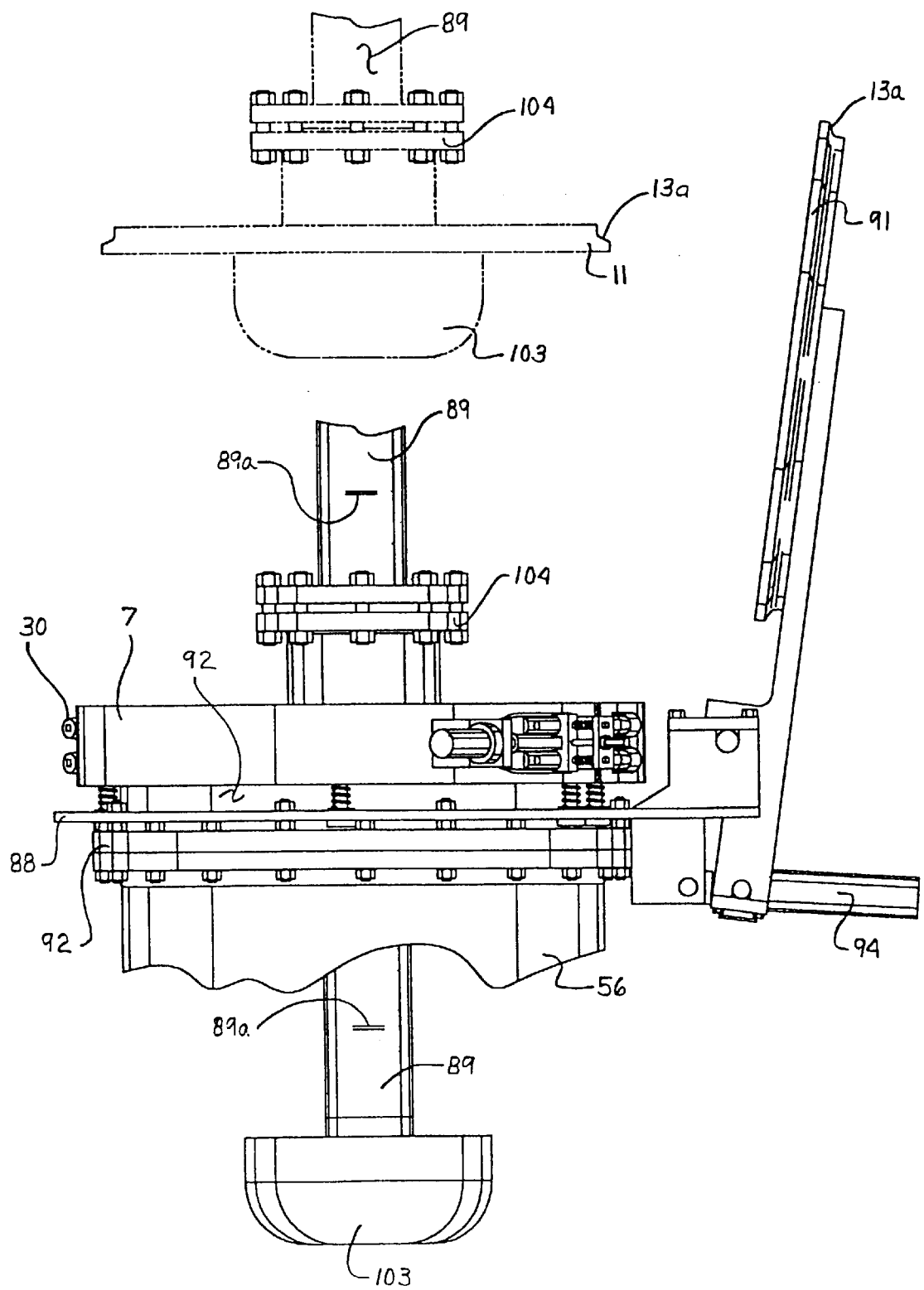
FIG. 40 is an elevation view of a preferred embodiment of a drum-top deheading system and illustrates its interaction with a and drilling head flange.

FIG. 40 illustrates a unique apparatus for the insertion of a tool into the vessel and for the sealing and operation of the tool within the vessel. The tool inserted into the vessel is sealed against the external environment and works within the vessel.

In FIG. 40, a drilling head flange 104 and drill bit 103, as shown with phantom lines, are lowered toward the drum hole 92a (shown in FIG. 38) as drill stem 89 is lowered. As drill bit 103, attached to drill stem 89, enters vessel 56 through drum hole 92a, drilling head flange 104, resting on drill bit 103, makes contact with top flange adapter 92. Drilling head flange 104 cannot pass through drum hole 92a, and it separates from drill bit 103. Drill bit 103 continues its decent into vessel 56 through drum hole 92a. Drilling head flange 104 has a flange hub end 11 and make-up shoulder 13a or 13c allowing clamp segments 7 to secure drilling head flange 104 to top flange adapter 92. This is in turn fastened to vessel 56. FIG. 2 and FIG. 3 illustrate alignment configurations that can be included on drilling head flange 104 and top flange adapter 92 that would assist in alignment. FIG. 40 shows clamp segments 7 closed onto top flange adapter 92 and drilling head flange 104 as the drill stem 89 passes through drum-top deheading system 90.

Drill stem 89 has tag marks 89a that allow an operator to identify the location of the drill bit 103 in vessel 56. Once vessel 56 is emptied of material 64, tag marks 89a identify the location of drill bit 103 relative to the top flange adapter 92. This allows an operator to open clamp segments 7 as drill bit 103 ascends.

When clamp segments 7 are opened, drill bit 103 is slowly raised until it contacts drilling head flange 104, lifting drilling head flange 104 up and away from top flange adapter 92. When drill bit 103 and drilling head flange 104 are sufficiently raised and clear from drum-top flange member 91, remotely activated actuator 94 pivots drum-top flange member 91 into top flange adapter 92 so that remotely activated actuators 27 can close clamp segments 7, securing drum-top flange member 91 to top flange adapter 92, which closes vessel 56.

While illustrating a drill, one skilled in the art will realize that any type of tool can be inserted into the vessel and operated remotely while the vessel is sealed to the external environment Gas detection devices, mixing devices, heating units, cooling units, or any such device can be substituted for the drill in the preceding discussion.

The drum-top deheading system 90, herein disclosed, is connected to vessel 56 via a top flange adapter 92. In new installations top flange adapter 92 will not be used. This adaptor allows retrofit of prior art manually bolted flanges.

Figure 41:
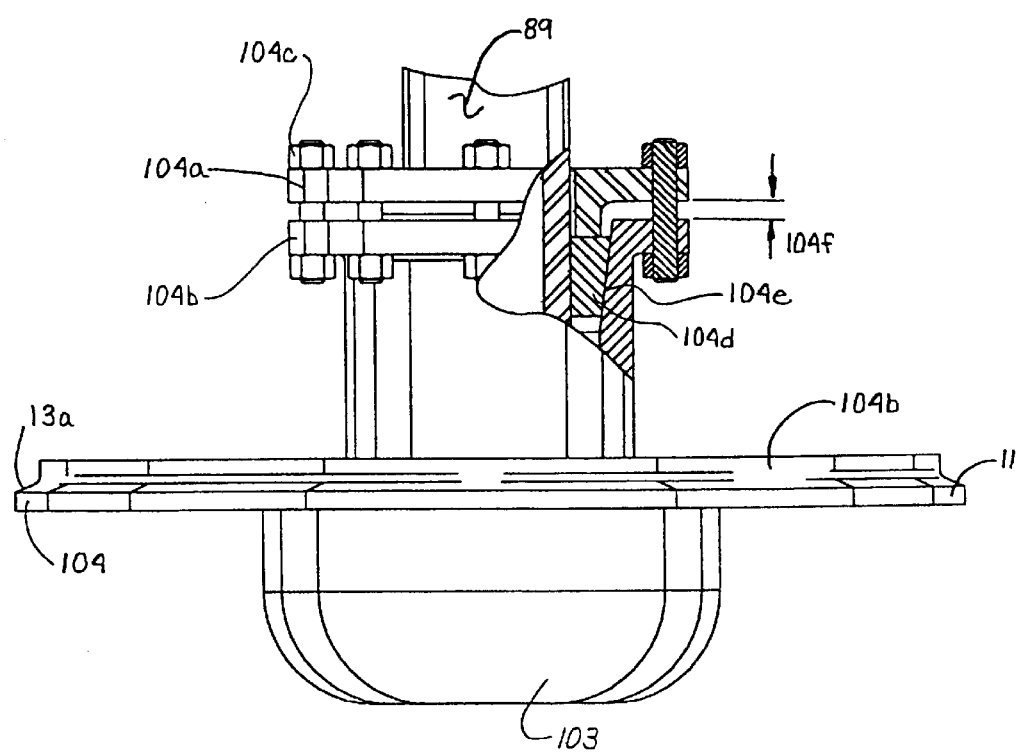
FIG. 41 is an exploded elevation view, partially sectioned, of a preferred embodiment of the drilling head flange.

Referring to FIG. 41, an embodiment of drilling head flange 104 is detailed. Drilling head flange 104 consists of top segment 104a, bottom segment 104b, fasteners 104c, and drilling head rubber 104d. When tightened, fasteners 104c, tend to close gap 104f forcing drilling head rubber 104d into a frusta-conical surface 104e in bottom segment 104b. Drilling head rubber 104d is pliable and molded into the annulus created by the outside diameter of drill stem 89 and the frusta-conical surface 104e. This acts as a seal barrier, isolating vessel 56's internal environment from its external environment. Drilling head flange 104 is easily secured to top flange adapter 92 when clamp segments 7 close onto the flanged hub end 11.

Drill bit 103 cannot pass through bottom segment 104b. Therefor, to assemble drilling head flange 104 onto drill stem 89, drill stem 89 and drill bit 103 are detached, drill stem 89 is passed through drilling head flange 104 and reattached to drill stem 89.

When drilling head rubber 104d is worn it must be replaced. To replace drilling head rubber 104d, drilling head flange 104 is removed from drill stem 89 and fasteners 104c are loosened so that top segment 104a can be separated from bottom segment 104b. Drilling head rubber 104d is then removed and replaced.

Figure 42:
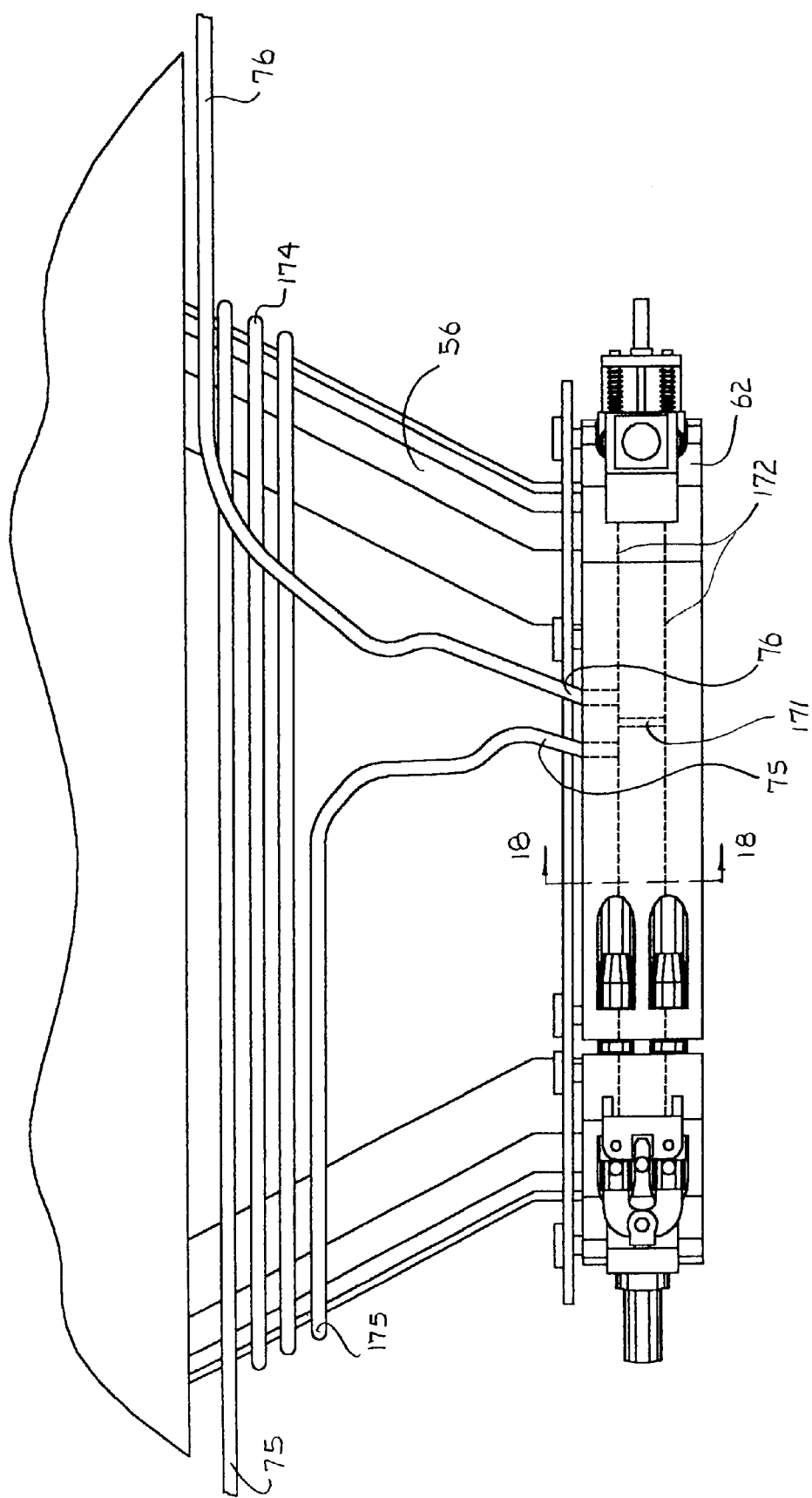
FIG. 42 is a elevation view of a preferred embodiment of a connector heat transfer system as it applies to a coke drum.
Figure 42A:
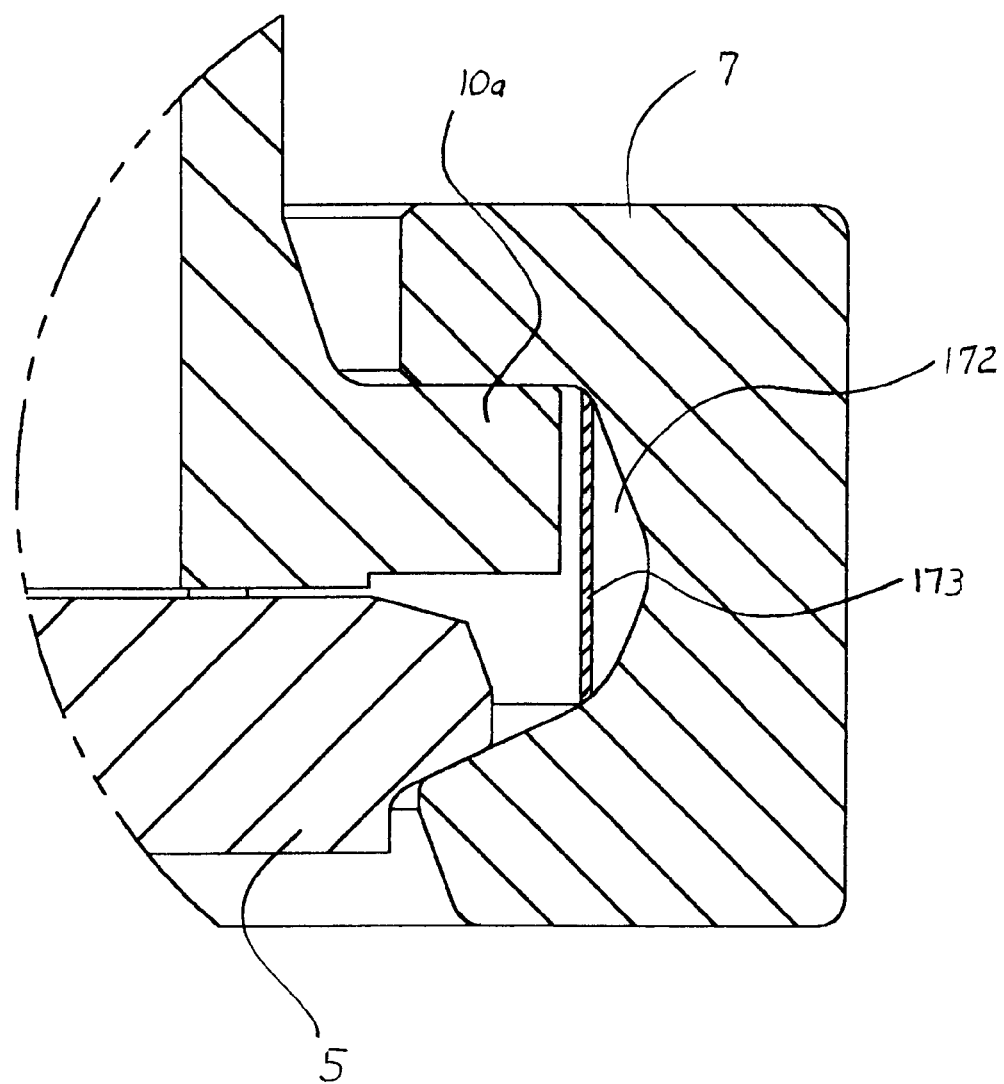
FIG. 42a is an exploded partial section view as seen along the lines 18—18.

Returning attention back to the flange retain clamp that comprises connectors 62, 63 and 88, and referring to FIGS. 42 and 42a an embodiment illustrates a connector heat transfer system 175. In many applications, manual and remotely operated, connectors are subject to severe thermal transients. Connectors subject to thermal transients affect a very complex science in and of itself. Millions of dollars have been spent on analysis and the subsequent application to practice of connectors designed to handle the effects of severe thermal transients. Routinely, most operators expecting severe thermal transients, expect increased cost and they eliminate connectors altogether. They join elements forming conduits in a more permanent fashion. In many applications, however, connectors must be present and, therefor are subject to severe thermal transients.

Thermal transients take two forms, heat up relative to time, and cool down relative to time. Each form presents different problems. In a typical connector, at least two elements are conduit elements ("conduits") adapted to retain a substance, which commonly is the genesis of the thermal transient. Other elements of the connector ("preloading elements") are adapted to engage the conduits creating seal integrity.

Due to the fact that the conduits are generally the first boundaries exposed to the thermal transient, they tend to differentially expand and contract relative to the preloading elements. To further complicate this matter separate conduit elements and separate preloading elements may be comprised of dissimilar materials, which differentially expand or contract when subject to the same temperature. Insulating some or all elements is a further complication.

Usually, in a severe heat up transient the conduit elements expand more than the preloading elements. This substantially expands the conduits, which are restrained by slightly expanding preloading elements, causing increased structural stress in the connector. The opposite is true in a severe cool down transient. Here, the conduits contract more than the preloading elements reducing seal integrity and posing fatigue concerns.

Those skilled in the art will realize the benefits of this embodiment and its novelty as it relates to solving thermal transient concerns related to connectors.

An embodiment solves thermal transient concerns related to connectors simply and cost effectively. Here the present invention transfers heat to and from elements comprising the connector to offset the effect of the thermal transient, using just a small valve and tubing.

An embodiment as applied to cokers and shown in FIG. 42 illustrates the nature of the a connector heat transfer system 175. Here, a connector heat transfer system 175 comprises inlet pipe 75, coil 174, conduit 172, baffle 171 and outlet pipe 76. Here, vessel 56 has been coking at high temperature for a number of hours filling up with coke 64 and a quench cycle is imminent before preparing it for decoking.

The primary function of connector heat transfer system 175 is to cool clamp segments 7 relative to flange member 5 and 10, without thermally shocking clamp segments 7. The result of the controlled cooling of clamp segments 7 is increased preload on flange member 5 and 10. In fact, substantial preload can be produced in this fashion, without clamp segment fastening devices 55, which normally produce the increased preload. Clamp segment fastening devices 55 are relatively insensitive to this precooling.

This is accomplished by opening of a small valve (not shown) allowing flow of an normally ambient temperature substance through inlet pipe 75 and around coil 174. Since vessel 56 is radiating heat at this time, the substance in coil 174 will elevate to a designed temperature, relatively lower than the temperature of clamp members 7. This substance then exists coil 174 and enters conduit 172 formed by barrier 173 and the inside profile of clamp segments 7. Heat will be dissipated from the volume of clamp segment 7, adjacent conduit 172, as the substance in conduit 172 takes on its heat and exits outlet pipe 76. Baffle(s) 171 direct the flow in conduit 172.

As the inside center volume of clamp segments 7 cools it contracts, resulting in increase clamp to flange preload. Connector heat transfer system 175 can be used as a prophylactic solution to a short term severe quench cycle. Here, connector heat transfer system 175 would be initiated prior to the quenching of the conduits (flange members 5 and 10). It will precool and contract the volume of the preloading elements (clamp segments 7) prior to the contraction of the conduits, maintaining seal integrity throughout the quench cycle. This is beneficial because it produces high closing force between the conduits and preloading elements, without vaulting the size of their constituent elements.

Prior to an opposite severe heatup transient, the preloading elements could be preheated preventing excess structural stress and, thereby increasing the life of the connector.

This embodiment could not only address a quench cycle, it could be used to force a leaking connector to seal off. Routinely, a leaking connector is sealed off by physically tightening its preloading elements. Here, the preloading elements are thermally tightened. Varying the number and location of inlets, outlets and baffles can produce a differential preloading effect if desired.

A monitoring system could sense changing upstream conditions, recognize an eminent heat up or cool down transient and automatically initiate a connector heat transfer system to prepare the connector.

The flange retaining clamp design of the present invent is especially suited for a connector heat transfer system 175 because it can be incorporated into its design at low cost. It will be adapted to address the magnitude change of the gap 36 between clamp segments 7 by applying an overlapping conduit section. This overlapping section will also divert flow 128 away from clamp segment fastening devices 55, resulting in increased reliability.

A connector heat transfer embodiment can be designed for any type of connector including a standard bolted flange. It will be designed to regulate the relative temperature of the preloading elements to the conduits or visa versa. Those skilled in the art will realize that this embodiment will take on many forms as connector types and conditions change.

Those skilled in the art would site many examples where this embodiment could significant reduce the cost of construction.

Any of the aforementioned embodiments can be combined in part or full. A joint connector, other than describe herein, could also be use with the other embodiments of the present disclosed in this document, and any type of flange transport could be used with the flange retaining clamps describe herein.

The aforementioned embodiments can be adapted to be remotely operable. They will also be adapted for manual operation is case of failure of remote operation.

Having described the invention above, various modifications of the techniques, procedures, material and equipment will be apparent to those in the art. It is intended that all such variations within the scope and spirit of the appended claims be embraced thereby.

I claim:

1. A method of substantially enclosing the deheading of a coke drum having a bottom opening comprising the at least partially remote operable steps of:
    forming an at least partially enclosing passageway about the bottom opening; and then deheading the coke drum.

2. A method of controlling loose material including water that exits a coke drum comprising the at least partially remote operable steps of:
    forming an at least partially enclosing passageway about a joint connector connected to the coke drum, wherein the at least partially enclosing passageway is adapted to control the loose material as it exits an opening;
    creating the opening to allow the loose material to exit the coke drum, wherein the opening is created by disconnecting a structural unit with the joint connector and displacing the structural unit.

3. The method of claim 2 further comprising the at least partially remote operable steps of:
    unforming at least part of the at least partially enclosing passageway;
    closing the opening by replacing the structural unit and reconnecting the structural unit.

4. The method of claim 2 further comprising the at least partially remote operable steps of:
    inserting a drill bit into the coke drum;
    dislodging material in the coke drum that may not have freely exited the coke drum through the opening;
    unforming at least part of the at least partially enclosing passageway;
    closing the opening by replacing the structural unit and reconnecting the structural unit.

5. The method of claim 2 wherein displacing the structural unit comprises using an at least partially remote operable closure transport wherein the closure transport is movably disposed on a top surface of a working surface disposed below the coke drum, is movably attached to a support deck supporting the coke drum, or is movably attached to the coke drum.

6. The method of claim 2 wherein displacing the structural unit effectively regulates the flow of material that exits the coke drum, wherein the flow is controlled by the at least partially enclosing passageway.

7. The method of claim 2 wherein forming the at least partially enclosing passageway produces a substantially enclosed conduit such that the conduit substantially surrounds the coke drum about the opening created such that loose material may pass through when the opening is created.

8. The method of claim 2 wherein the structural unit is a coke drum closure having a plurality of ends, wherein at least one end is connectable to the coke drum by the joint connector and the other end is connectable to another structural unit.

9. The method of claim 2 wherein disconnecting the structural unit comprises disengaging an at least partially remote operable joint connector wherein the joint connector comprises a plurality of clamp segments, the clamp segments conjoined by a plurality of segment fastener elements, wherein the clamp segments are conjoined such that the failure of any single segment fastener element will not unconjoin the clamp segments or cause failure of the joint connector.

10. The method of claim 3 wherein reconnecting the structural unit comprises engaging an at least partially remote operable joint connector wherein the joint connector comprises a plurality of clamp segments, the clamp segments conjoined by a plurality of segment fastener elements, wherein the clamp segments are conjoined such that the failure of any single segment fastener element will not unconjoin the clamp segments or cause failure of the joint connector.

11. The method of claim 2 wherein forming the at least partially enclosing passageway produces a substantially enclosed conduit and displacing the structural unit regulates a flow of material exiting the coke drum wherein the flow of material is controlled by the conduit.

12. The method of claim 2 wherein creating the opening in the coke drum is a remote operable step.

13. The method of claim 2 wherein forming the at least partially enclosing passageway communicates the opening with a hole.

14. The method of claim 2 wherein displacing the structural unit comprises using an at least partially remote operable closure transport.

15. The method of claim 2 wherein displacing the structural unit is accomplished by the at least partially translating, swinging, or tilting.

16. The method of claim 2 wherein forming the at least partially enclosing passageway produces a substantially enclosed conduit for the loose material to flow.

17. The method of claim 16 further comprising the steps of:
   deploying a drill bit in the coke drum;
   removing material that may not have freely exited the coke drum through the opening by displacing the drill through the coke drum;
   displacing the drill beyond the coke drum into the substantially enclosed conduit such that the drill displaces material collected within the conduit.

18. The method of claim 2 further comprising the step of securing an exit chute to the coke drum.

19. The method of claim 2 further comprising collecting the controlled, loose material in a car or pit after the step of allowing material to exit from the coke drum.

20. The method of claim 2 wherein forming the at least partially enclosing passageway substantially encloses the joint connector.

* * * * *